United States Patent [19]

Hara et al.

[11] Patent Number: 5,566,003
[45] Date of Patent: Oct. 15, 1996

[54] IMAGE PROCESSING SYSTEM IN WHICH THE TRANSMITTER AND RECEIVER HAVE DIFFERENT DATA RESOLUTIONS AND DATA IS TRANSMITTED AT THE RECEIVER RESOLUTION

[75] Inventors: Teruya Hara, Yokohama; Shigeo Miura, Tokyo; Katsutoshi Ushida, Yokohama; Nobuyuki Shigeeda, Kawasaki, all of Japan

[73] Assignee: Canon Kabushiki Kaisha, Tokyo, Japan

[21] Appl. No.: 5,762

[22] Filed: Jan. 19, 1993

[30] Foreign Application Priority Data

| Jan. 21, 1992 | [JP] | Japan | 4-008153 |
| Jan. 31, 1992 | [JP] | Japan | 4-016332 |
| Jan. 31, 1992 | [JP] | Japan | 4-016340 |
| Jan. 31, 1992 | [JP] | Japan | 4-016342 |
| Apr. 20, 1992 | [JP] | Japan | 4-099329 |
| Apr. 20, 1992 | [JP] | Japan | 4-099330 |
| Jan. 8, 1993 | [JP] | Japan | 5-001639 |

[51] Int. Cl.⁶ .................................................. G06F 3/153
[52] U.S. Cl. .......................... 358/448; 382/199; 382/266
[58] Field of Search ............................. 358/447–448; 382/21, 31, 60, 22, 197, 199, 210, 316

[56] References Cited

U.S. PATENT DOCUMENTS

| 4,296,405 | 10/1981 | Rich | 340/146.3 AG |
| 4,307,377 | 12/1981 | Pferd et al. | 358/260 |
| 4,668,995 | 5/1987 | Chen et al. | 358/282 |
| 4,953,114 | 8/1990 | Sato | 382/50 |
| 5,023,919 | 1/1991 | Wataya | 382/54 |
| 5,050,222 | 9/1991 | Lee | 382/21 |
| 5,073,959 | 12/1991 | Sugiura | 382/22 |
| 5,073,960 | 12/1991 | Nakai et al. | 382/22 |
| 5,093,870 | 3/1992 | Watanabe | 382/47 |
| 5,231,677 | 7/1993 | Mita et al. | 382/22 |
| 5,235,436 | 8/1993 | Sakamoto et al. | 358/462 |
| 5,270,837 | 12/1993 | Chen et al. | 358/467 |
| 5,296,939 | 3/1994 | Suzuki | 358/453 |
| 5,304,988 | 4/1994 | Seto | 341/141 |
| 5,309,521 | 5/1994 | Matsukawa | 382/22 |
| 5,317,679 | 5/1994 | Veda et al. | 395/132 |

FOREIGN PATENT DOCUMENTS

| 364264 | 4/1990 | European Pat. Off. | H04N 1/32 |
| 378754 | 7/1990 | European Pat. Off. | G06F 15/72 |
| 451722 | 10/1991 | European Pat. Off. | H04N 1/32 |

*Primary Examiner*—Stephen Brinich
*Attorney, Agent, or Firm*—Fitzpatrick, Cella, Harper & Scinto

[57] ABSTRACT

The present invention has a transmission side apparatus to which an image to be transmitted is inputted, and an outline vector along the edge of the inputted image is extracted. The transmission side apparatus transmits data of the extracted outline vector to a receiving side apparatus via a data line. The receiving side apparatus reproduces the image in accordance with received outline vector data so as to output it to a predetermined visible image generating apparatus.

62 Claims, 57 Drawing Sheets

COMPLETE DELETION

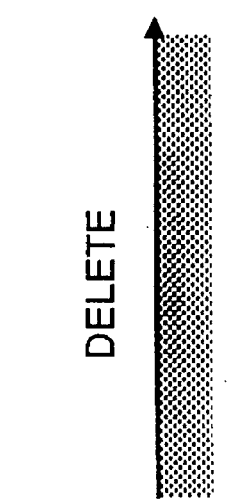
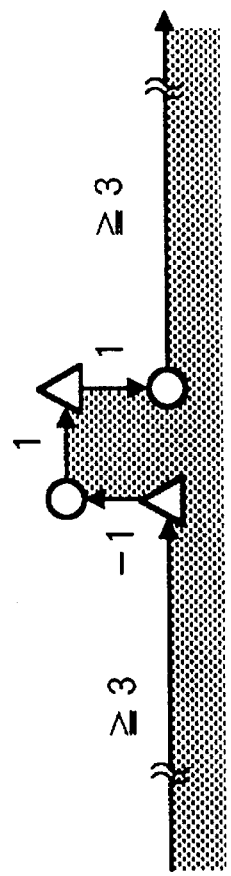
FIG. 14A
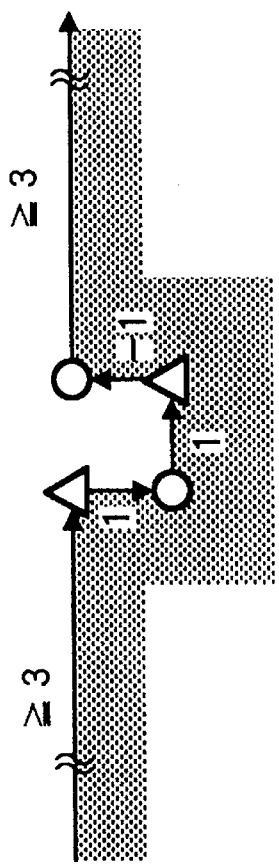
FIG. 14B

| $D_{i-1}$ | = 1   &   | $D_{i+1}$ | ≥ 3         | $D_{i-2}$ | ≤ | $D_i$ |

| $D_{i-1}$ | ≥ 3   &   | $D_{i+1}$ | = 1         | $D_i$ | ≥ | $D_{i+2}$ |

| $D_{i-1}$ | ≥ 2   &   | $D_i$ | ≥ 2

$|D_i| \geq 3 \ \& \ D_{i-1} \cdot D_{i+1} > 0$ $|D_i| > |D_{i-2}| + |D_{i+2}|$
$(|D_{i-1}| = |D_{i+1}| = 1)$

SECOND SMOOTHING

MEAN LOAD APPLIED $Q_i(x'_i, y'_i) = \frac{1}{4} \cdot P_{i-1}(x_{i-1}, y_{i-1})$
$+ \frac{1}{2} \cdot P_i(x_i, y_i)$
$+ \frac{1}{4} \cdot P_{i+1}(x_{i+1}, y_{i+1})$

THAT IS, $x'_i = \frac{1}{4} \cdot x_{i-1} + \frac{1}{2} \cdot x_i + \frac{1}{4} \cdot x_{i+1}$
$y'_i = \frac{1}{4} \cdot y_{i-1} + \frac{1}{2} \cdot y_i + \frac{1}{4} \cdot y_{i+1}$ $x'_1 = \frac{1}{4} \cdot 1 + \frac{1}{2} \cdot 2 + \frac{1}{4} \cdot 4$
$= 9/4$
$y'_1 = \frac{1}{4} \cdot 3 + \frac{1}{2} \cdot 2 + \frac{1}{4} \cdot 1$
$= 2$

HORIZONTAL VECTOR TABLE

| | X | Y | INFLOW | OUTFLOW |
|---|---|---|---|---|
| 0 | 1.5 | 2.5 | 1 | 0 |
| 1 | 2.5 | 3.5 | 0 | 1 |

VERTICAL VECTOR TABLE

| | X | Y | INFLOW | OUTFLOW |
|---|---|---|---|---|
| 0 | 2.5 | 2.5 | 0 | 1 |
| 1 | 1.5 | 3.5 | 1 | 0 |

FIG. 24B

HORIZONTAL VECTOR TABLE

| | X | Y | INFLOW | OUTFLOW |
|---|---|---|---|---|
| 0 | 1.5 | 2.5 | 1 | 0 |
| 1 | 2.5 | 3.5 | 0 | 1 |
| 2 | 3.5 | 2.5 | 2 | * |

VERTICAL VECTOR TABLE

| | X | Y | INFLOW | OUTFLOW |
|---|---|---|---|---|
| 0 | 2.5 | 2.5 | 0 | 1 |
| 1 | 1.5 | 3.5 | 1 | 0 |
| 2 | 3.5 | 3.5 | * | 2 |

FIG. 24C

HORIZONTAL VECTOR TABLE

| | X | Y | INFLOW | OUTFLOW |
|---|---|---|---|---|
| 0 | 1.5 | 2.5 | 1 | 0 |
| 1 | 2.5 | 3.5 | 0 | 1 |
| 2 | 3.5 | 2.5 | 2 | 3 |
| 3 | 5.5 | 3.5 | 3 | 2 |

VERTICAL VECTOR TABLE

| | X | Y | INFLOW | OUTFLOW |
|---|---|---|---|---|
| 0 | 2.5 | 2.5 | 0 | 1 |
| 1 | 1.5 | 3.5 | 1 | 0 |
| 2 | 3.5 | 3.5 | 3 | 2 |
| 3 | 5.5 | 2.5 | 2 | 3 |

FIG. 49
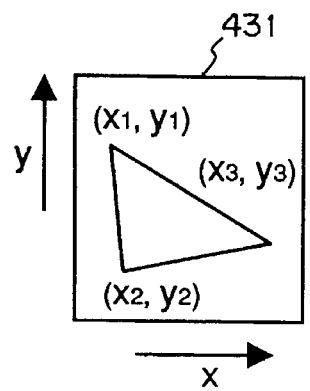
A. BEFORE OUTLINE EXPANSION/COMPRESSION PROCESS
VECTOR COORDINATE DATA : $(x_1, y_1)$ - - - - -
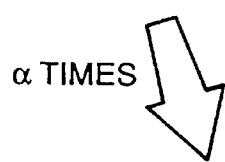
α TIMES
B. AFTER OUTLINE EXPANSION/COMPRESSION PROCESS
VECTOR COORDINATE DATA : $(\alpha x_1, \alpha y_1)$ - - - - -
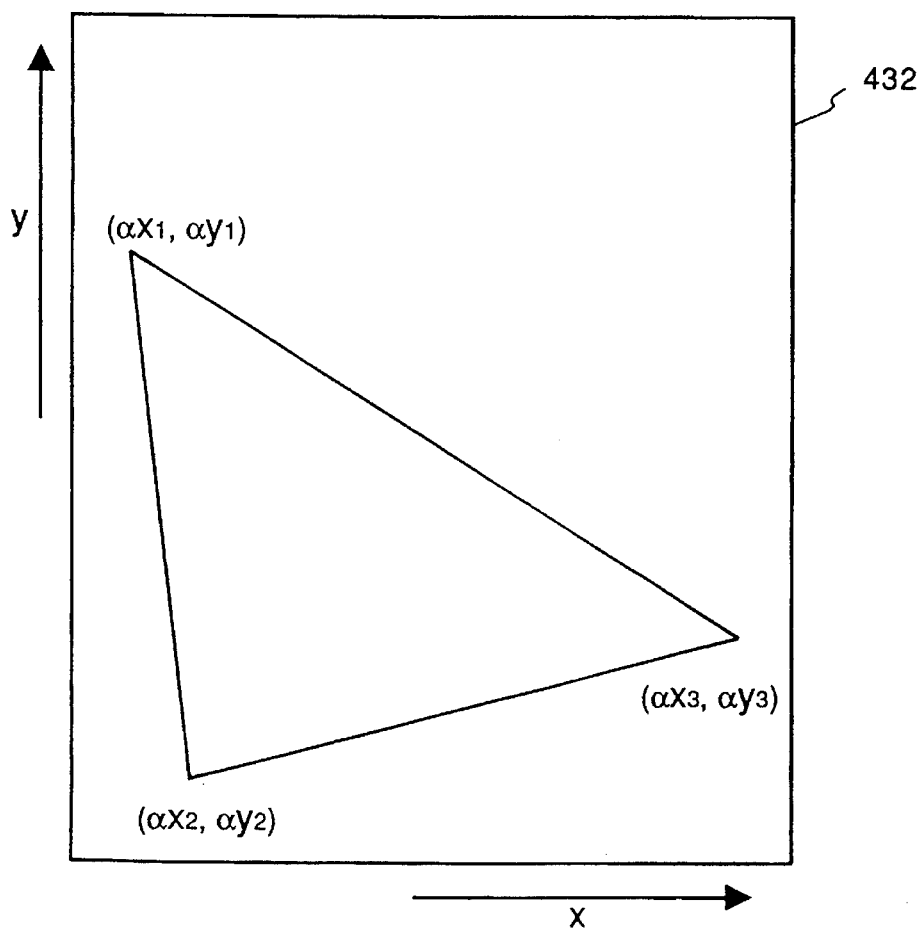

ABSTRACT BEGIN# IMAGE PROCESSING SYSTEM IN WHICH THE TRANSMITTER AND RECEIVER HAVE DIFFERENT DATA RESOLUTIONS AND DATA IS TRANSMITTED AT THE RECEIVER RESOLUTION

BACKGROUND OF THE INVENTION

The present invention relates to a method and an apparatus for processing images, and more particularly to an image processing method and an apparatus of a type which transfers images to another system.

Hitherto, an image communication apparatus such as a facsimile apparatus reads an image as a binary-coded image by an image scanner thereof. When data about the read binary-coded image is communicated, the binary-coded raster image is coded/compressed by a method such as a MH, MR and MMR method and it is transmitted to a facsimile apparatus disposed at the other end of the data line.

Incidentally, in the case where a facsimile apparatus disposed on the transmission side reads an original document in a G3 fine mode (main scanning: 8 pel/mm, subscanning: 7.71 line/mm) and transmits the read original document to a facsimile apparatus disposed at the other end of the data line and having a standard recording resolution (main scanning: 8 pel/mm, sub-scanning: 3.85 line/mm), that is, in the case where the resolution of the read image on the transmission side and that on the receiving side are different from each other, the facsimile apparatus on the transmission side temporarily returns the read image to the binary image, and then it again encodes it as an image having the standard resolution so as to transmit the image.

In the case where a facsimile apparatus disposed on the other end of the data line has only a function of printing a received image on an A4-size recording paper sheet and a facsimile apparatus disposed on the transmission side transmits a read B-size original document, the facsimile apparatus on the receiving side contracts the image before it prints out the image.

However, the aforesaid image conversion process and the image expansion-compression process cannot enable an excellent image to be obtained because the aforesaid processes use only an interpolating process and a thinning process.

SUMMARY OF THE INVENTION

An object of the present invention is to provide an image processing apparatus and a method therefor capable of transferring image data from which an excellent image can be reproduced by the receiving side apparatus even if the transmission side apparatus and the receiving side apparatus have different resolutions.

A further object of the present invention is to provide an image processing apparatus and a method therefor capable of reproducing an image having a size desired by a user of the transmission side apparatus.

A still further object of the present invention is to provide an image processing apparatus capable of simultaneously achieving the first and the second objects.

Another object of the present invention is to provide an image processing apparatus capable of transmitting and/or receiving a high quality image.

Another object of the present invention is to provide an image processing apparatus for transmitting image data adaptable to the resolution of the receiving side apparatus and causing the receiving side apparatus to reproduce a high quality image.

Another object of the present invention is to provide an image processing apparatus capable of transferring data adapted to the resolution of the receiving side apparatus while preventing an increase of the quantity of data to be transmitted.

Another object of the present invention is to provide an image processing apparatus enabling the receiving side apparatus to reproduce a high quality image and capable of positively reducing the quantity of data to be transmitted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 14A and 14B illustrate an example of a process to be performed by the first smoothing circuit according to a second embodiment of the present invention;

FIG. 24 illustrates the transition of the horizontal and vertical directional rough outline vectors of the inputted image shown in FIG. 23;

FIG. 49 illustrates a comparison between data to be transmitted and reproduced data according to the seventh embodiment of the present invention;

DETAILED DESCRIPTION OF THE PREFERRED EMBODIMENTS

Preferred embodiments of the present invention will now be described with reference to the drawings.

First Embodiment

Usually, a transmission side facsimile apparatus encodes a binary image and transmits the binary-coded image to the receiving side apparatus.

On the contrary, the first characteristics of the present invention lie in that an outline vector of the binary image is generated and data about the outline vector is transmitted to the receiving side apparatus. Hereupon, it might, of course, be feasible to employ a structure in which the receiving side apparatus temporarily develops the binary image in a memory or the like in accordance with encoded data about the received binary image, an outline vector is generated from this, a expansion-compression process or the like is performed, and the received image is printed. However, the load which must be borne by the receiving side apparatus becomes too heavy. Therefore, the outline vector generating process is performed by the transmission side apparatus.

Figure 53:
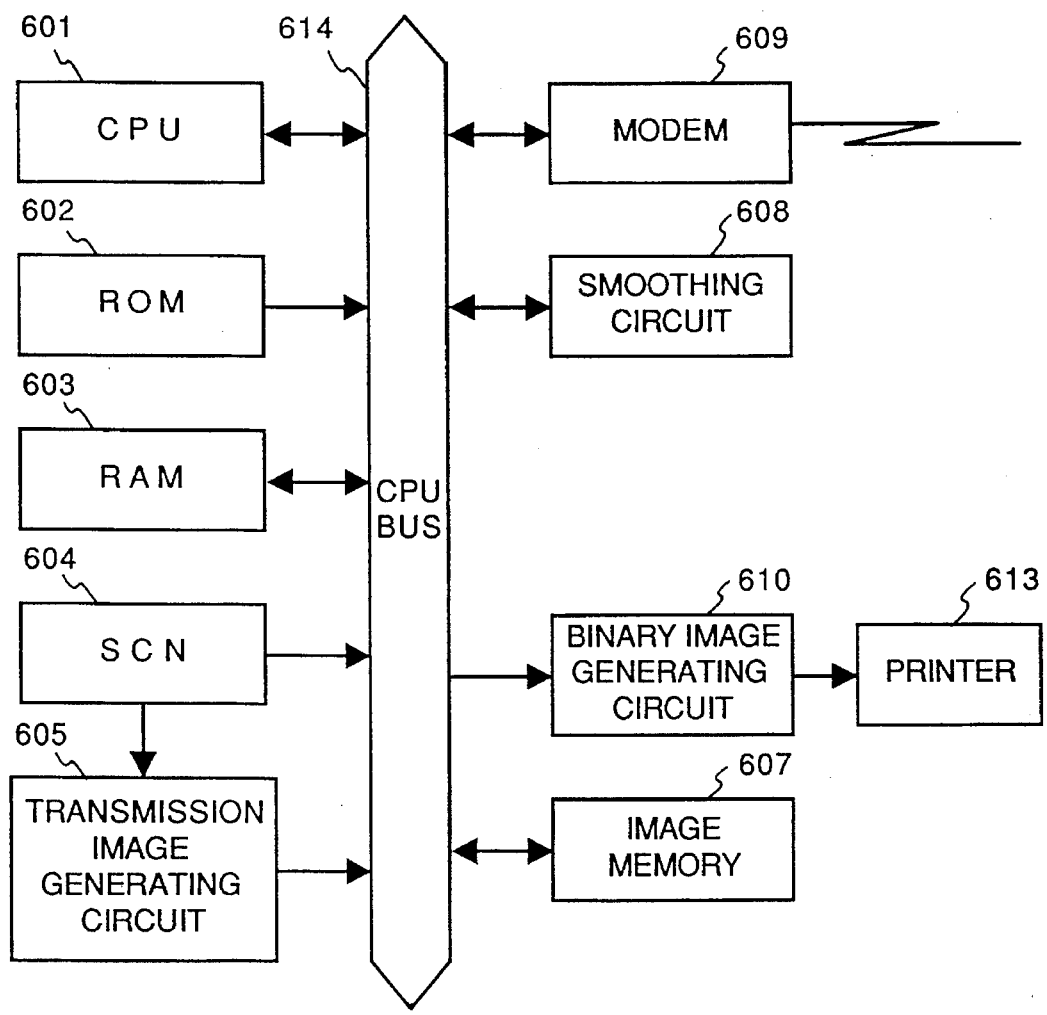
FIG. 53 is a block diagram which illustrates the facsimile apparatus according to the first embodiment of the present invention.

FIG. 53 is a block diagram which illustrates a facsimile apparatus according to a first embodiment of the present invention which is capable of transmitting and receiving an image.

Referring to FIG. 53, reference numeral 610 denotes a CPU for controlling the overall body of the apparatus, 602 denotes a ROM which stores a communication program which executes communication with an apparatus disposed at the other end of the data line in accordance with a control program or a predetermined transmission control procedure Reference numeral 603 denotes a RAM which is utilized as a working region for the CPU 601. Reference numeral 604 denotes a scanner (SCN) for reading an original document to be transmitted. Reference numeral 605 denotes a transmission image generating circuit which converts image data read from the SCN 604 into a binary image, and which generates an outline vector from the binary image so as to generate outline data to be transmitted. The transmission image generating circuit 605 will be described later.

Reference numeral 607 denotes an image memory in which the binary image read by the scanner 604 is developed and which is used at the time of an outline data generating process performed by the transmission image generating circuit 605. Reference numeral 608 denotes a smoothing circuit which receives outline vector data supplied via the data line so as to generate novel outline data (smoothed outline data) by smoothing the outline data (coordinate data) or by converting the pixel density. Reference numeral 609 denotes a modem for modulating and demodulating the image signals so as to perform the transmission control process and to transmit/receive image data. Reference numeral 610 denotes a binary image generating circuit which generates a binary image in accordance with outline data so as to transfer generated binary image to the printer 613. The printer 613 receives the binary image supplied from the binary image generating circuit 610, forms an image on a predetermined recording paper (a recording paper sheet or the like), and outputs the formed image.

Figure 54:
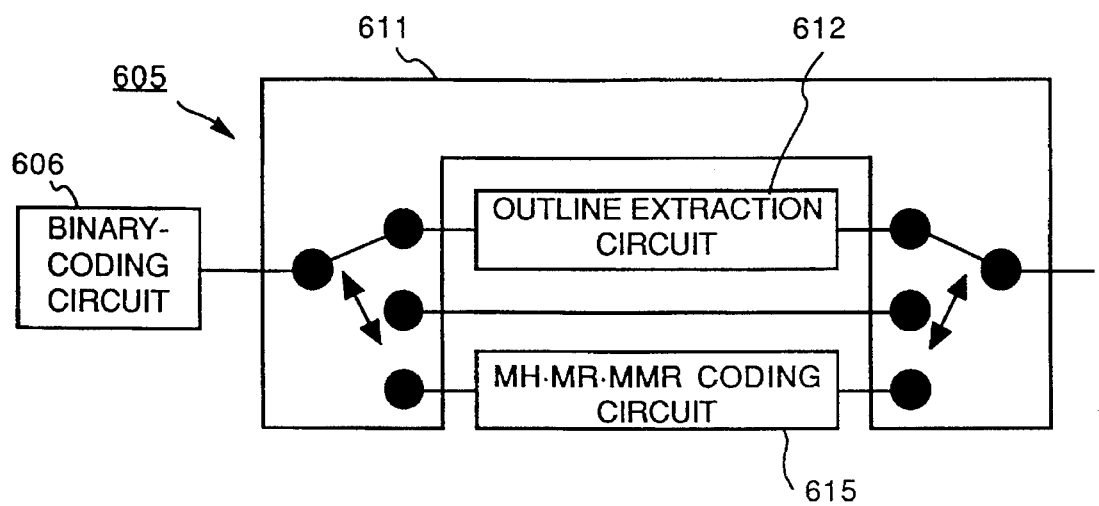
FIG. 54 is a block diagram which illustrates a transmission image generating circuit according to a first embodiment of the present invention.

FIG. 54 is a block diagram which illustrates the detailed structure of the transmission image generating circuit 605. The transmission image generating circuit 605 comprises a binary-coding circuit 605 for generating binary-coded data from image data read by the scanner portion 604, an outline extraction circuit 612 which extracts the outline of binary-coded data stored by the image memory 607 so as to again outputs outline vector data to the image memory 607, an MH·MR·MMR encoding circuit 615 for encoding binary image data, and a switch circuit 611 for switching the output from the binary-coding circuit 606 to the outline extraction circuit 612 or the MH·MR·MMR encoding circuit 615. The principle of the outline extraction process to be performed by the outline extraction circuit 612 conforms to, for example, a second embodiment of the present invention to be described later.

Figure 55:
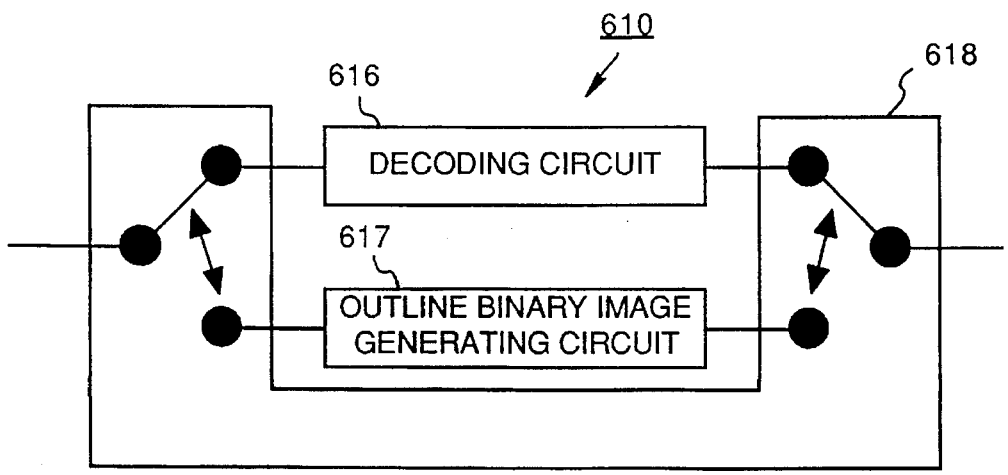
FIG. 55 is a block diagram which illustrates a binary image generating circuit according to the first embodiment of the present invention.

FIG. 55 is a block diagram which illustrates the detailed structure of the binary image generating circuit 610 for generating binary image data from outline data (or smoothed data). The binary image generating circuit 610 comprises a decoding circuit 616 for decoding received encoded data (MH, MR or MMR-coded data) into binary image data, an outline binary image generating circuit 617 for generating a binary image from outline vector data, and a switch circuit 618 for connecting the received data output to the decoding circuit 616 or the outline binary image generating circuit 617.

Figure 56:
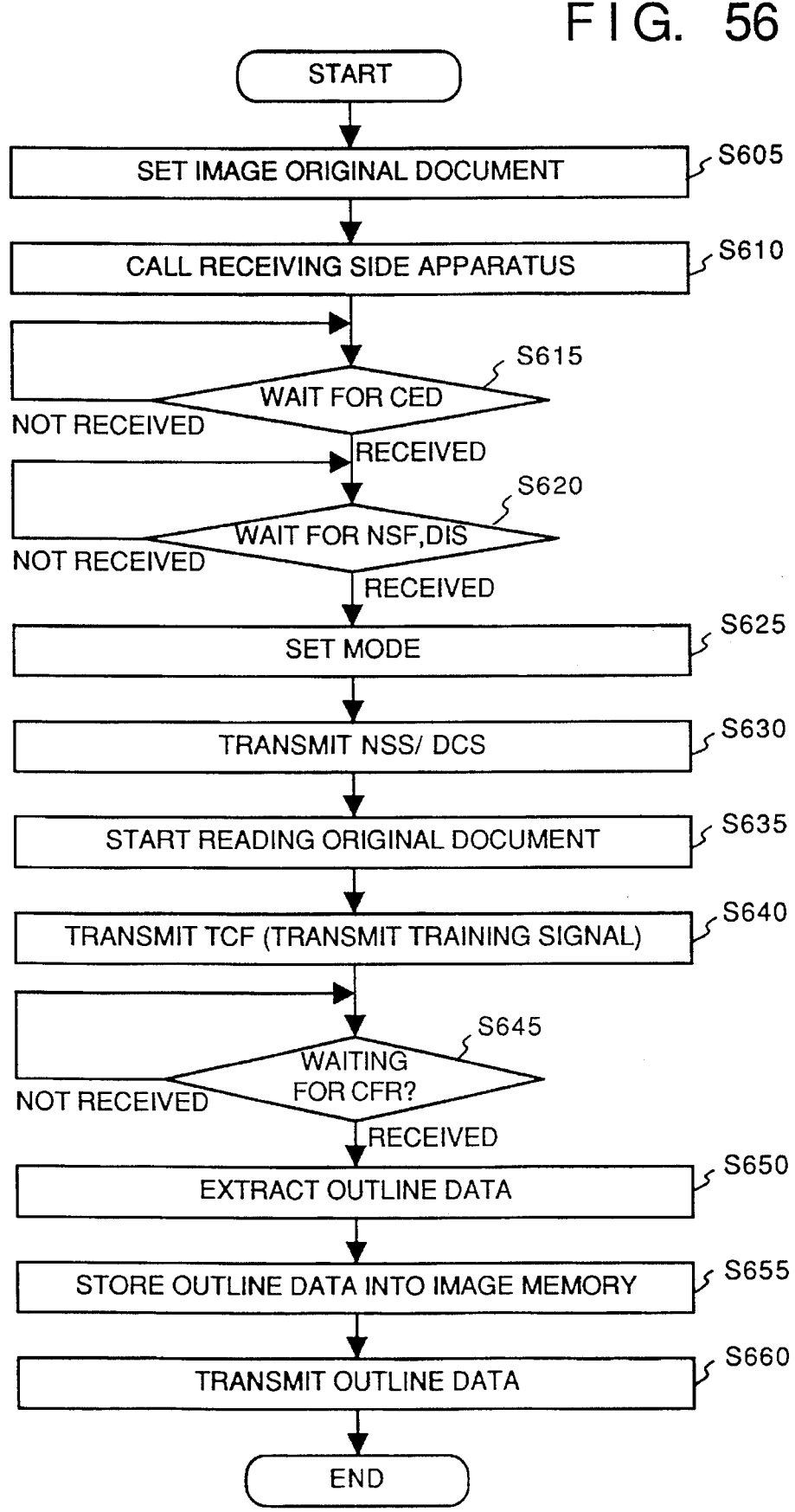
FIG. 56 is a flow chart which illustrates the contents of the transmission process according to the first embodiment of the present invention.
Figure 57:
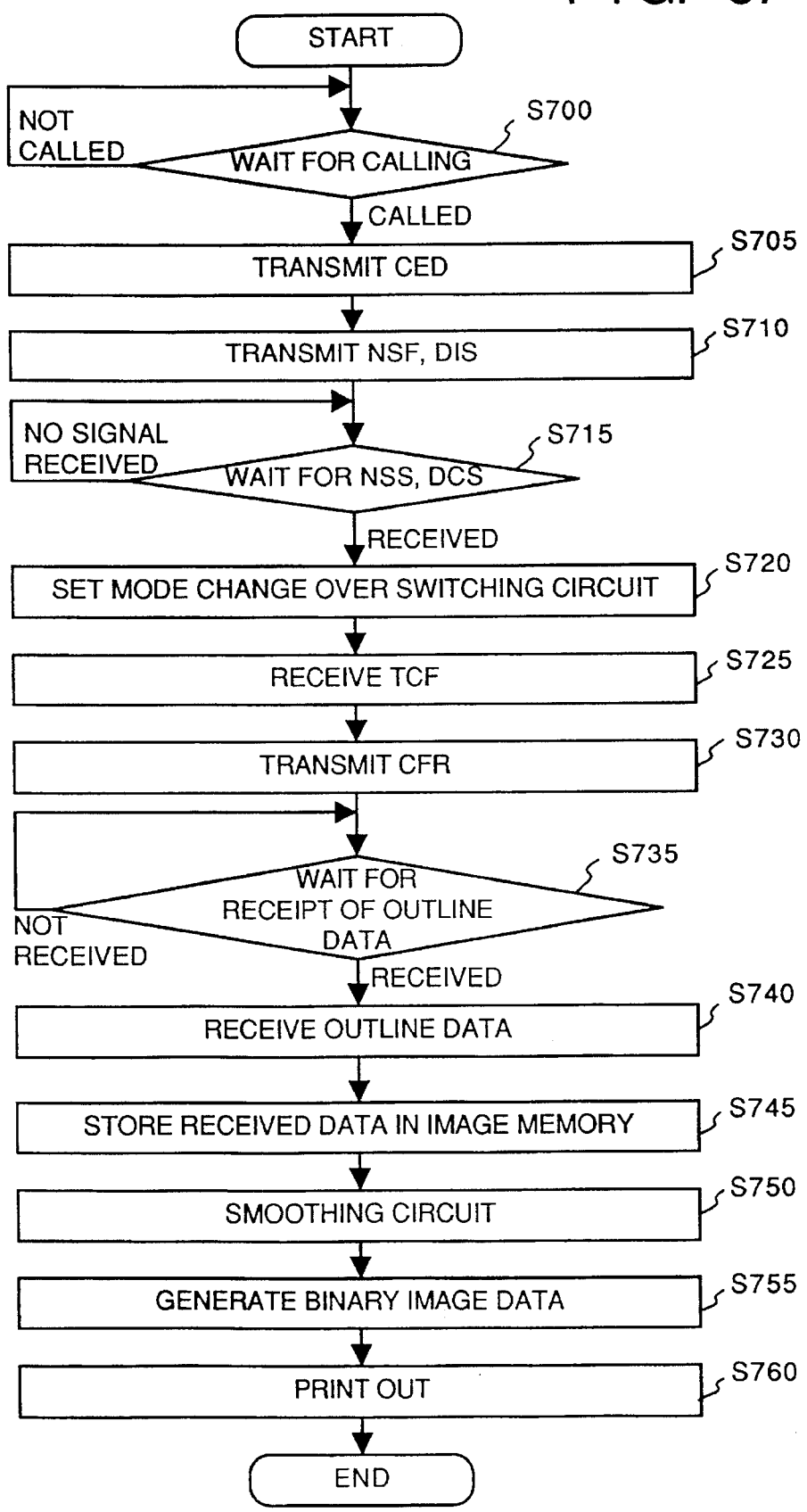
FIG. 57 is a flow chart which illustrates the contents of the receiving process according to a first embodiment of the present invention.

The facsimile apparatus thus structured is operated in accordance with a flow chart shown in FIGS. 56 and 57. The description to be made hereinafter on the premise that both the transmission side apparatus and receiving side apparatus are the facsimile apparatuses structured as described above and the communication is made in accordance with the transmission control procedure conforming to CCITT30. Therefore, the operations to be performed by the transmission side apparatus and the receiving side apparatus will be described while being denoted by the same reference numerals.

In the transmission side apparatus, the original document of the image is loaded into the apparatus in step S605, and the receiving side apparatus is called in step S610. In step S615, the transmission side apparatus waits for a CED signal. On the other hand, the receiving side apparatus is waiting for a calling in step S700, and the flow proceeds to step S705 in which the receiving side apparatus transmits the CED signal when it detects the calling from the transmission side apparatus. In the next step S710, a fact that the outline vector can be received and an NSF/DIS code is transmitted to the transmission side apparatus. Then, the receiving side apparatus waits for an NSS/DCS signal.

When the transmission side apparatus receives the CED signal, the flow proceeds to step S620 in which it waits for the NSF/DIS code. When the transmission side apparatus receives the NSF/DIS code, the flow proceeds to step S625. In step S625, the transmission side apparatus recognizes that the receiving side apparatus is able to receive outline data in accordance with the code designated in the NSF, and it set a mode for transmitting outline data. In the next step S630, the transmission side apparatus transmits an instruction to transmit outline data as the NSS/DCS code containing the other mode setting information to the receiving side apparatus. Then, the transmission side apparatus starts reading the image of the set original document in step S635. Furthermore, the transmission side apparatus transmits a TCF as a training signal to the receiving apparatus, and the flow proceeds to step S645 in which the transmission side apparatus waits for a CFR signal.

When the receiving side apparatus receives the NSS/DCS signal, the flow proceeds to step S720 in which the switching circuit 618 is switched to the outline binary image generating circuit 617 in accordance with the received NSS/DCS code so as to enable the apparatus to receive outline data. In the next step S725, receipt of the TCF is performed. If the TCF was received, the flow proceeds to step S730 in which the CFR is transmitted and the result of this is notified to the transmission side apparatus. Then, the flow proceeds to step S735 in which the receiving side apparatus waits for outline data.

When the transmission side apparatus receives the CFR supplied from the receiving side apparatus, the flow proceeds to step S650 in which the image of the original document is read, and the outline is extracted from read image data, so that transmission of outline data to the receiving side apparatus is commenced. That is, the transmission side apparatus reads the image of the original document for one line via the scanner portion (SCN) 604, and it causes the binary-coding circuit 606 to binary-code image data. At this time, the CPU 601 switches the switching circuit 11 to the outline extraction circuit 12 so as to cause binary-coded data to be supplied to the outline extraction circuit 12. When reading of image data for one line has been completed, a predetermined quantity of the image of the original document is transmitted to the sub-scanning direction of the scanner portion (SCN) 604, and reading of the image data, the binary coding operation and the input operation to the outline extraction circuit 612 are repeated sequentially. When image data for the number of lines, which can be processed, has been supplied to the outline extraction circuit 612, the outline extraction process is commenced.

In step S655, outline data for one page of the original document generated by the outline extraction circuit 612 is temporarily stored in the image memory 607. Then, outline data thus stored is, in step S660, transmitted to the receiving side apparatus via the modem 609. Thus, the operation of transmitting the image of the original document for one page is completed.

When the receiving side apparatus detects the receipt of outline data, the flow proceeds to step S740 in which outline data is received. In step S745, received data is temporarily stored in the image memory 607. In the next step S750, outline data stored in the image memory 607 is supplied to the smoothing circuit 608 in which it is subjected to the smoothing process, a pixel density conversion process and a notch removal process and so forth, so that outline data is converted into smoothed data. The aforesaid smoothing process, a pixel density conversion process and a notch removal process will be described in detail in the second embodiment to be described later. In step S755, outline data (or smoothed data) stored in the image memory 607 is supplied to the outline binary image generating circuit 617 via the switching circuit 618, so that binary image data is generated in the outline binary image generating circuit 617. Finally, binary image data is, in step S760, transmitted to a printer 613 via the switching circuit 618, so that the received image is outputted. Thus, the process for receiving image data for one page is completed.

In the first embodiment, outline data is extracted from image data read by the transmission side apparatus at the time of transmitting the image of an original document, and outline line data is transmitted to the receiving side apparatus. The receiving side apparatus generates binary image data from supplied outline data to as to output an image. Therefore, the loads which must be respectively borne for the transmission side apparatus to perform the transmission of the image of the original document and for the receiving side apparatus to perform the receipt and reproduction of the same can be shared.

Although the first embodiment is arranged in such a manner that outline data extracted by the transmission side apparatus is directly transmitted to the data line in order to simplify the description, the present invention is not limited to this. For example, outline data can be transmitted after the format of outline data has been converted to conform to a HDLC procedure if the transmission side and receiving side apparatuses are adaptable to a high level procedure. Although this embodiment employs a facsimile system adapted to the G3 procedure, the present invention may be applied to another protocol other than the G3.

Although this embodiment is arranged in such a manner that reading of the original document is commenced in the transmission side apparatus when the NSS/DCS code is transmitted, the present invention is not limited to this. Another arrangement may be employed in which the original document is read, and outline data is stored in the image memory before the calling is made.

Second Embodiment

Figure 1:
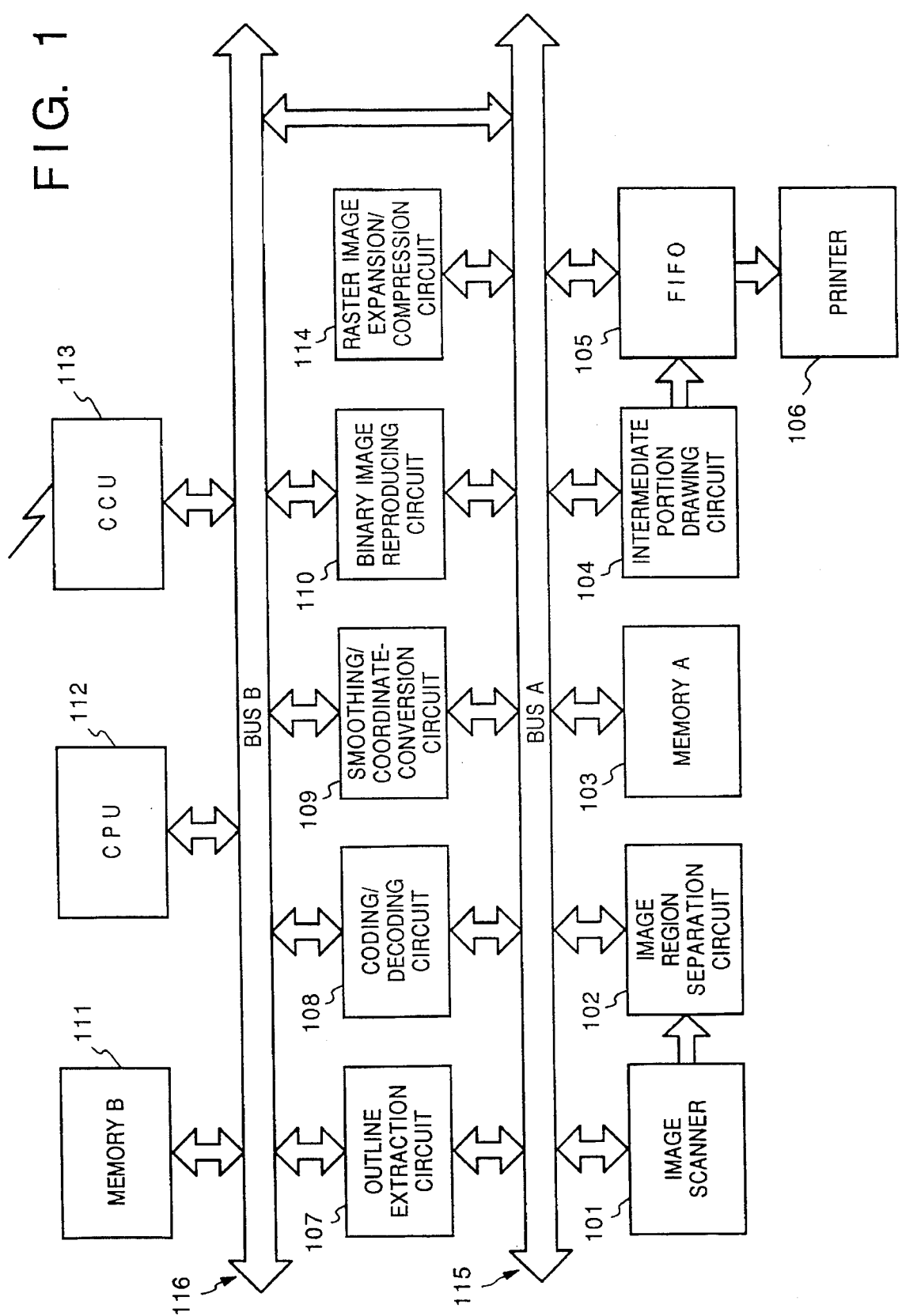
FIG. 1 is a block diagram which illustrates an image processing apparatus according to a second embodiment of the present invention.

FIG. 1 is a block diagram which illustrates an image processing and communication apparatus according to a second embodiment. Referring to FIG. 1, reference numeral 101 denotes an image scanner for A/D converting image data read by a photoelectric conversion device such as a CCD in the sequential order to raster scanning operation. The digital multi-value data converted by A/D conversion is binarized so as to transmit binary raster image data to a bus A115. Binary raster image data transmitted to the bus A is temporarily stored in a memory A103.

Reference numeral 102 denotes an image region separation circuit which receives raster scanned multi-value data (for example, 8 bit/pixel in the case where 256 gradations for one pixel) supplied from the image scanner 101, and separates half tone regions and character and line regions from one another so as to cause an image region separation table (to be described later) for each image area to be formed in the memory A103. It should be noted that the binary images such as the characters and lines and the half tone images can be discriminated by examining the value of supplied multi-value data. Since a binary image usually has only white (the lowest density) and black (the highest density), the density is rapidly changed in the regions (edges) in which the two states are position adjacently. On the contrary, the density is changed moderately in the half tone image because the density is gradually changed. Hence, a discrimination can be made as to whether or not the subject pixel is positioned in the edge of the binary image or in the edge of the half tone image. Incidentally, the technology to distinguish the binary image such as the character and lines and the half tone image has a known technology, and it can be realized by another operation. Another structure may be employed in which the type or the like of the read original document may be instructed by an operation.

Reference numeral 107 denotes an outline extraction circuit which reads binary raster image data stored in the memory A103 and reads, if necessary, the image separation table for separating the image regions so as to form outline coordinate data strings in a memory B111.

Reference numeral 108 denotes a coding/decoding circuit which reads binary raster image data stored in the memory A103, and encodes and compresses the MH, MR or MMR binary image so as to cause the memory B111 to store the encoded image data in the case where the encoding process is performed. In the case where the decoding process is performed, the coding/decoding circuit 108 receives encoded image data stored in the memory B111 so as to transmit decoded binary raster image data to the memory A103.

Reference numeral 109 denotes a smoothing and coordinate conversion circuit which receives the outline coordinate data strings stored in the memory B111 so as to perform a variety of coordinate conversion processes (multiplication with a ratio of expansion or compression and interchanging x- with y-coordinates and the like) and the smoothing process for smoothing the rough (jagged) portion of the outline generated at the time of the enlargement. Then, the smoothing and coordinate conversion circuit 109 forms converted outline coordinate data strings in the memory B111.

Reference numeral 113 denotes a communication control circuit (CCU) which receives image data (the outline coordinate data strings, or image encoded data and, if necessary, the region separation table) stored in the memory B111 so as to transmit image data to the data line. The communication control circuit (CCU) 113 causes image data received through the data line to be stored in the memory B111.

Reference numeral 110 denotes a binary image reproducing circuit which receives the outline coordinate data strings stored in the memory B111, and which draws an outline in the memory A103 in accordance with outline coordinate data so as to form a binary raster image (a bit map image).

Reference numeral 104 denotes an inside drawing circuit which receives the binary raster image (the bit map image) in the memory A103 formed by drawing the outline, and which draws the closed region surrounded by the outline so as to transmit the thus formed image to an FIFO memory 105.

The FIFO memory 105 again horizontally and vertically synchronizes with the printer so as to transmit binary raster image data to the printer 106.

Reference numeral 106 denotes a printer such as an LBP printer which receives binary raster image data, which has been again synchronized with the FIFO 105, so as to record image data on a recording paper sheet.

Transmission Process

Figure 2A:
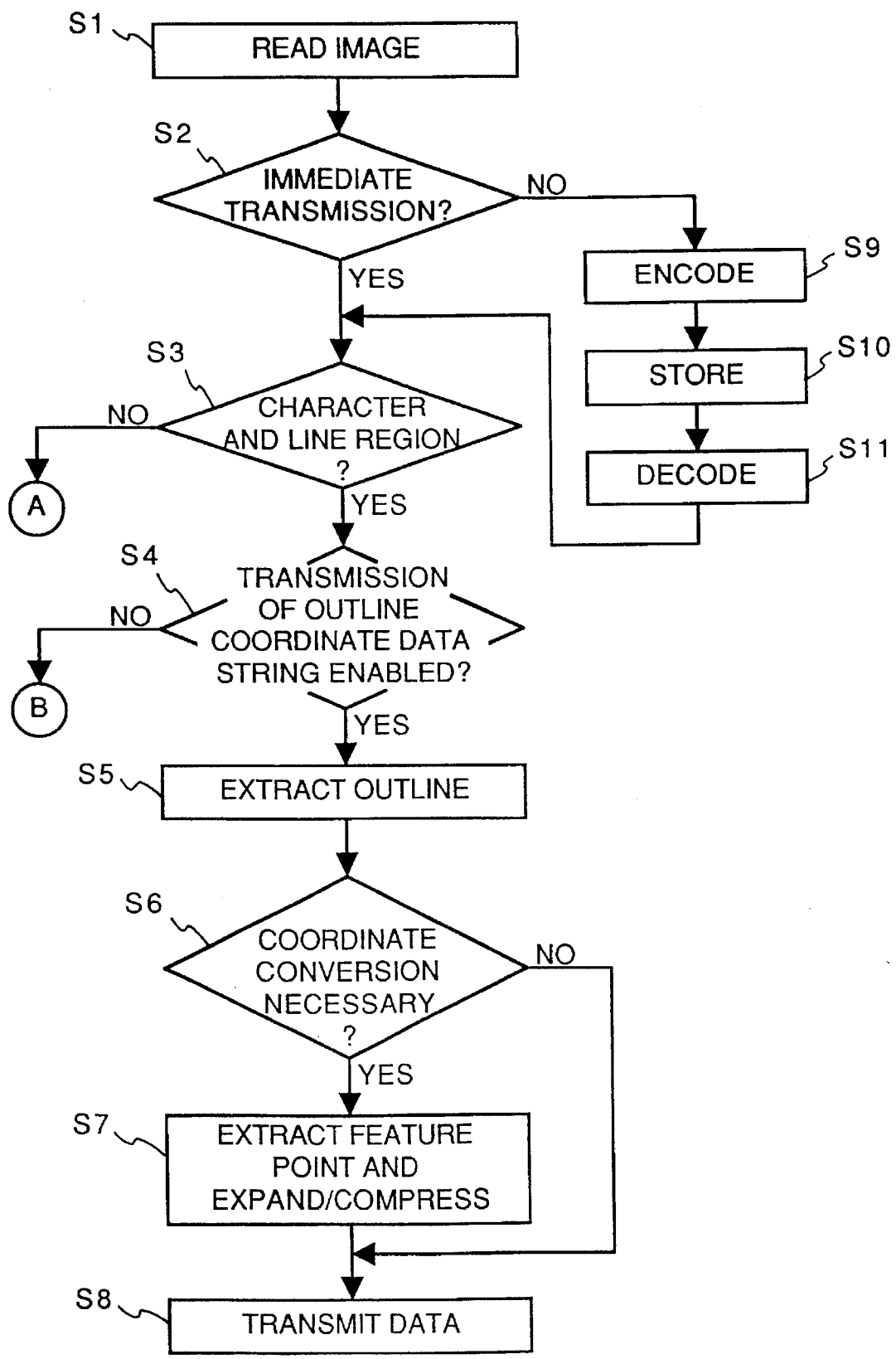
FIGS. 2A to 2C are flow charts which illustrate a transmission process according to the second embodiment of the present invention.
Figure 2B:
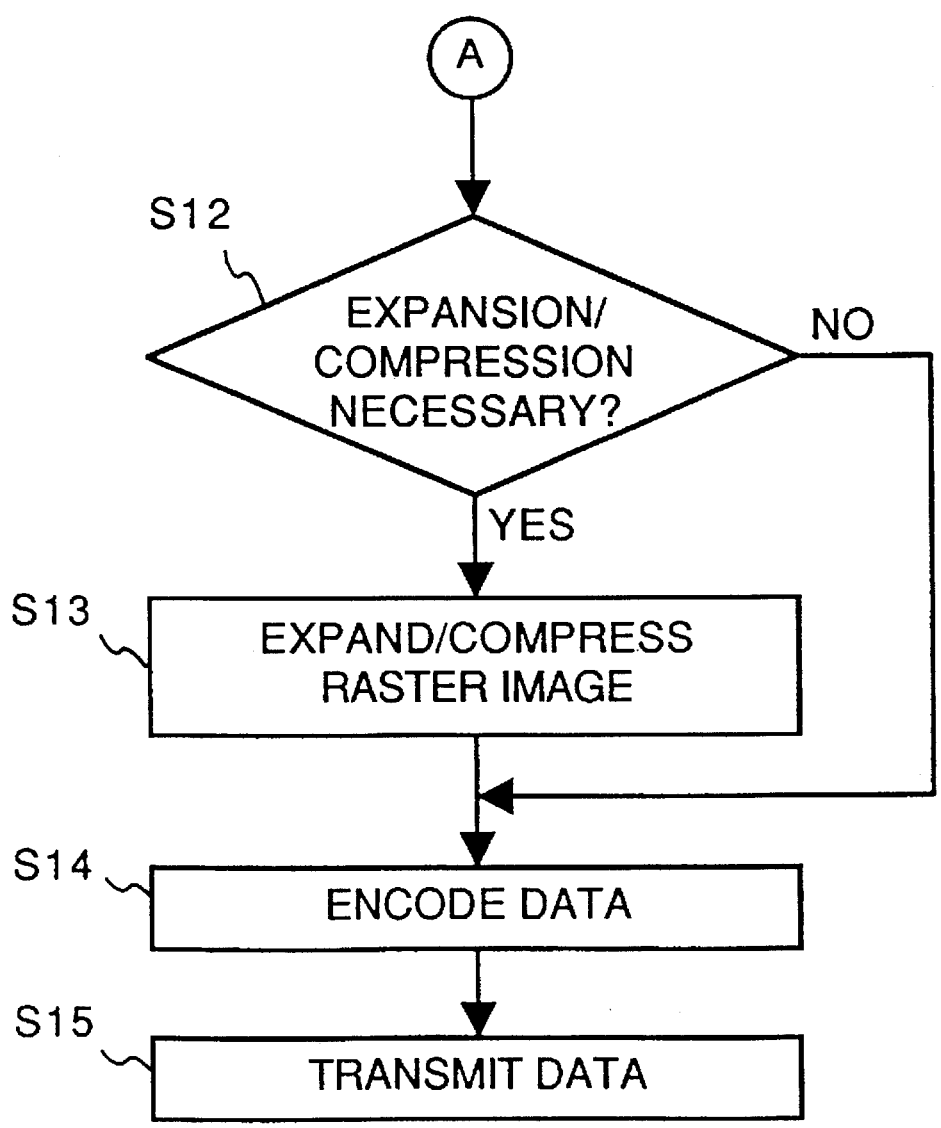
Figure 2C:
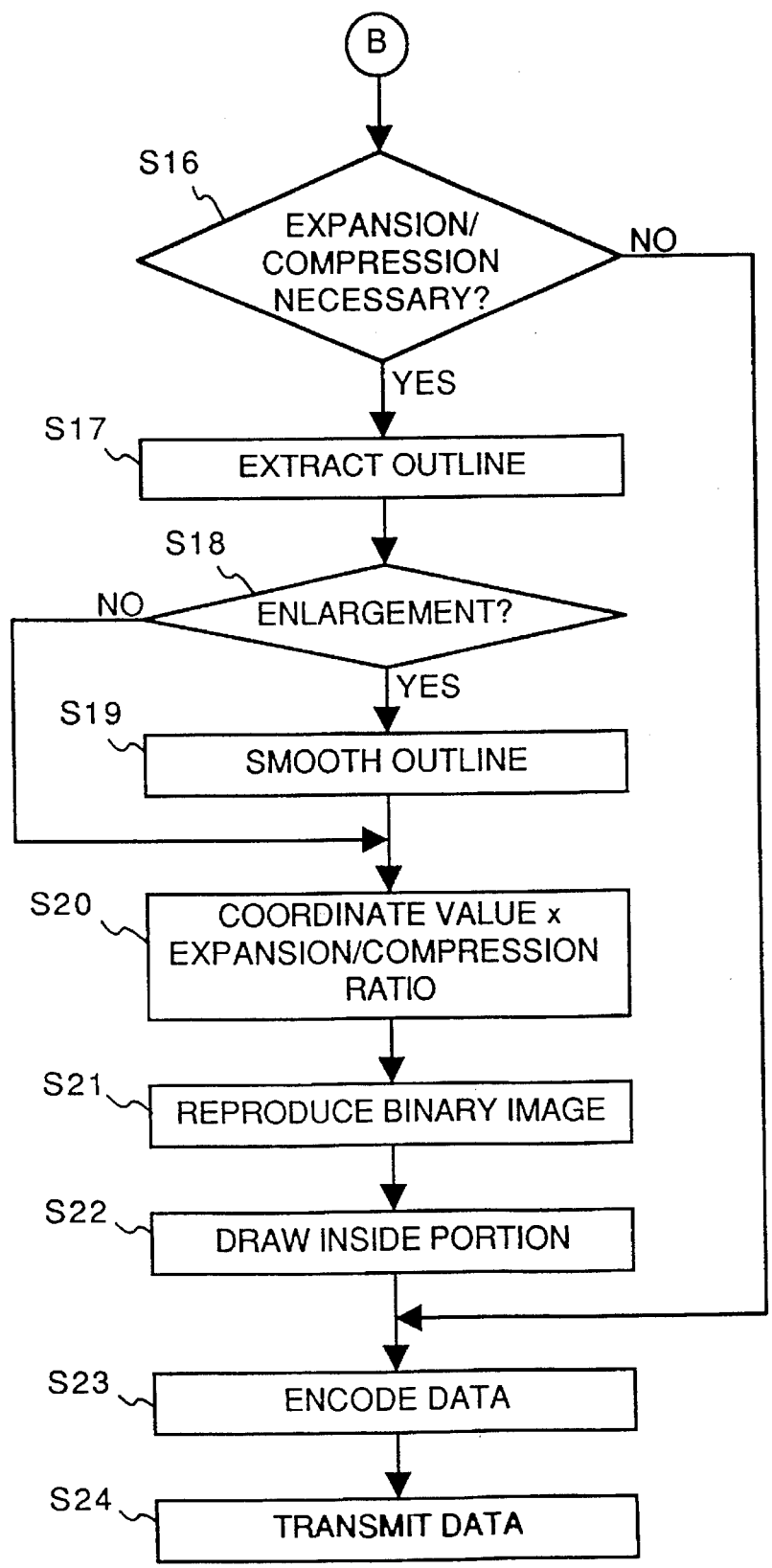
Figure 3A:
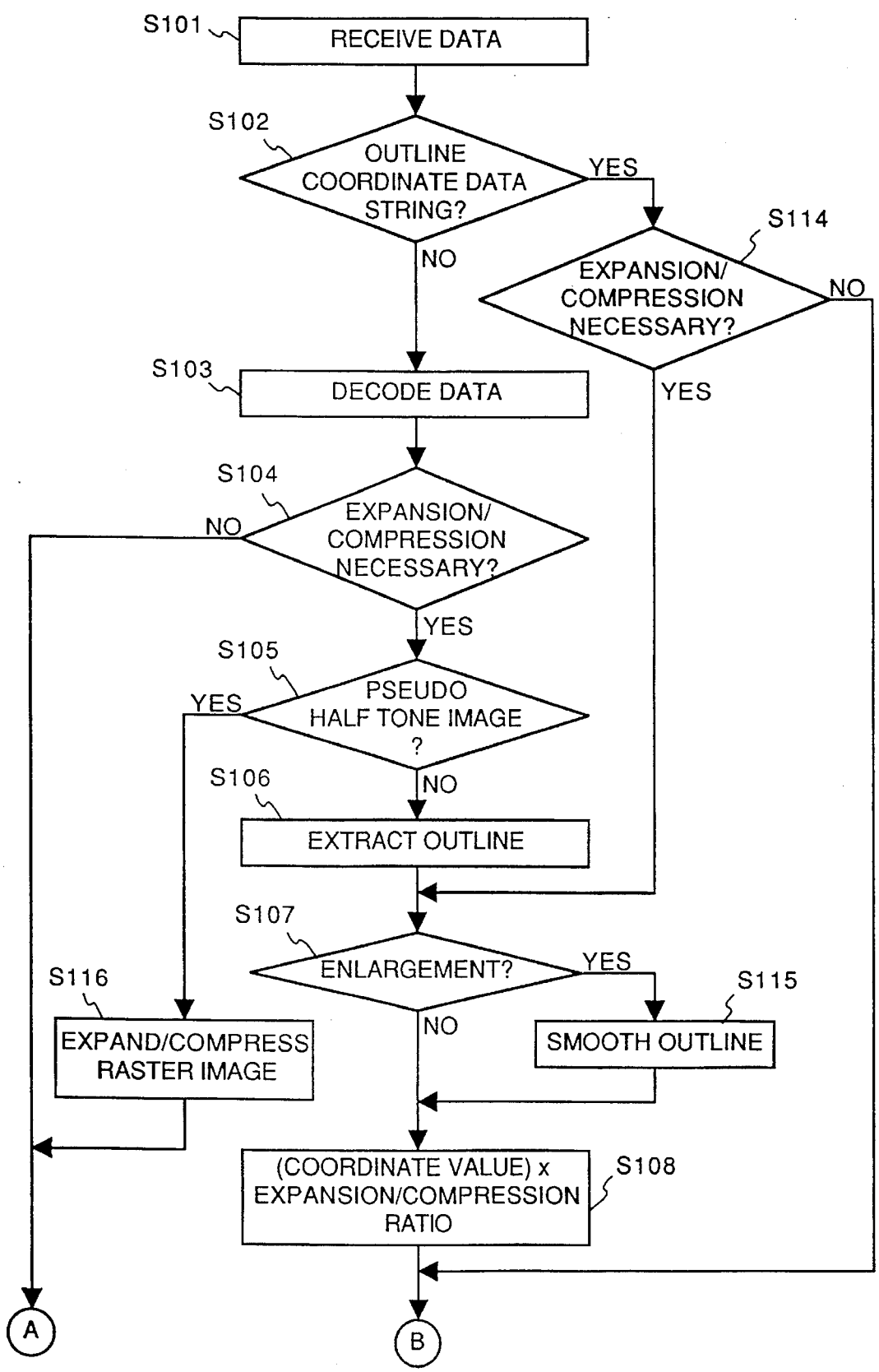
FIGS. 3A and 3B are flow charts which illustrate a receiving process according to the second embodiment of the present invention.
Figure 3B:
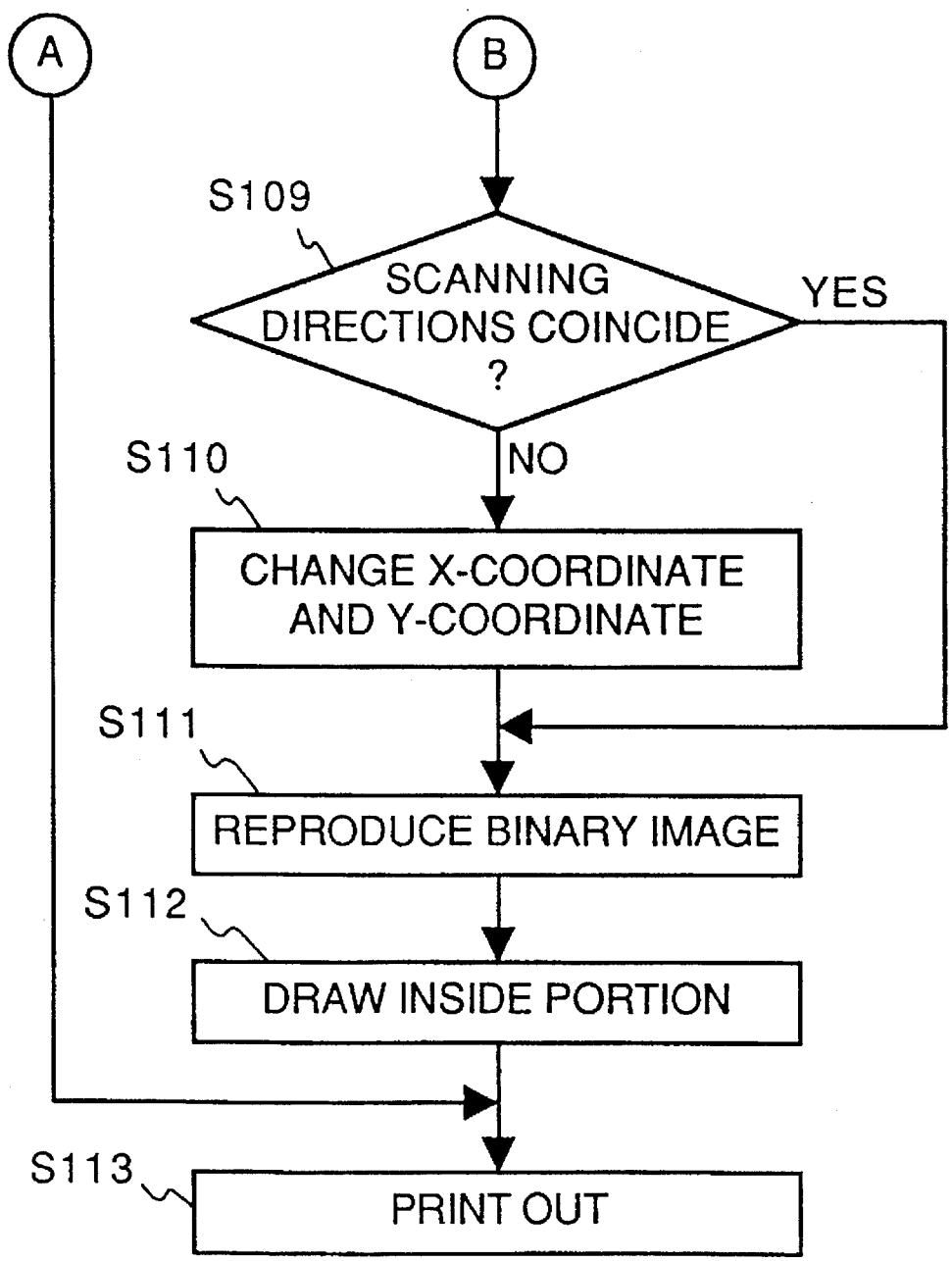
Figure 4:
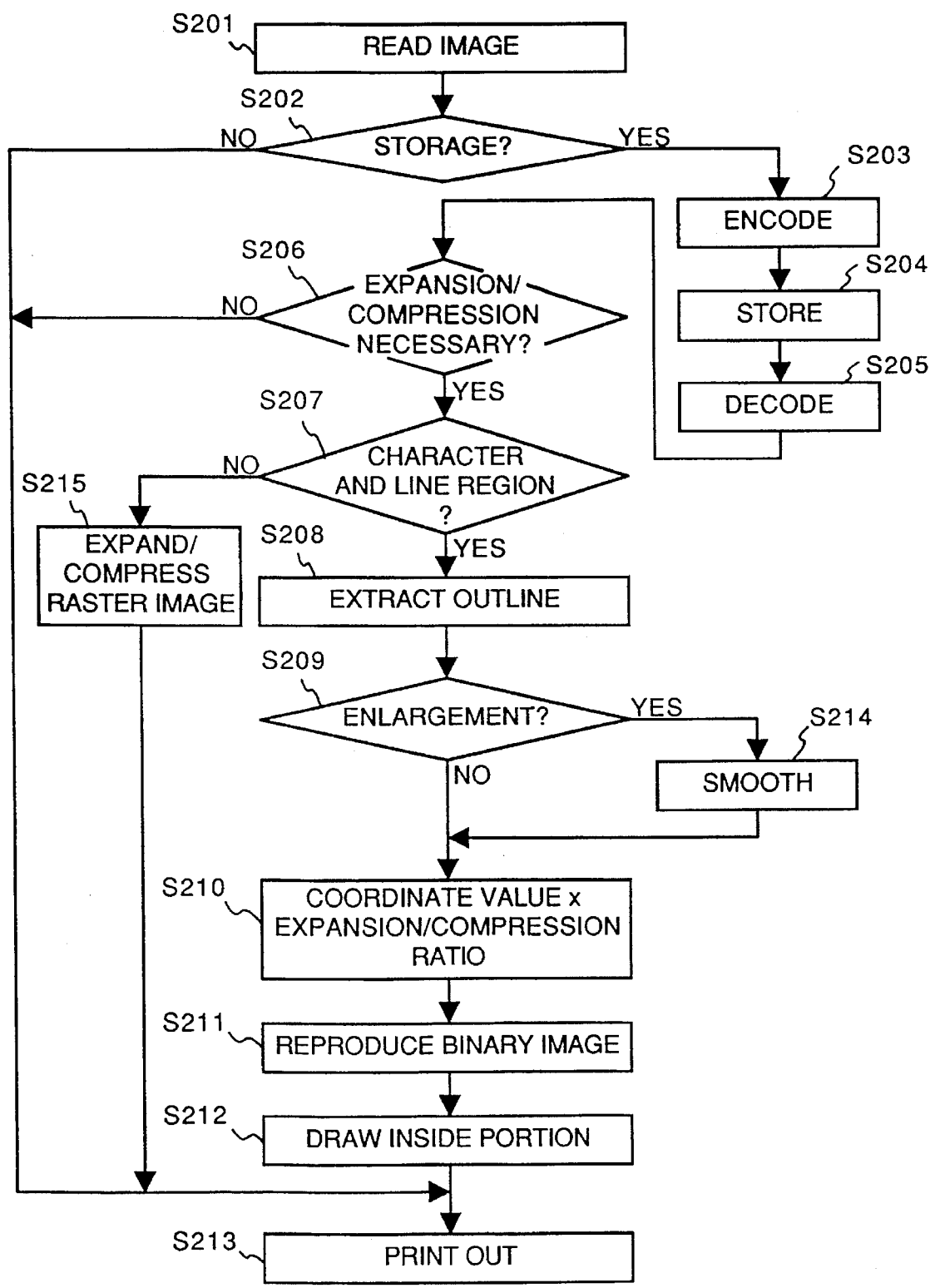
FIG. 4 is a flow chart which illustrates a copying process according to a second embodiment of the present invention.

The flow of image data in the image processing and communication apparatus according to this embodiment, that is, the transmission operation will now be described with reference to a flow chart shown in FIGS. 2A to 2C, the receiving operation will be described with reference to a flow chart shown in FIGS. 3A to 3B, and the copying operation will be described with reference a flow chart shown in FIG. 4.

In step S1, an image is, as binary raster image data, read by the image scanner 101 so as be transferred and stored in the memory A103. In the case other than the immediate transmission, that is, if the transmission of image data is not performed immediately, image data stored in the memory A103 is encoded and compressed by the coding/decoding circuit 108, the encoded and compressed data is stored in the memory B111 as an image file, and it is decoded at the time of transmission before it is developed in the memory A103 as a binary raster image as shown in steps S9, S10 and S11, so that the memory is effectively utilized. Simultaneously with the storage of the binary raster image, multi-value raster image data obtained by the image scanner is transmitted to the image region separation circuit 102. The image region separation circuit 102 discriminates whether the subject portion is the character and line region or the half tone region for each block (a predetermined region) so as to form, in the memory A103, a region discrimination table showing the characteristics of the image region. The encoded image data file, which has been stored, and the region discrimination table file, of course, have the same file attribute and they are taken out when they are required.

In the case where it is apparent that pseudo half tone is used in accordance with whether or not a selection button (a half tone button provided in an operation portion omitted from illustration) for selecting whether or not a pseudo half tone process is performed at the time of the binary coding process is depressed, the image region separation table for each image region is not formed, but only the image attribute showing whether the pseudo half tone or the character/line is recorded by a quantity of one page.

In step S3, the region discrimination table showing whether the character/line region or the pseudo half tone region is read from the memory A103. If the subject region is the character/line region, the flow proceeds to step S4. If it is the half tone region, the flow is branched to step S12. If the discrimination is made that the subject region is the half tone region and the flow proceeds to step S12, a discrimination is made that expansion/compression must be performed, the expansion/compression process for each raster, which is the process of expanding/compressing the binary raster image, is performed similarly to the convention G3 or G4. Then, coding so as to be adaptable to the data line is performed, and image data is transmitted.

If the image region discrimination table is transmitted at this time, the region discrimination table stored in the memory A03 is transferred to the memory B111 so as to be transmitted.

If a discrimination is made in step S4 that outline coordinate data strings can be transmitted because the receiving side has a function of reproducing the binary raster image from the outline coordinate data strings, the aforesaid fact is notified from the receiving side to the transmission side, and the flow proceeds to step S5. If the receiving side is constituted by only the function of conventional G3 or G4 and therefore it cannot receive the outline coordinate data strings, the flow proceeds to step S16. In step S16, a discrimination is made as to whether or not the expansion/compression must be performed. If it must be performed, the flow proceeds to step S17 in which the expansion/compression process is performed in accordance with the outline coordinate data strings. If it does not need to be performed, the flow proceeds to step S23 in which the coding process is performed before image data is transmitted.

In step S17, binary raster image data stored in the memory A103 is supplied to the outline extraction circuit 102, and binary raster image data is converted into the outline coordinate data strings. Then, the outline coordinate data strings are stored in the memory B111. In step S18, a discrimination is made as to whether or not a process of enlarging the outline coordinate data strings stored in the memory B111 must be performed. If the enlargement process must be performed, the flow proceeds to step S19. If it does not need to be performed, the flow proceeds to step In step S19, the outline coordinate data strings supplied from the memory B111 are received so as to perform an outline smoothing process to be described later is performed, and then the flow proceeds to step S20. In step S20, each coordinate value is multiplied by a ratio of expansion/compression so as to be converted into coordinate values adapted to the transmissible resolution. In step S21, the converted outline coordinate data strings are transmitted to the binary image reproducing circuit 111 from the memory B111 so as to draw the outline on the bit map image stored in the memory A103. In step 22, the image bit map, the outline of which has been drawn by the inside drawing circuit 104, is taken for each raster so as to develop it in the memory A103 as a binary raster image which has been subjected to the inside drawing process.

In step S23, the aforesaid image data is coded so as to be adapted to the communication mode is performed by the coding/decoding circuit 108, so that coded data is transmitted to the memory B111. If the G4 mode is employed, coded image data, which has been transmitted to the memory B111, is transmitted by the CCU 113. In the case of the G3 mode, a MODEM (omitted from the illustration) is used to transmit the coded image data.

Processes on and after step S5 will now be described. If the image region to be transmitted is the character/line image and the receiving side is able to receive outline coordinate data, the flow proceeds to step S5. Image data transferred as the character/line region to the outline extraction circuit 107 from the memory A103 is subjected to a process in which all of its pixels are scanned while updating a rough outline coordinate data table, and image data is finally converted into the outline coordinate data strings which are stored in the memory B111. In step S6, a discrimination is made as to whether or not the expansion/compression of image data converted into the outline coordinate data strings must be performed. If the expansion/compression must be performed, the flow proceeds to step S7 in which image data stored in the memory B111 is transferred to the to the smoothing/coordinate conversion circuit 109 so as to multiply the coordinate values by a ratio of expansion/compression. If necessary, the coordinate strings are traced so as to leave a featured point in the outline coordinate data strings. If the enlargement process is performed, the smoothing conversion operation is performed. If a discrimination is made as a result of tracing that image can be restored by the smoothing process, the effective number of digits of the coordinate value of coordinate data is decreased, so that the quantity of data is compressed. Then the outline coordinate data strings, the coordinates of which have been converted by the smoothing/coordinate conversion circuit 109, are returned to the memory B111. In step S8, image data, the transmissive resolution and the receipt resolution are made coincide with each other, is transmitted by the CCU 113. If the G3 mode is employed, it is similarly transmitted by a MODEM (omitted from illustration).

If occurrence of a communication error is taken into consideration, the outline coordinate data strings can be transmitted and received by correcting a protocol error and by again transmitting the image which has encountered an error in the case where the image is communicated as the outline coordinate data if the G4 CCU is employed as the communication apparatus. In the case where the G3 communication apparatus is employed which uses the MODEM, data transmission and receipt must be performed by using HDLC in the ECM. Therefore, the outline coordinate data strings are transmitted and received in accordance with the G3 procedure through the MODEM by using a conventional telephone line, a forced ECM mode is realized, and switching to an image data transmission, which uses the conventional MH and MR codes, is performed and the conventional G3 mode is employed to communicate the image if the re-transmission of the ECM takes place frequently due to the state of the data line, or if the ECM transmission and receipt cannot be performed.

Receiving Process

The receipt process to be performed by the apparatus according to this embodiment will now be described with reference to a flow chart shown in FIGS. 3A and 3B.

In the receipt operation to be performed in step S101, the CCU 113 or a MODEM (omitted from illustration) is used to receive image data. The received image is MH, MR or G4 coded image data formed in accordance with the conventional G3 procedure or the outline coordinate data strings transmitted by the image processing and communication apparatus according to this embodiment. Received image data is temporarily stored in the memory B111.

In step S102, a discrimination is made as to whether or not received image data is the outline coordinate data strings transmitted by an apparatus of the same type as the image processing and communication apparatus according to this embodiment.

If a discrimination is made that received image data is image data transmitted by the apparatus according to this embodiment, the flow branches to step S114. If a discrimination is made that it is MH, MR, or MMR coded data received from an ordinary facsimile apparatus, the flow proceeds to step S103.

In step S114, a discrimination is made as to whether or not the expansion/compression of the received image data must be performed. If a discrimination is made that the expansion/compression must be performed, the flow proceeds to step S107 in which an expansion/compression process, in which the outline coordinate data strings are used, is performed. If the expansion/compression process does not need to be performed, the flow proceeds to step S109 in which a discrimination is made as to whether or not the scanning directions coincide with each other. Then, image data is again converted from the outline coordinate data strings to binary raster image data, and image data is printed out.

If a discrimination is made that received image data is MH, MR or MMR-coded image data and the flow therefore proceeds to step S103, received data is transferred to the coding/decoding circuit 108 in which it is decoded to binary raster image data, and decoded data is stored in the memory A103. In next step S104, a discrimination is made that the expansion/compression must be performed when received image data is printed out. If a discrimination is made that the expansion/compression must be performed, the flow proceeds to step S105. If it does not need to be performed, the flow proceeds to step S113 in which binary raster image data is transferred from the memory A103 to the FIFO 105 so as to be again synchronized with the printer 106, and then, binary raster image data is printed out.

In step S105, a discrimination is made from the region discrimination (the image attribute or the region discrimination table) that received image data is a pseudo half tone image or a character/line image. Image data blocks discriminated to be the pseudo half tone image data are subjected to a process to be performed in step S116 in which the image blocks are transferred to the raster image expansion/compression circuit 114 so that the image blocks are expanded/compressed as a binary raster image. Image blocks discriminated to be the character/line region is transferred to the outline extraction circuit 107 in which the image blocks are, as outline coordinate data strings to be described later, subjected to a expansion/compression process.

In step S106, binary raster image data of a character/line image stored in the memory A103 is transferred to the outline extraction circuit 107 in which binary raster image data is converted into outline coordinate data strings so as to be stored in the memory B111.

In step S107, a discrimination is made as to whether or not either the sub-scanning or the main scanning is subjected to the enlargement process. If it is subjected to the enlargement process, the flow proceeds to step S115 in which the outline coordinate data strings stored in the memory B111 are transferred to the smoothing/coordinate-conversion circuit 109 so as to perform a first smoothing process and a second smoothing process in which tracing pattern matching of the outline coordinate strings is performed, so that outline coordinate data other than corner point is smoothed. As a result of this process, rough portions in diagonal lines formed at the time of the enlargement process can be smoothed. The term "corner point" used hereinbefore will be described later in detail but briefly it is meant a point, the coordinate position of which is not changed even it has been subjected to the smoothing process.

In step S108, each of the outline coordinate data strings or the outline coordinate data strings, the outlines of which have been smoothed, is multiplied with the ratio of expansion/compression, so that each coordinate string is converted into coordinate data which is adapted to the resolution of the printed output.

In step S109, a discrimination is made as to whether or not the image data scanning direction is different from the image scanning direction at the time of the recording process in the case where, for example, a B5 size image read longitudinally is outputted as a horizontal A4 size image. In this case, the flow proceeds to step S110 in which the x-coordinate and the y-coordinate of the outline coordinate data strings are transposed and the result of the transpostion is stored in the memory B111. If the transposition of the coordinates does not need to be performed, the read image is as it is stored in the memory B111.

In step S111, the outline coordinate data strings, which are stored in the memory B111, and the pixel density of each of which has been converted, are received by the binary image reproducing circuit 110, and a portion of the memory A103 is used to store the bit map image of the output image so as to draw the outline of the bit map image.

In step S112, image data, the outline of which has been drawn, is, for each raster, taken out from the memory A103, and the portion surrounded by the outline is drawn by the inside drawing circuit 104, and image data is transferred to the FIFO 105. At this time, outline coordinate data is again converted into binary raster image data. In the case where the flow proceeds from step S104 or step S105 to step S113, the binary raster image stored in the memory A103 is transferred to the FIFO 500 so as to be printed.

Binary raster image data transferred to the FIFO105 is again synchronized with the printer 106 in step S113 so as to be outputted from the printer 106 as a raster image.

Copying Process

The copying process will now be described with reference to a flow chart shown in in FIG. 4.

In step S201, an original document is read. In this case, the storage of the file does not need to be performed as is in the case of the immediately copying operation, the flow proceeds from step S202 to step S213 in which image data outputted from the image scanner 101 is transferred to the FIFO 105 via the memory A103 so as to be printed out. The reason why it is temporarily stored in the memory A103 lies in that the difference between the speed of the image scanner and that of the printer must be absorbed. If the recording speed can be changed as in the case of a thermal printer, image data is directly transferred to the FIFO 105 so as to be outputted as described above. If the immediately copying operation is performed, the reading resolution of the image scanner 101 is made to be the same as that of the output from the printer, resulting in that the necessity of performing a process to be eliminated and that a necessity lies in that the aforesaid transferring process is performed.

If an instruction is made to perform copying after image data has been stored as a file in place of the immediately copying operation, the flow proceeds to step S203 in which coding and compressing operation is performed in order to improve the efficiency of memorizing the image file. In this embodiment, the binary raster image stored in the memory A103 is transferred to the coding/decoding circuit 108 so as to be converted into an MH code or the like, so that it is transferred to and stored in the memory B111. The coding and compressing process may, of course, be performed by any of a variety of compression methods other than the MH coding method. A compressing method peculiar to the apparatus according to the present invention may be employed. Image data stored temporarily is again read out from the memory B111 at the time of the printing out operation as shown in steps S204 and S205, and is decoded by the coding/decoding circuit 108 so as to be developed in the memory A103 as binary raster image data.

In step S206, a discrimination is made as to whether or not the expansion/compression of the stored image file must be performed. The aforesaid discrimination is made on the basis of a fact that the size of the original document image is different from that of a recording medium of the apparatus or a fact that the expansion/compression is instructed by an operator. If the expansion/compression does not need to be performed, the flow proceeds to step S213 in which image data is, for each raster, transferred to the FIFO 105, is again synchronized with the printer 106 so as to be printed out. If the expansion/compression process is performed, the flow proceeds to step S207 in which, as described in the transmission process, a discrimination is made on the basis of the region discrimination table whether the stored image file is a pseudo half tone image or a character/line image. In step S215, if the image file is the pseudo half tone image, the decoded image is transferred to the raster image expansion/compression circuit 114 in which the expansion/compression is performed while maintaining the state of the binary raster image before it is returned to the bit map image memory of the memory A103. In step S215, if a discrimination is made in step S207 that the image is the character/line image, the flow proceeds to step S208 in which the blocks discriminated to be the character/line regions are sequentially transferred to the outline extraction circuit 107, so that binary raster image data is converted into the outline coordinate data strings which sre stored in the memory B111 as the outline coordinate data strings. In the case where an enlargement process is, as described in the receiving process, performed in which image data stored with, for example, the G3 standard resolution (main scanning: 8 pel/mm, sub-scanning: 3.85 pel/mm) is outputted to a printer, the resolution of which is 400 dpi, the first and second smoothing processes to be described later are performed in the smoothing/coordinate-conversion circuit in order to perform the smoothing process in step S214.

In step S210, each coordinate of the outline coordinate data strings or the smoothed outline coordinate data strings is multiplied by the ratio of expansion/compression so as to be converted into the outline coordinate data adaptable to the resolution and the size of the printed-out image. In step S211, image data converted into the outline coordinate data strings of the printed-out image is transferred to the binary image reproducing circuit 110, so that the outline is drawn in the bit map image memory of the memory A103 by the binary image reproducing circuit 110. In step S212, binary raster image data, which has been formed in the memory A103, and the outline of which has been drawn, is, for each raster, read out so as to be transferred to the FIFO 105 in which it is synchronized with the printer as shown in step S213 so as to be printed out.

Although the aforesaid processes are described sequentially, the decoding process, the outline extraction process, the smoothing process, the coordinate conversion process, the binary image reproducing process and the inside drawing process can be performed in parallel by performing each process for each block, resulting in the through-put of the system to be improved. Among the processes according to his embodiment, a process, which causes a large load to be borne, may be performed during waiting in place of performing it at the time of the transmission and receiving processes.

Each of Processing Circuits

In order to describe the resolution conversion in each processing blocks by using the outline coordinate strings, the outline extraction circuit 107, the smoothing/coordinate-conversion circuit 109, the binary image reproducing circuit 110 and the inside drawing circuit 104 will now be described with reference to the drawings.

Outline Extraction Circuit

Figure 6:
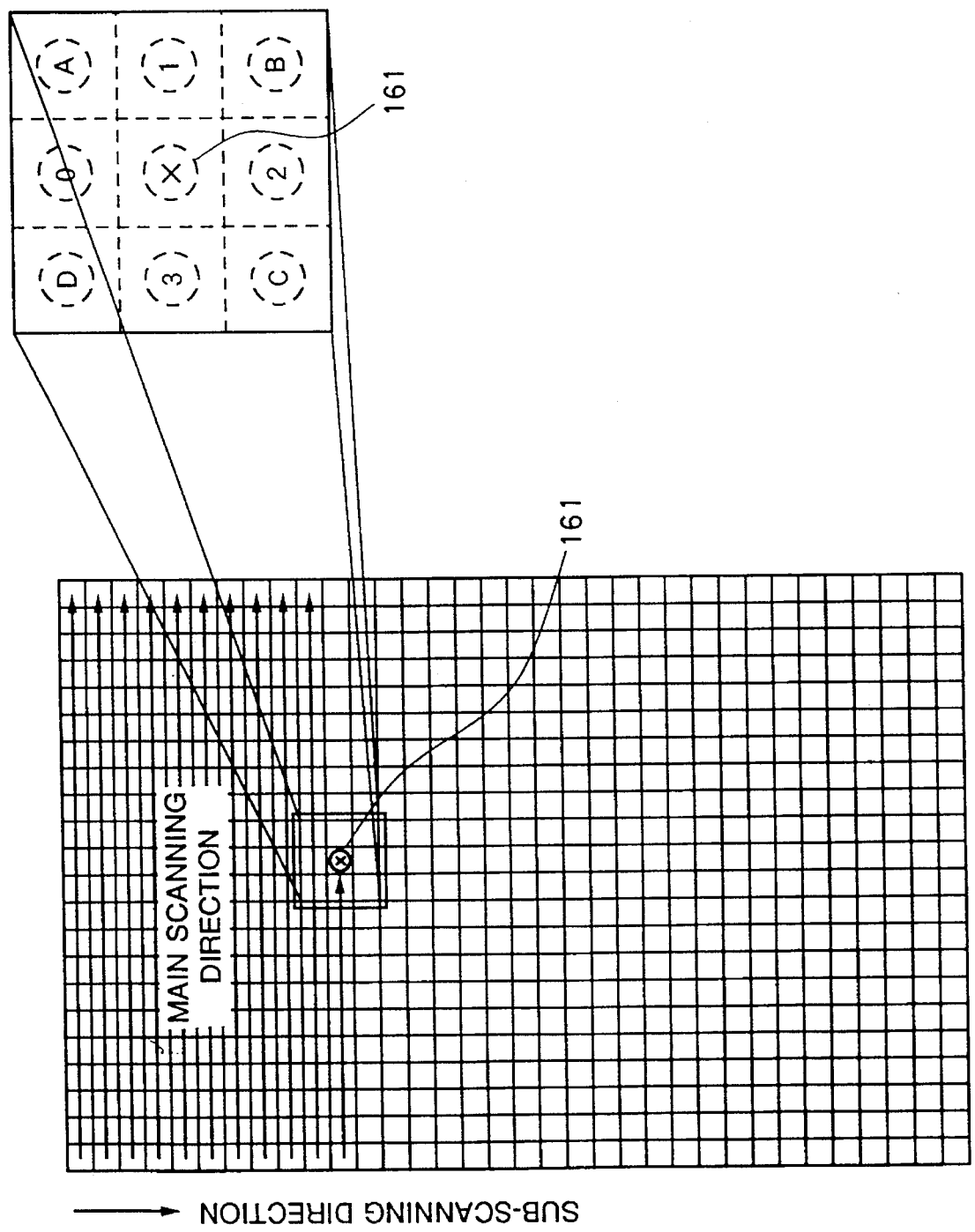
FIG. 6 illustrates an outline vector extraction unit according to a second embodiment of the present invention.

The outline extraction circuit 107 performs the process while observing a subject pixel 161 and adjacent 8 pixels (A, B, C, D, 0, 1, 2, and 3) of the binary image as shown in FIG. 6. The subject pixel is sequentially shifted by one pixel so as to process all of the rasters, so that the overall image is processed. The specific operation is performed as follows. The outline extraction process according to this embodiment is performed in such a way that a black region is positioned to the right in the direction of a vector to be extracted.

The start point and the end point of a rough outline vector to be extracted are, in both the main scanning direction and the sub-scanning direction, positioned at an intermediate position between two pixels. Furthermore, the central position at which the pixel is present is expressed by a plus integer in both the main scanning direction and the sub-scanning direction and the position of the pixel is expressed by two-dimensional coordinates. In the case where the position of a subject pixel of an image having a size of 1728 pixels in the main scanning direction and 2287 pixels in the sub-scanning direction is [3, 7] (it is meant a third pixel in the seventh raster), the rough outline vector coordinate strings surrounding the subject pixel are (2.5, 6.5), (3.5, 6.5), (3.5, 7.5), and (2.5, 7.5) when viewed clockwise. That is, they are the coordinate positions of the four corners while assuming that the subject pixel is in the form of a rectangular. It should be noted that the rough outline vectors are, while assuming that the aforesaid four points are a, b, c and d and expressing a vector by a form of x→y, a→b, b→c, c→d, and d→a.

Figure 5:
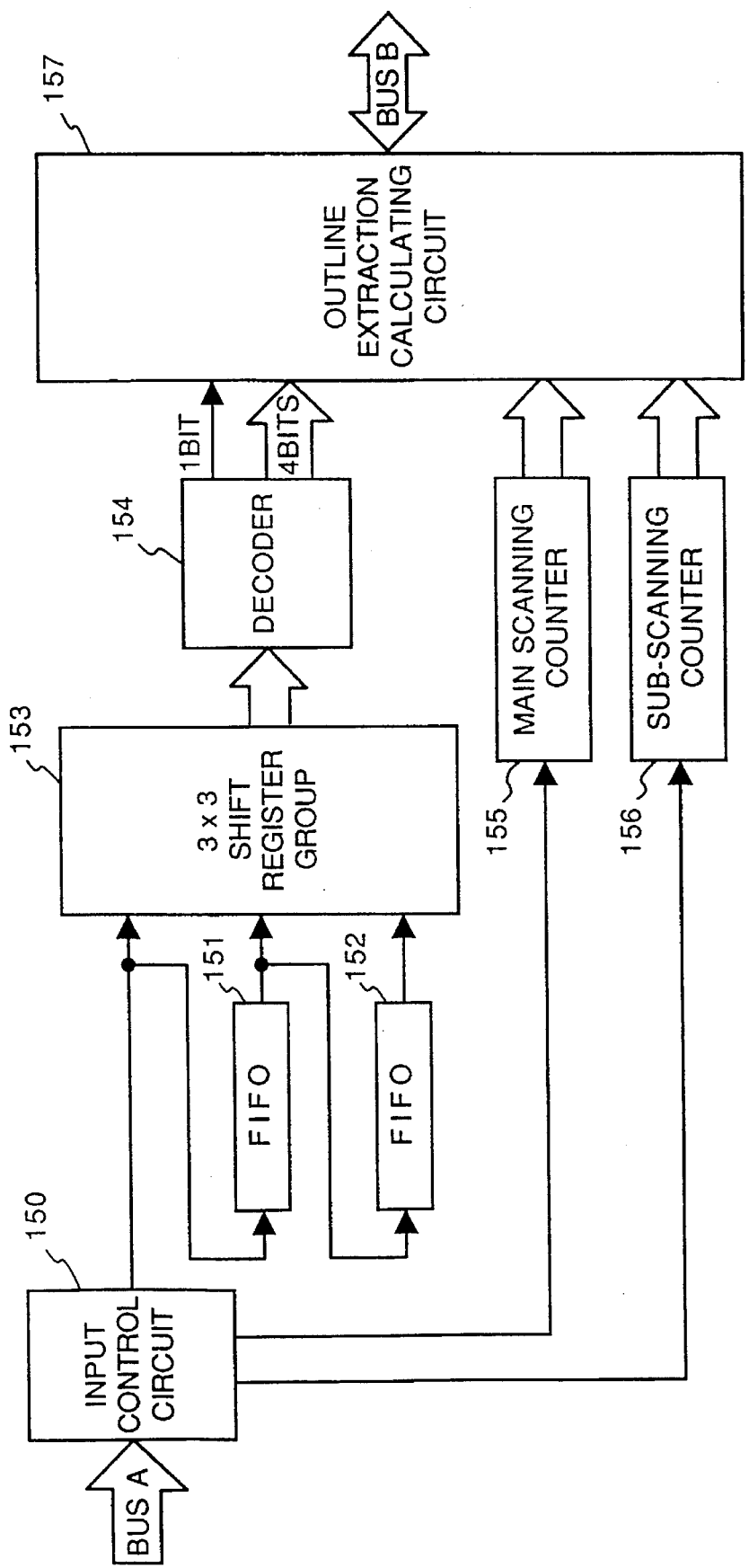
FIG. 5 is a block diagram which illustrates an outline extraction circuit according to the second embodiment of the present invention.

FIG. 5 is a block diagram which illustrates the internal structure of the outline extraction circuit 107. Reference numeral 150 denotes an input control circuit which receives binary raster image data stored in the memory A103 and which outputs it as serial data. It should be noted that the aforesaid data is synchronized with a horizontal and vertical synchronizing signals (omitted from illustration) and is outputted as serial data. Reference numerals 151 and 152 denote FIFO memories for taking out pixel data for three lines in the vertical direction, the FIFO memories 151 and 152 delaying pixel data, supplied while being formed into serial data, by a degree of one line. Reference numeral 153 denotes a 3×3 shift register group which receives an output from the input control circuit 105, an output from the FIFO 151 which is delayed by a degree of one line, and an output from the FIFO 152 which is delayed by a degree of two lines, so as to sequentially receives data for three lines. The received binary image data for three lines is sequentially shifted by one pixel so as to transmit (9-bit) data of 3×3 pixels as shown in FIG. 6 to a decoder 154. The decoder 154 outputs 4-bit numerical data which shows the state of the surrounding 8 pixel except for the subject pixel (x shown in FIG. 6) and the value of the subject pixel to an outline extraction computing circuit 157. The state of the 8 pixels used hereinbefore is information showing the state of the subject pixel, for example, whether or not the subject pixel is positioned on the edge of a binary image. If the subject pixel is positioned on the edge, the aforesaid information shows the direction of a white area (binary data is "0") among the four directions.

Reference numeral 155 denotes a main scanning counter for outputting the position of the subject pixel in the main scanning direction to the outline extraction computing circuit 157. Reference numeral 156 denotes a sub-scanning counter for outputting the position of the subject pixel in the sub-scanning direction to the outline extraction computing circuit 157.

The outline extraction computing circuit 157 extracts the rough outline vector from the output value from the decoder 154 so as to make and update a table containing the coordinates of the starting point of each rough outline vector and item No. information of another rough outline vector flowing in the aforesaid rough outline vector (the end point of which is the start point of the aforesaid vector) and another rough outline vector (the starting point of which is the end point of the aforesaid vector) flowing out from the aforesaid rough outline vector.

The aforesaid rough outline vector will now be described.

In the second embodiment, a vector along the edge of the binary image is extracted. In the case where the vector is extracted while considering the pixel level, there are two types of the vectors, that is, vertical directional vectors and horizontal directional vectors. In other words, the edge of the binary image is an aggregation of a vertical directional vector and a horizontal directional vector. When a certain vertical vector is paid attention although the vector size is varied, a horizontal vector is, without exception, connected to both of the starting point and the end point of the subject vertical vector. That is, a vertical vector is held between horizontal vectors. On the contrary, a horizontal vector is held between vertical vectors. When a certain vector is paid attention, a vector which is connected to the starting point of the subject vector, that is, a vector, the end point of which is the starting point of the subject vector, is called an inflow vector in this embodiment, while a vector, the starting point of which is the end point of the subject vector, is called an outflow vector. By obtaining the relationship of the connection between the vectors, the outline along the edge of the subject binary image can be specified. Each vector is given unique No. so as to specify the vector, and the aforesaid No. shows the relationship of the connection between vectors. The No. which specifies each vector, is called "Item No." hereinafter.

Figure 7:
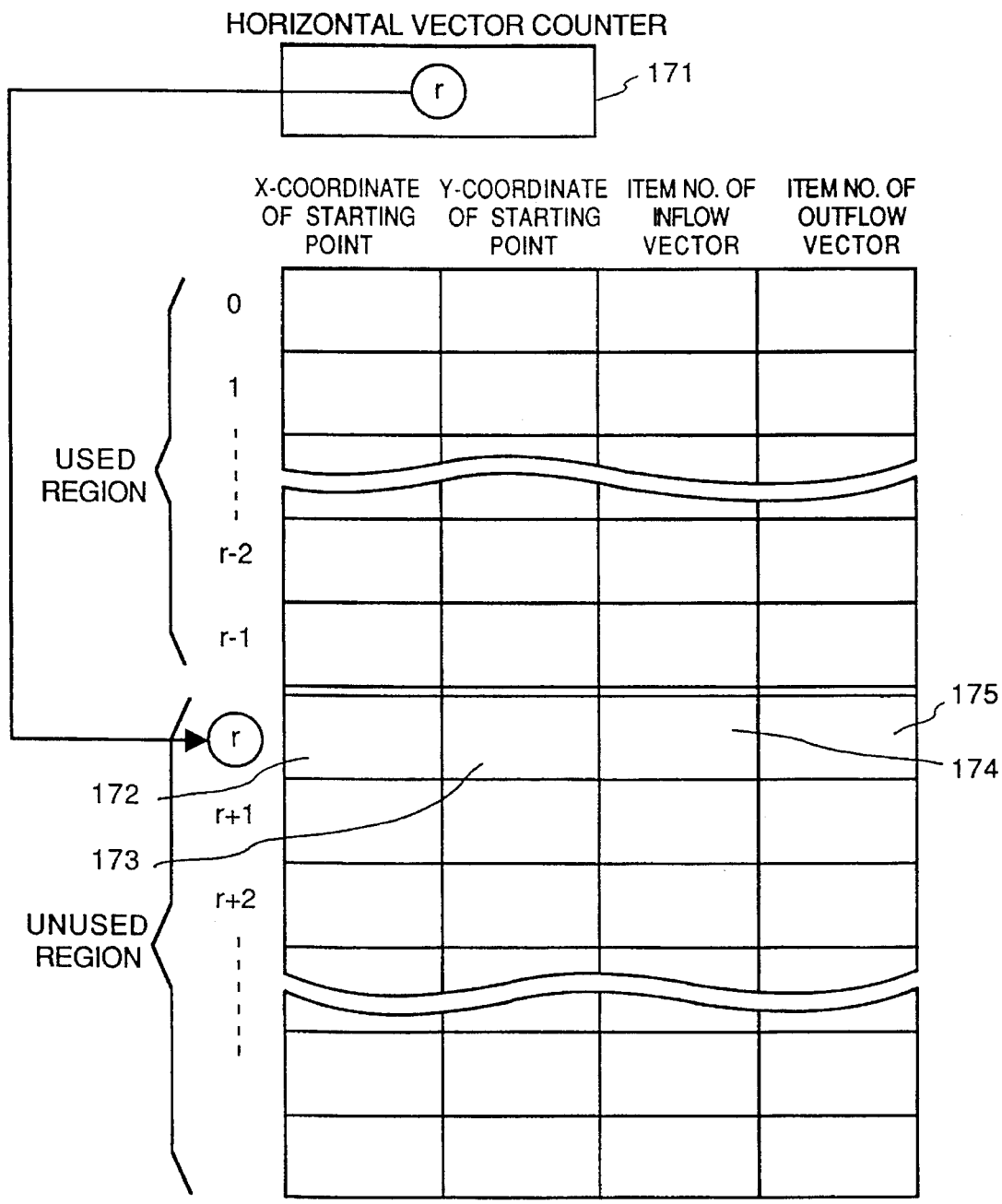
FIG. 7 is a table which shows horizontal directional rough outline vectors according to the second embodiment of the present invention.
Figure 8:
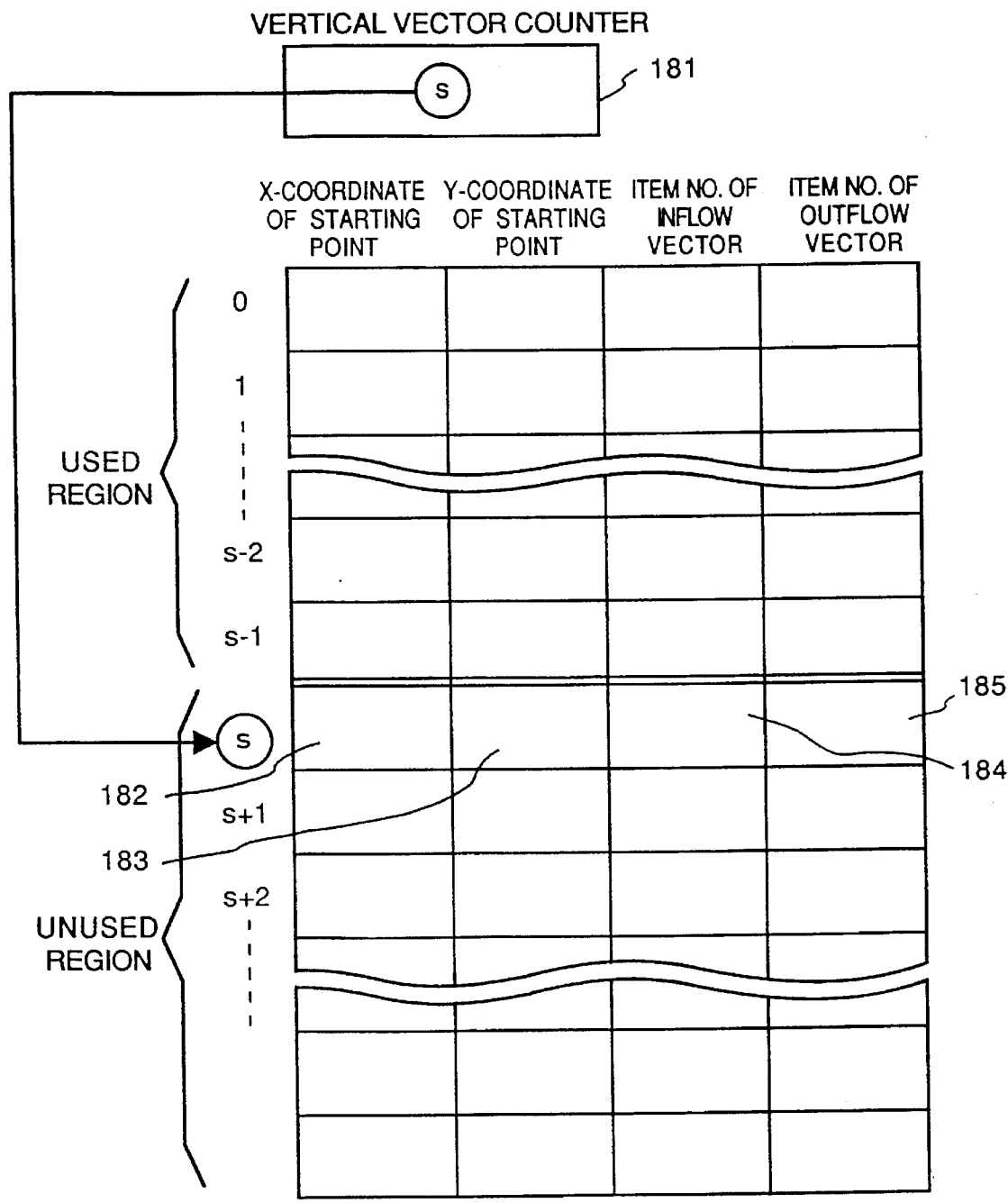
FIG. 8 is a table which shows vertical directional rough outline vectors according to the second embodiment of the present invention.

FIG. 7 illustrates the horizontal directional rough outline vector and FIG. 8 illustrates the vertical directional rough outline vector, which are, in the form of tables, stored in the memory B111.

Referring to FIGS. 7 and 8, reference numeral 171 denotes a counter which shows the item No. of the horizontal directional rough outline vector and the count of which is increased by one when the horizontal rough outline vector increases by one (newly found). Reference numeral 172 denotes an area for use to record the x-coordinate of the starting point of the horizontal directional rough outline vector. Reference numeral 173 denotes an area for use to record the y-coordinate of the starting point of the horizontal directional rough outline vector. Reference numeral 174 denotes an area for storing the item No. of the vertical vector (outflow vector) to be connected to the starting point of the aforesaid horizontal vector. Reference numeral 175 denotes an area for storing the item No. of the vertical vector (outflow vector) to which the end point of the aforesaid horizontal vector is connected. Since the two vectors connected to the horizontal vector are vertical vectors as described above, the areas 174 and 175 store the item No. of each vertical vector to be connected to the horizontal vector.

The aforesaid idea is similarly adapted to the table for the vertical vectors shown in FIG. 8. That is, reference numeral 181 denotes a counter which shows the item No. of the vertical directional rough outline vector and the count of which is increased by one when the vertical rough outline vector increases by one. Reference numeral 182 denotes an area for use to record the x-coordinate of the starting point of the vertical directional rough outline vector. Reference numeral 183 denotes an area for use to record the y-coordinate of the starting point of the vertical directional rough outline vector. Reference numeral 184 denotes an area for storing the item No. of the horizontal vector (inflow vector) to be connected to the starting point of the aforesaid vertical vector. Reference numeral 185 denotes an area for storing the item No. of the horizontal vector (outflow vector) to which the end point of the aforesaid vertical vector is connected.

The rough outline vector is, upon occasion, added to the aforesaid horizontal and vertical directional rough outline vector tables, and the contents of the same are updated whenever one pixel is processed, so as to be completed as the horizontal and vertical directional rough outline vector tables for an image of one frame after the process of one frame has been completed.

Figure 9:
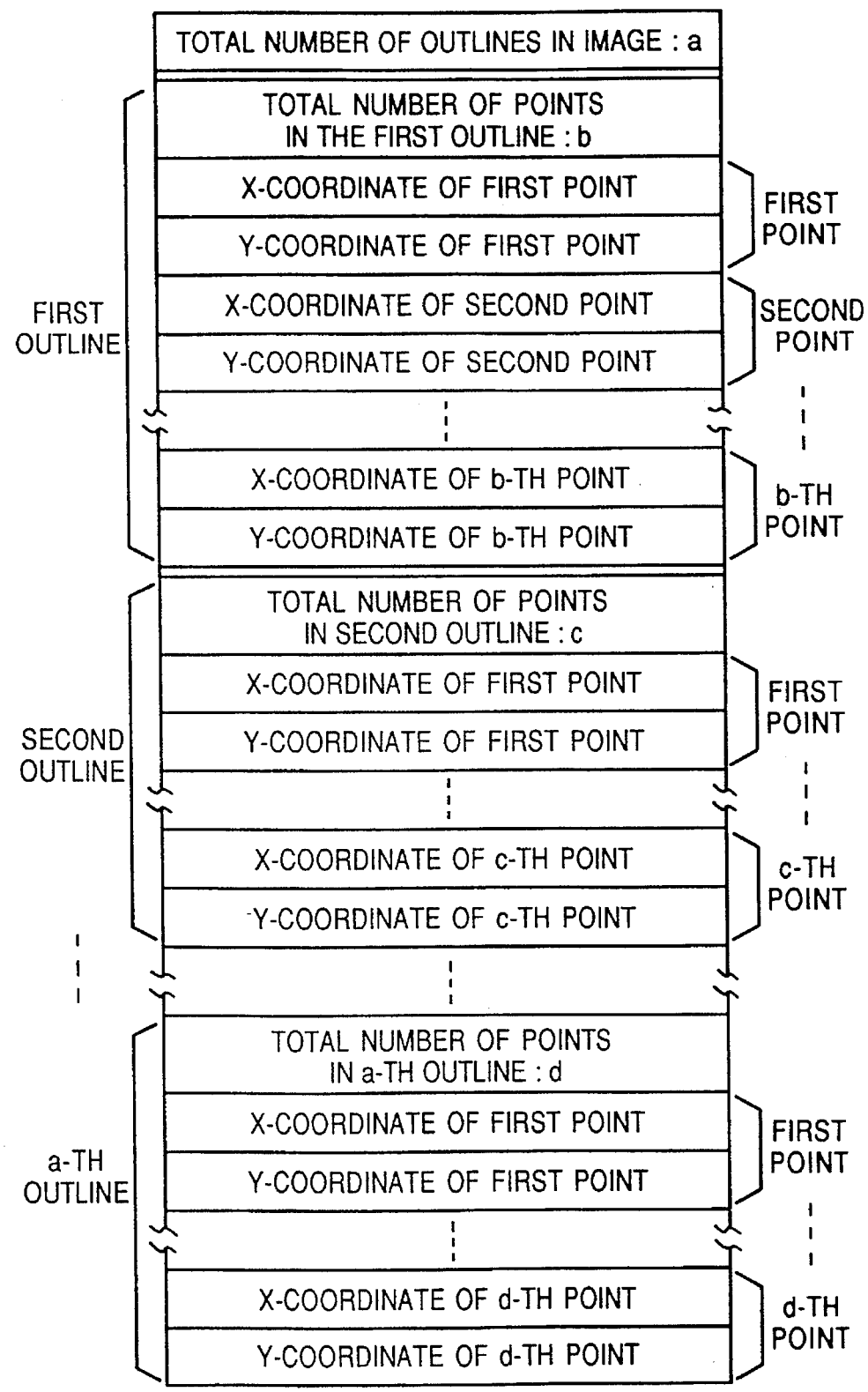
FIG. 9 illustrates an example of a vector table is a table according to the second embodiment of the present invention.

By sequentially checking the item Nos. of the inflow vector and two output vectors of the horizontal and vertical directional rough outline vector tables shown in FIGS. 7 and 8, a table of a rough outline vector coordinate as shown in FIG. 9 is made which expresses the total number of the outlines, the total number of the outlines for each outline (closed loop of the outline, and the x- and y-coordinates of each point included by the outline. Thus, a series of the processes is completed here.

If a discrimination is made that the subject pixel is not positioned at the edge of the image, the arrangement may be made in such a way that the addition and updating processes are not performed in the aforesaid state because the table is not substantially updated, resulting in the processing speed to be raised.

Figure 23:
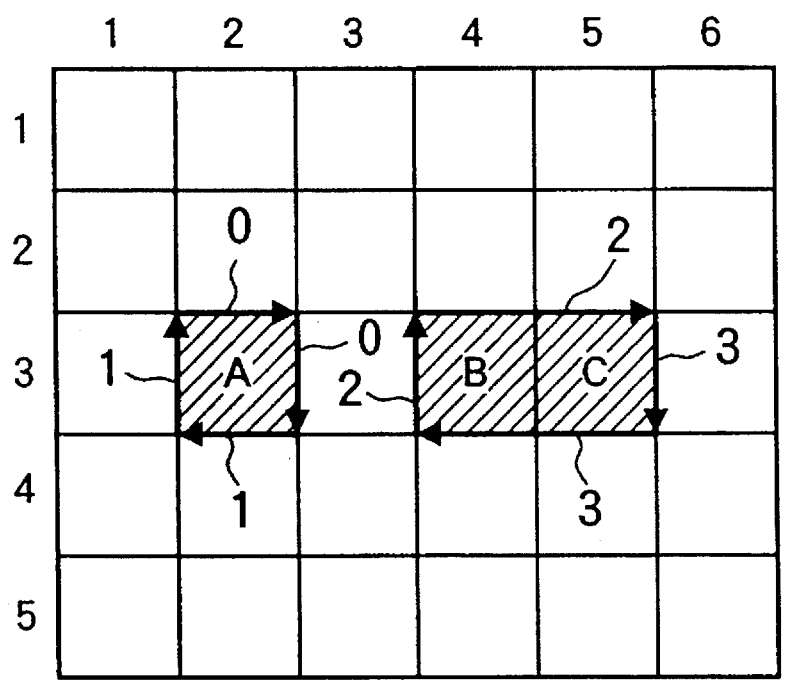
FIG. 23 illustrates an example of an inputted image for the purpose of describing the principle of extracting the outline vector according to a second embodiment of the present invention.

The processing and updating processes of the horizontal and vertical directional rough outline vector tables will now be specifically described. In order to simplify the description, assumptions are made that the read image has a size of 6×5 pixels and that a single pixel A and continued pixels B and C present as shown in FIG. 23. The coordinate positions (the rough outline vector coordinates) of the four corners of the pixel A are (2.5, 2.5), (2.5, 3.5), (1.5, 3.5), and (1.5, 2.5) when viewed clockwise from the upper right position. The coordinate positions of the pixels B and C need no explanation.

Reading and processing the aforesaid image, a first black pixel is detected on the third raster at the second pixel. At this time, all of the pixels surrounding the subject pixel (pixel A) are white ("0") pixels and, therefore, four vectors are present in such a way that two vectors are present in the horizontal direction and two vectors are present in the vertical direction. Since this embodiment is arranged in such a manner that the item No. is given to a new rough outline vector whenever it is generated, item Nos. 0 and 1 are given in both the horizontal and vertical directions in this case. Therefore, the horizontal and vertical vector tables are as shown in FIG. 24A. The way of use of the aforesaid tables will now be again described.

For example, an attention is paid to a horizontal vector which is given item No. "0". A vertical vector, the item No of which is "1" flows in the starting point (the upper left corner of the pixel A) of the subject vector, while a vertical vector, the item No. of which is "0", flows out from the end point of the subject pixel. Incidentally, the item No. of each vector may be considered to be an offset address which shows the position in the table at which the vector is stored. That is, it can be understood that data of the vertical vector, which flows in/flows out to and from the horizontal vector, the item No. of which is "0", is present at offsets "0" and "1" of the vertical vector table.

Referring back to FIG. 23, the process is shifted from the pixel A to the right pixel, resulting in that no process is performed and the process proceeds to the next pixel B because the subject pixel is white.

If an attention is paid to the pixel B, it can be understood that vectors are present in the upward and downward direction and on the right of the subject pixel except for the right of the same. Furthermore, the coordinate positions of the upper left corner of the subject pixel can be defined to be the starting point of the horizontal vector and those of the lower left corner of the subject pixel can be defined to be the starting point of the vertical vector. Hence, the aforesaid points can be newly registered into the horizontal and vertical vector tables. However, coordinates (3.5, 2.5) of the upper left corner of the subject pixel is stored as the starting point of a horizontal vector, the item No. of which is "2" and coordinates (3.5, 3.5) of the lower left corner is stored as the starting point of a vertical vector, the item No. of which is "2" because item No. "1" or less are used in both of the vertical and horizontal directions. If an attention is paid to a horizontal vector the item No. of which is "2", a vertical vector, the item No. of which is "2", flows in the aforesaid horizontal vector. Since a vertical vector cannot be discriminated at this point (a pixel continued in the horizontal direction is present), a mark is given so as to be distinguished. The aforesaid operation must be similarly performed when the vertical vector, the item No. of which is "2" is treated. That is, a mark is given to a corresponding position in the table because a horizontal vector which flows in the vertical vector, the item No. of which is "2", cannot be discriminated. Thus, each table is updated as shown in FIG. 24B.

When the process proceeds to pixel C, coordinate positions (5.5, 3.5) and (5.5, 2.5), which are the start points of vectors, are generated. Therefore, the table is updated by the aforesaid coordinate positions. Since the vertical vector, which flows out from the horizontal vector, the item No of which is "2" is a vertical vector which has been newly registered and the item No. of which is "3", the item No. of this vertical vector is written on the horizontal vector. Similarly, the vertical vector is subjected to the updating process. Thus, each table is updated as shown in FIG. 24C.

After all of the horizontal and vertical vectors of the rough outline vector and their connection relationship have been extracted, a vector table as shown in FIG. 9 is made on the basis of the aforesaid vector tables.

Figures 21, 22:
FIG. 21 illustrates an example of an inputted image.
FIG. 22 illustrates an example of outline vector data formed on the basis of the image shown in FIG. 21.

FIG. 21 illustrates an example of an input image, and FIG. 22 illustrates the vector table obtained from the input image.

Smoothing/Coordinate-Conversion Circuit

Figure 10:
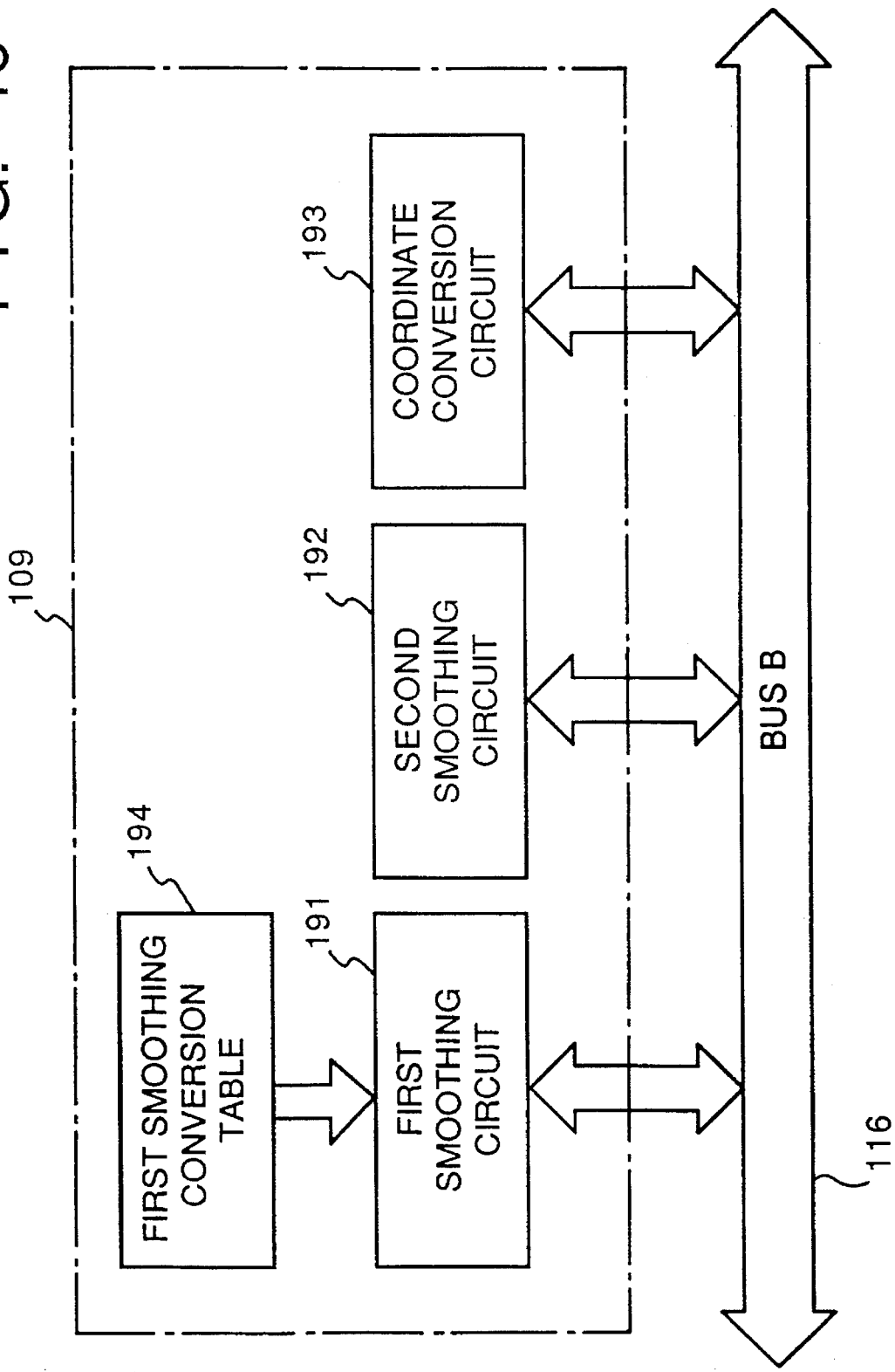
FIG. 10 is a block diagram which illustrates a smoothing/coordinate-conversion circuit 109 according to the second embodiment of the present invention.

The smoothing/coordinate-conversion circuit 109 according to this embodiment will now be described. As shown in FIG. 10, the smoothing/coordinate-conversion circuit 109 according to this embodiment comprises a first smoothing circuit 191, a first smoothing conversion table 194, a second smoothing circuit 192 and a coordinate conversion circuit 193.

The first smoothing circuit 191 receives the rough outline data strings, as shown in FIG. 9, converted from the raster scanning type binary image by the outline extracting circuit 107 so as to convert the outline coordinate data strings and to label the corner point in accordance with the state of the connection of the vectors while referring to the first smoothing and conversion table 194 in such a manner that the coordinate strings are traced for each closed vector region, so that information about apex coordinate data strings and information showing whether or not each apex is a corner point after the first smoothing operation has been performed are outputted. In the second smoothing circuit 192, the weighted mean of the coordinate values of a plurality of points in front and in the rear of the subject point is obtained on the basis of the information about the first-smoothed apex coordinate data strings and information about the corner point so as to output the outline vector coordinate data strings. In the coordinate conversion circuit 193, the coordinate values of the x-axis and y-axis are transposed and each coordinate value is multiplied by the ratio of expansion/compression. If a contraction process is performed, the smoothing process to be performed by the first smoothing circuits 191 and 192 are bypassed and data is directly supplied to the coordinate conversion circuit 193.

Figure 11:
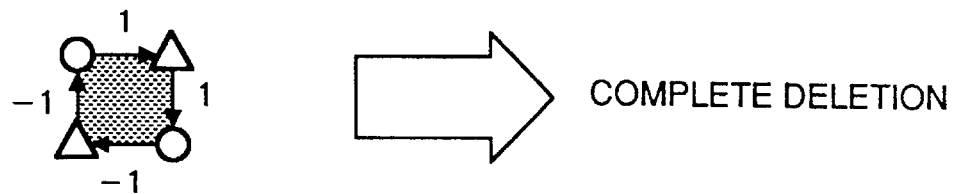
FIG. 11 illustrates an example of a process to be performed by the first smoothing circuit according to the second embodiment of the present invention.

The aforesaid process will now be described. In the first smoothing circuit 191, references are made to the patterns of 7 vectors including at most three sides in front and in the rear of the subject pixel as shown in FIGS. 11 to 18 so as to make a reference to the pattern of the direction and the length of each side, so that the rough outline coordinate value data strings are removed and/or converted. "N-pnt" shown in FIG. 11 and so forth is the total number of closed loops of rough outline coordinate value data, a single circle denotes the starting point of the horizontal vector and the end point of the vertical vector, a triangle denotes the end point of the horizontal vector and the starting point of the vertical vector, and a double circle denotes the corner point. The first smoothing operation includes, as the subject, a pattern shown in FIG. 11 and arranged to remove noise (notch/isolated point) peculiar to the binary image. That is, in an isolated pixel removal of one pixel size, all of the coordinate values of the pixel are deleted as shown in FIG. 11. As a result, the problem that the pixel is undesirably highlighted at the time of enlarging the image can be prevented. If the white area present in a black region is maintained, all of the outline coordinate are given corner point label at the time of outputting while maintaining the coordinate value. The term "corner point" used hereinbefore is meant a portion, the coordinate position is not moved even it has been subjected to the second smoothing process to be Described later.

Although the description order is inverted, the left and upward directions are respectively made to be minus directions in this embodiment because the directions X and Y are made to be right and downward directions. Furthermore, a fact that "≦−3" shows that at least three pixels are continued in the minus direction.

Figure 12:
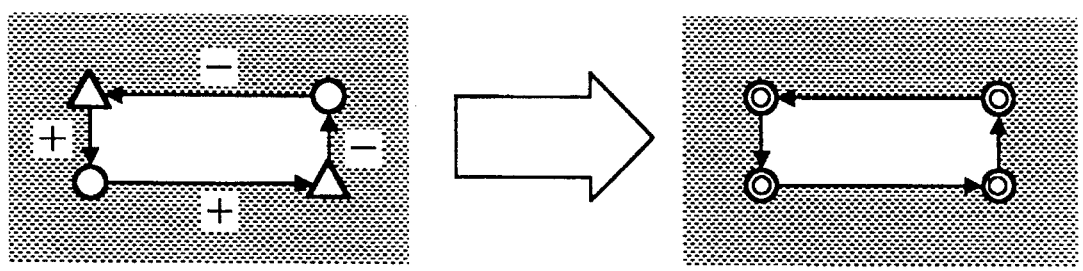
FIG. 12 illustrates an example of a process to be performed by the first smoothing circuit according to the second embodiment of the present invention.

FIGS. 11 and 12 illustrate the aforesaid facts, and then the description will be continued with reference to on and after FIG. 13.

Figure 13A:
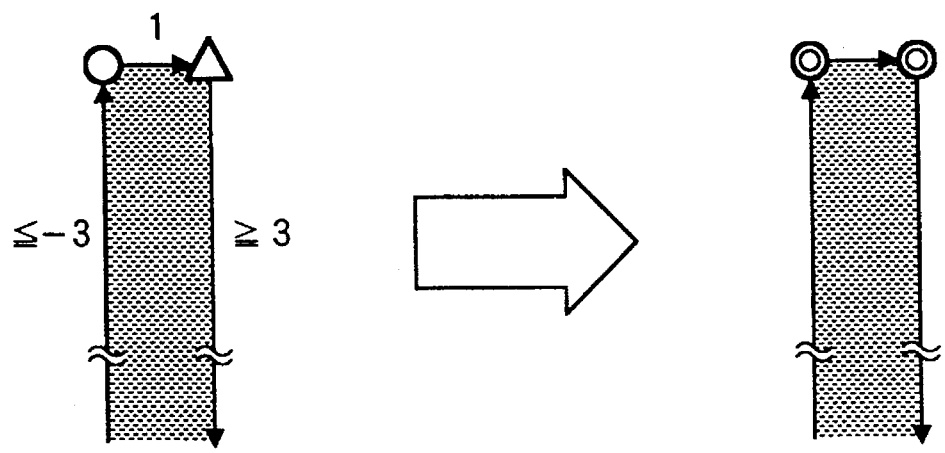
FIGS. 13A and 13B illustrate an example of a process to be performed by the first smoothing circuit according to a second embodiment of the present invention.
Figure 13B:
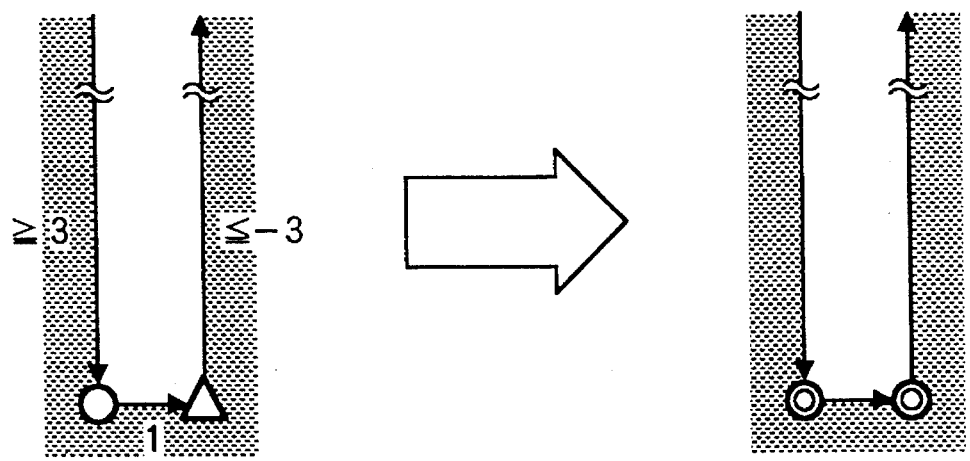

FIGS. 13A and 13B illustrate an arrangement made that the coordinate position showing an end portion of a thin line having a length corresponding at least three pixels is defined to be a corner point and change of its coordinate position is inhibited in the second smoothing process to be described later. In other words, rounding of the corner point is inhibited. It will be further described so as to be easily understood, a line segment having a width of one pixel and a length of 3 pixels or more and present in the background is recognized to be a portion of a character or a line picture or the like in place of being recognized to be so-called "dust" contained in the read image. Although the length is arranged to be three pixels or more in this embodiment, it may be a length of two pixels if the reading resolution is unsatisfactory because the length must be determined depending upon the reading resolution. If the image is read with a further excellent resolution, the length may be four or more pixels. The aforesaid fact is also applied to the descriptions to be made hereinafter.

Figure 15:
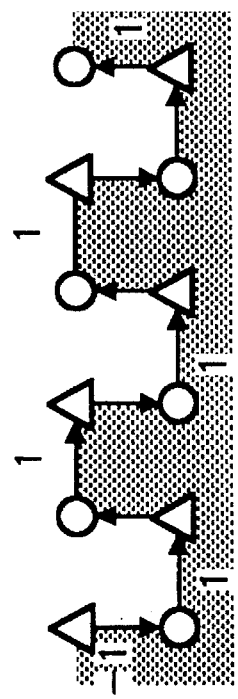
FIG. 15 illustrates an example of a process to be performed by the first smoothing circuit according to a second embodiment of the present invention.

FIGS. 14A and 14B illustrate an operation in which projections and pits of a size corresponding to one pixel in a flat state for a predetermined length (three pixels in this embodiment) are deleted, that is rough outline vector data of the projections and pits are deleted. FIG. 15 illustrates an operation in which, if projections and pits are continuously present, the projections and pits are flattened.

Figure 16A:
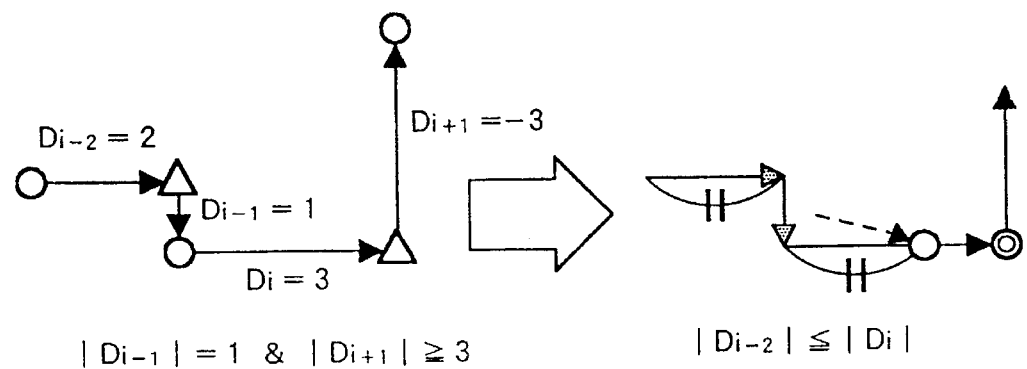
FIGS. 16A to 16C illustrate an example of a process to be performed by the first smoothing circuit according to a second embodiment of the present invention.
Figure 16B:
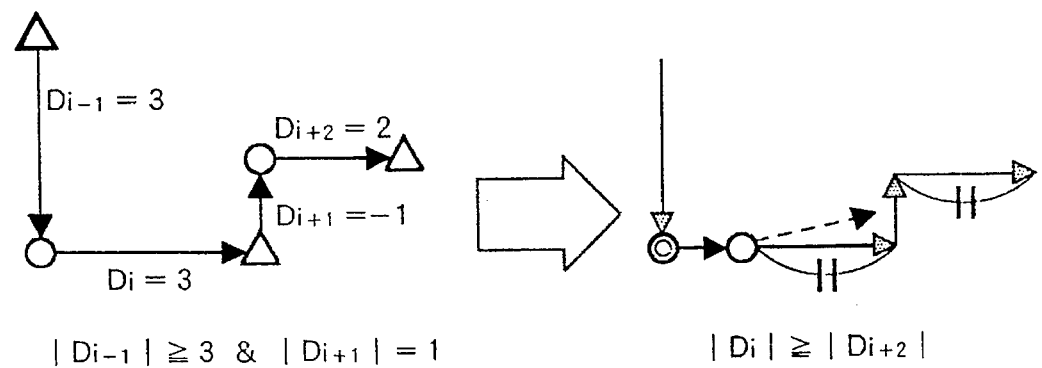
Figure 16C:
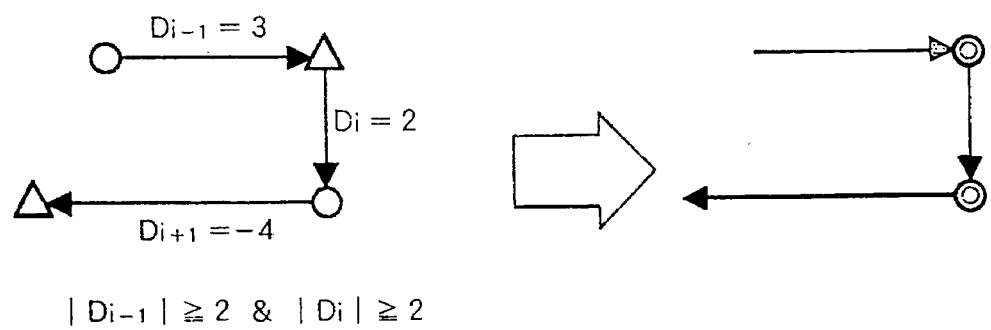

FIGS. 16A to 16C illustrate the definition of the corner point and a concept of smoothing of the vector. Referring to FIGS. 16A to 16C, symbol "Di" denotes the subject rough outline vector. In the case of FIG. 16A for example, the end point of the subject rough outline vector is made to be the corner point if the end point of the subject rough outline vector is positioned as illustrated. Furthermore, vector Di−1 present immediately in front of the subject vector Di is deleted, and the length, which is the same as vector Di−2 positioned secondarily in the forward direction is started from the starting point of the subject vector, and vector which connects the end position and the starting position of the vector Di−2 is updated as vector Di−2. In addition, a vector expressed by the end point of the updated vector Di−2 and the corner point is updated as the subject vector.

Figure 17A:
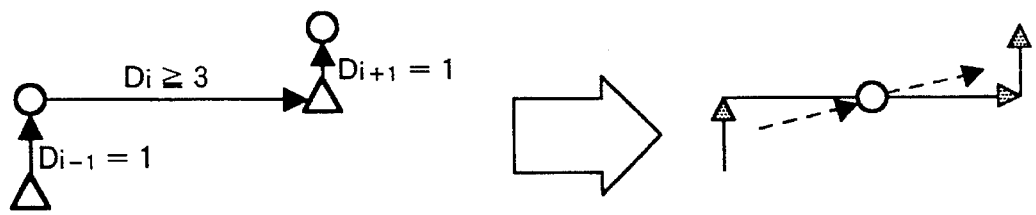
FIGS. 17A and 17B illustrate an example of a process to be performed by the first smoothing circuit according to a second embodiment of the present invention.
Figure 17B:
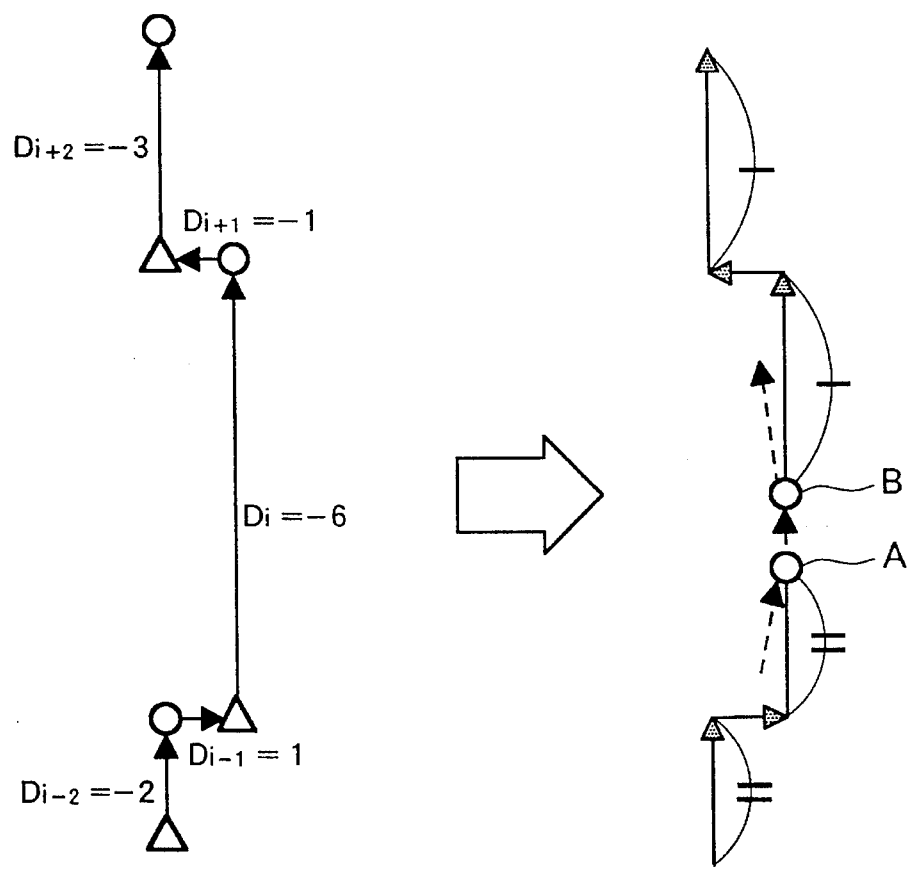
Figure 18A:
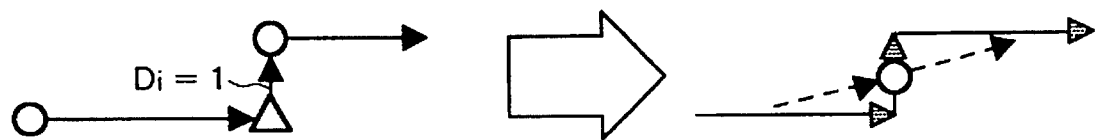
FIGS. 18A to 18C illustrate an example of a process to be performed by the first smoothing circuit according to a second embodiment of the present invention.
Figure 18B:
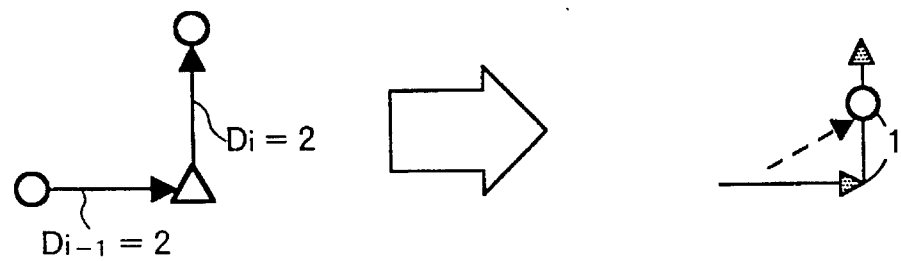
Figure 18C:
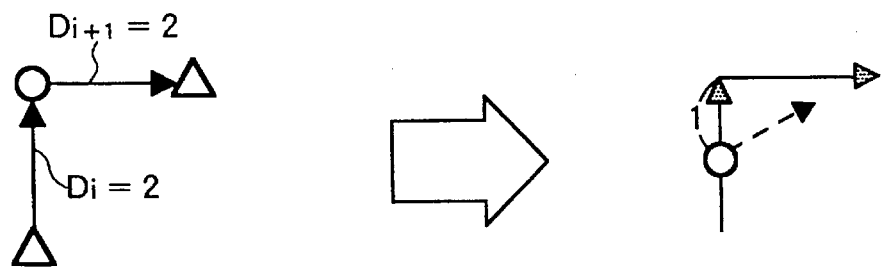

FIGS. 17A and 17B illustrate a process of smoothing a moderate diagonal line portion. An edge inclined in a predetermined direction in such a way, for example, that it rises by one pixel and extends in the horizontal direction by 3 pixels or more, and then it again rises by one pixel as shown in FIG. 17A is made in such a manner that the middle point of the subject vector is made to be the end point of the immediately front vector Di−1 and the starting point of the immediately rear vector Di+1. If the edge is inclined upwards and then it is inclined downwards at an intermediate position thereof, the aforesaid process is not performed. It can be discriminated by multiplying the inclination of the immediately front vector and that of the immediately rear vector so as to examine the sign. FIG. 17B illustrates an example in which five vectors are finally made to be three vectors. That is, in the conditions as illustrated, the immediately front and rear vectors of the subject vector Di are deleted, and a vector which connects the starting position of vector Di−2, which has not been smoothed yet, and point A on the subject vector Di is made to be vector Di−2, a vector expressed by points A and B is made to be the subject vector Di, and a vector expressed by the point A and the end point of the vector Di+2, which has not been smoothed yet, is made to be vector Di+2. In the case shown in FIGS. 18A to 18C, processes as illustrated are performed. In an example shown in FIG. 18A, the intermediate position of the subject vector Di is made to be the end point of the immediately front vector and the starting point of the immediately rear vector.

As the result of the aforesaid process performed by the first smoothing circuit 191, the rough outline vector constituted by only the vertical and horizontal vectors is allowed to have a diagonal vector.

Figure 19:
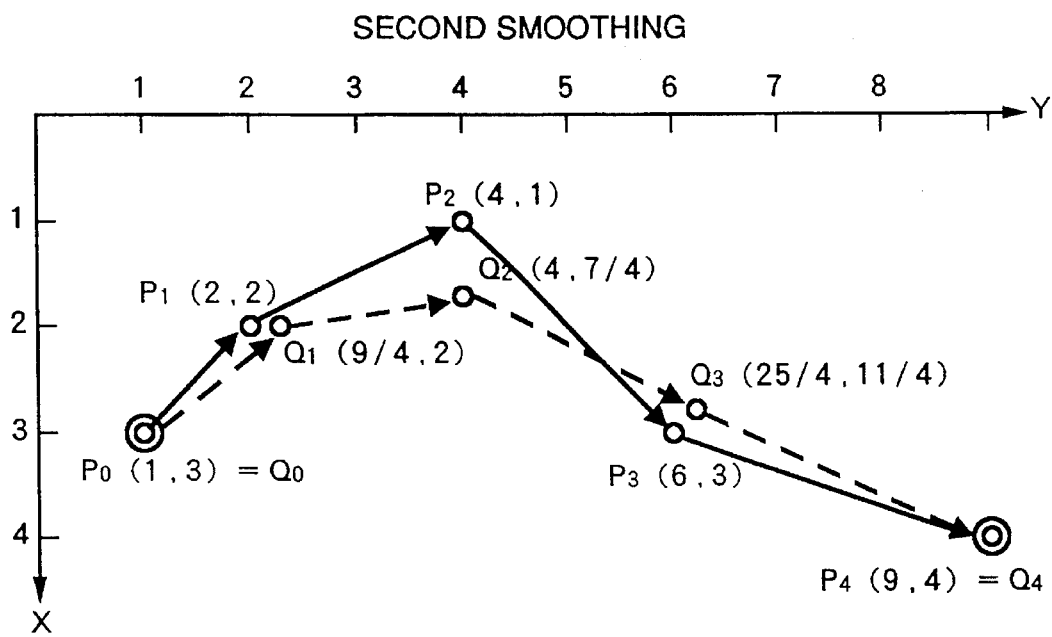
FIG. 19 illustrates an example of a process to be performed by the first smoothing circuit according to a second embodiment of the present invention.

In the second smoothing circuit 192, the corner points marked by double circles shown in FIG. 19 are maintained, and the mean weight of the coordinate values (the coordinate values of the front and rear points in this embodiment) of a plurality of front and rear points positioned across the subject point of each coordinate point other than the corner point is obtained, and the each mean average is outputted as apex coordinate data strings, which has been subjected to the second smoothing process. Point Qi shown in FIG. 19 denotes the apex coordinate data strings, which has been subjected to the second smoothing process, and point Pi denotes an apex coordinate data, which has been subjected to the first smoothing process. In the illustrated example, Q1 is obtained from the mean average of P0 (1, 3), P1 (2, 2) and P2 (4, 1). The effective number of digits for use in the first and the second smoothing processes is arbitrarily determined so far as it is in a range which is effective to the recording resolution.

In the coordinate conversion circuit 193, the coordinate transposition of the x-axis for y-axis required due to the main scanning of the processed image and that of the recorded image is performed, and a multiplication of each coordinate string by the ratio of expansion/compression is performed so as to be adaptable to the expansion/compression process.

In an example case where the supplied image is doubled in both of the main scanning and the sub-scanning directions, the coordinate conversion is performed in such a way that the x- and y-coordinates of each apex coordinate data string, which has been subjected to the second smoothing process, are doubled, and the fractions of 0.5 and over are counted as a unit and the rest is cut.

As described above, the outline coordinate data strings obtained by the circuits 191 and 194 are outputted to the memory B111. Thus, the process is completed.

Binary Image Reproducing Circuit and Intermediate Circuit

In the second embodiment, a page memory is used in which a bit map image memory is used by a quantity for one frame. The method of converting the outline coordinate data strings into the binary raster image can be completely effectively employed.

In the binary image reproducing circuit 110, an outline coordinate data strings stored in the memory B111 shown in FIG. 1 are read, and outlines for one image frame are drawn on the bit map image memory of the memory A103.

Since the drawing operation can be performed at high speed by the ensuing inside drawing circuit, and the outlines are drawn by the bit map image for one page, two or three line segment vectors (vectors connecting each coordinate of the outline coordinate strings) positioned continuously are paid attention, and references are made to the states (directions) of the subject line segment vector, a vector immediately in front of the subject line segment vector, and a vector immediately in the rear of the subject line segment vector so as to control the method of drawing the outline pixels present on the subject line segment vector. The contents of the control are as follows: an end point on the subject line segment vector, and points on the outline vector other than the end point are individually treated, and a selection is made from a group consisting of an operation in which they are not drawn, an operation in which they are drawn at the pixel position on the line segment vector, and an operation in which they are drawn while being shifted in the main scanning direction on the line segment vector to a position shifted to the adjacent pixel. The actual operation of drawing the outline pixel is performed in such a way that the obtained exclusive OR (EXOR) of a stored value and 1 is stored at the pixel position to be drawn. In either case, the pixels are sequentially read in the main scanning direction, so that the outline is so drawn as to enable the pixels to be switched.

Figure 20:
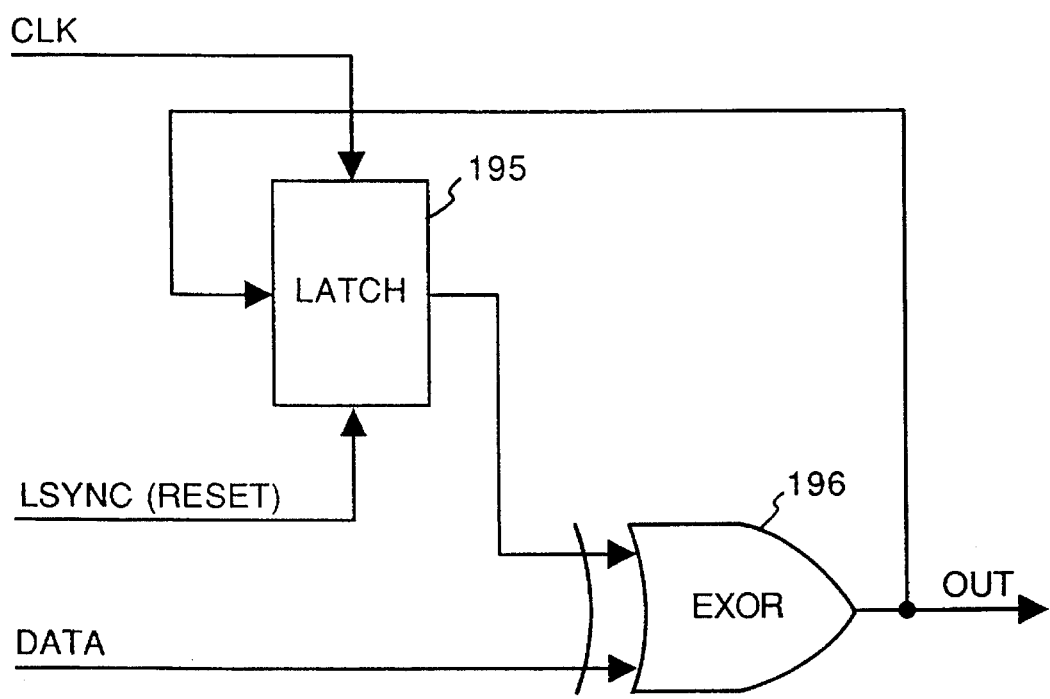
FIG. 20 illustrates the structure of an inside drawing circuit according to a second embodiment of the present invention.

In the inside drawing circuit 104, the inside drawing process is performed by a pipe line process while reading the image having the drawn outlines because it has been subjected to the process of drawing all of the outline edges in a predetermined outline drawing circuit and stored in the bit map image memory (memory A103) by raster scanning at an arbitrary synchronizing timing. Then, it is again transferred to the bit map image. The inside drawing process is performed by a circuit shown in FIG. 20 in such a way that DATA received in synchronization with a signal CLK is outputted to an terminal OUT in a state where the outline-drawn pixels are sequentially inverted between white and black. Symbols LSYNC is a line synchronizing signal which is supplied as a synchronization reset signal at the time of starting the input of the raster image. Reference numeral 195 denotes a latch which holds the value of output OUT of a pixel positioned forwards by one pixel. Reference numeral 196 denotes an EXOR which outputs the EXOR of supplied data and the value of output OUT of the pixel positioned forwards by one pixel. That is, the output OUT becomes "1" or "0" whenever the outline points are supplied as DATA.

Although the character/line image and the half tone image are, in this embodiment, separated from each other by the image region separation circuit, the region table for separating the image region can be omitted from the structure if the attribute of the image can be previously known by a mode selection button of the image scanner or a communication protocol, and the switching whether or not the pixel density conversion by extracting the outline on the basis of the attribute of the image may be performed. In addition, it is not always necessary in this embodiment for a circuit exclusively used to divide the original image into the character/line area (the binary image area) and the halftone image area to be provided. Since a pseudo half tone image has much outline coordinate data strings in one closed loop thereof as compared with a character/line image and the direction of the vector frequently changes in one closed loop, another arrangement may be employed in which switching is, at the moment the smoothing process is performed, is performed whether or not the smoothing process is performed on the basis of the total number of the outline coordinate data strings in one closed loop in place of the image region separation circuit 200 and the region discrimination table, resulting in that the image region separation function can easily be realized. It can be processed specifically as follows.

That is, since the minimum and maximum points of the x- and y-coordinate points of all of the vectors forming one closed loop can be obtained, the size of a rectangular circumscribed with the aforesaid closed loop can be determined. Namely, the size of the closed loop can indirectly taken out as the size of the rectangular. Hence, in accordance with the relationship between the size of the rectangular and the total number which forms the closed loop, a discrimination can be made as to whether or not smoothing is performed, that is, whether the closed loop is the half tone image or the character/line image. It should be noted that the relationship between the size of the rectangular and the closed loop may be stored while being formed into a table or a formula.

Consequently, it is possible to determine, on the basis of the vector obtained in series of processes of extracting an edge vector of an image, whether the original image is a halftone image or a binary image.

In this embodiment, both of the enlargement contraction (expansion/compression) process and the coding process to be performed by utilizing the outline coordinate data strings and the enlargement/contract process by using the binary raster image are performed. Therefore, the data size of the outline coordinate data strings and the data size of the MH, MR or MMR coded data can be subjected to a comparison, so that image data, the quantity of which is smaller, is transmitted, resulting in that the communication time to be efficiently shortened.

Since the quantity of the outline coordinate data strings becomes enlarged considerably depending upon the image, there is, depending upon the image, a risk of overflow of the memory at the time of extracting the outline coordinate data strings. In this case, the outline extraction process may be interrupted and switching to the coordinate conversion (expansion/compression) process by using the binary raster image may be performed. That is, the final address position of the rough outline vector table, which is being constituted, and the final effective address position of the memory are subjected to a comparison because the capacity of the memory B111 is previously known.

As for the expansion/compression by converting the coordinate as described above, different ratio of expansion/ compression can, of course, be multiplied to the main scanning and the sub-scanning, and therefore, it can be performed for the x-axis and the y-axis individually. The aforesaid process is performed in such a way that the size of the received original image and the size of the paper sheet for use in printing out are subjected to a comparison, and the ratio of expansion/compression of the x-axis and that of the y-axis are calculated. The ratio of expansion/compression may be arbitrarily selected in accordance of the will of a user (operator). Furthermore, the ratio of expansion/compression of the x- and the y-axes may be processed by the transmission side as a result of negotiation, or it may be processed by the receiving side at the time of printing received data.

Although black isolated points and notches are, in order to remove dust pixels, removed in the smoothing process according to the second embodiment, the notch and the isolated pixel removal patterns may be separated from the smoothing pattern by using an external switch mode (for example, by a switch provided on an operation panel which is omitted from illustration) because the notches and the isolated points of image data read with the standard resolution conformed to G3 are required as information to read the character in many cases. By using an external mode key, switching whether or not the smoothing process is performed can, of course, be performed.

Figure 25:
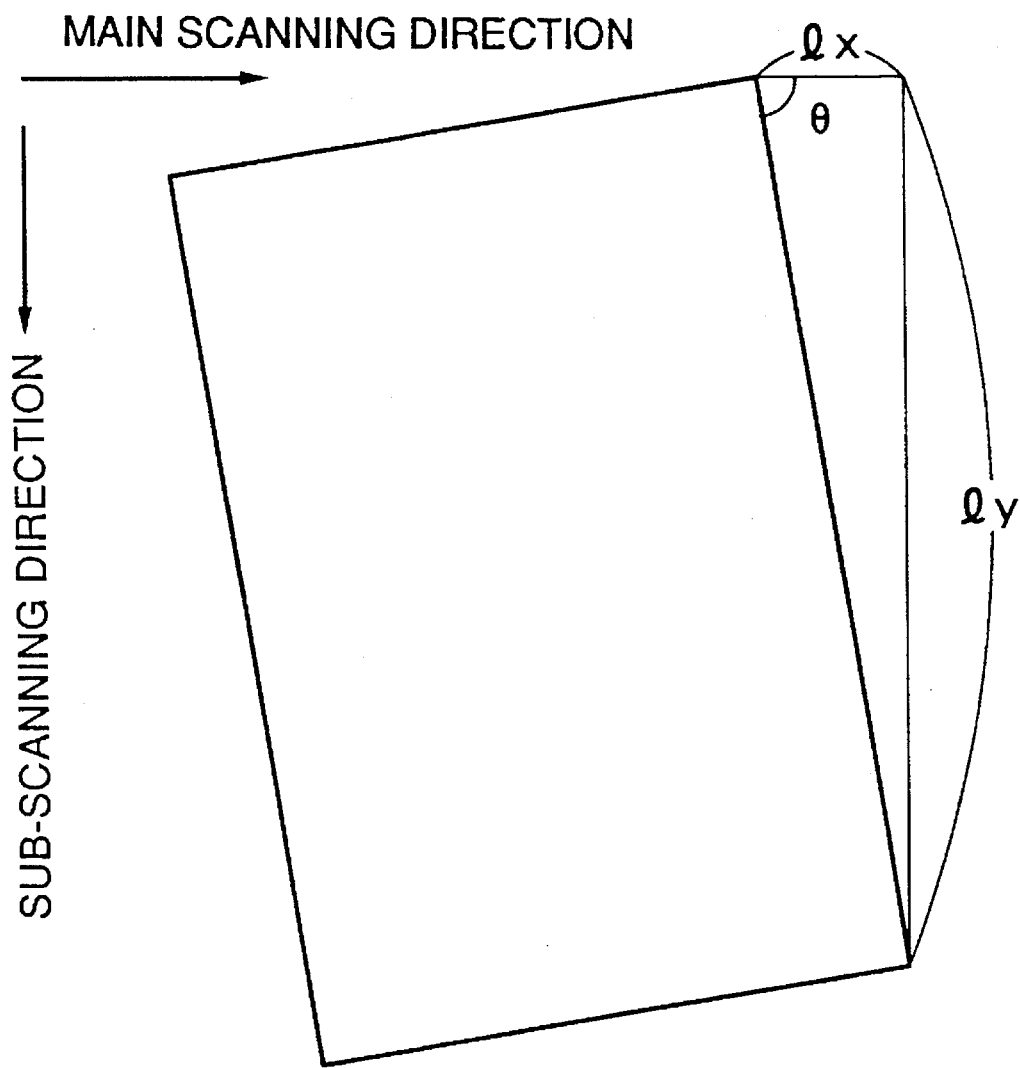
FIG. 25 illustrates the principle of correction to be performed if the original document is read diagonally.

The coordinate conversion circuit 109 according to the second embodiment performs only the transposition of the x- for the y-coordinates and the multiplication by a ratio of expansion/compression. The read original document positions undesirably diagonally can be corrected by performing, at the aforesaid processes, the coordinate rotation by an affin transformation of the outline coordinate data strings on the basis of the output value from an apparatus (omitted from illustration) for detecting the diagonal angle of a read original document. In this case, the edge positions of the original document in the main scanning direction are sequentially detected if the original document is conveyed in the sub-scanning direction or if the scanner is moved in the sub-scanning direction to read the original document as shown in FIG. 25. That is, since the deviation quantity lx taken place when one original document sheet has been read and the conveyance quantity ly taken place at this time in the sub-scanning direction are detected, the diagonal angle θ of the original document can be obtained by $$\tan^{-1}(ly/lx).$$

A variety of means can be considered to detect the change of the edge position of the original document. In an example case in which the recording side of the original document is read while conveying the original document, the color of the background (the color to be detected if no read original document is present) at the reading position is made to be a color other than white. Since the background color of the original document is usually white, the edge can be detected by only making distinction from the white color of the background. As an alternative to this, the degree of the diagonal state may be detected by providing a pressing plate, which presses the original document sheet by small force which is applied thereto in a lateral direction in the original document conveyance direction and which is so determined as not to fold the original document sheet, and which is able to move in the horizontal direction (main scanning) direction, so as to detect the lateral movement quantity of the pressing plate with respect to the quantity of the conveyance of the original document.

The aforesaid diagonal state modification process may be arranged in such a way that the image of a read original document is reversely rotated (affin-transformed) by the obtained diagonal angle after the read image has been stored in the memory A103 or at the time of storing it. Then, the aforesaid process may be performed. As an alternative to this, coordinate data obtained by the aforesaid second smoothing process may be subjected to the rotation process, Although the aforesaid process may be automatically performed in the case where the diagonal state is modified, this fact may be notified to the operator (by, for example, a display made in a display portion provided for the operation panel) and the operator may instruct whether or not the modification of the diagonal state is performed.

Another structure may be employed in which an arbitrary angle is instructed by using the operation panel to rotate the image, regardless of reading of the diagonal state of the original document. That is, a countermeasure against occurrence that the characters of the original document to be read is previously diagonally placed.

Although the binary image reproducing circuit 110 is arranged to use a page memory which uses the image memory of the bit map for one picture frame, a scan line conversion (a packet sort method) may be employed which uses an edge table and an active edge table and which draws the ridge edge of the outline image by a line buffer for several lines.

Although this embodiment uses the printer as the image output apparatus, an image can be outputted onto a display by using a Video memory and a display in place of the FIFO 105 and the printer 106 shown in FIG. 1.

Furthermore; an example of the application of communication which use the outline coordinate data strings may be employed which is arranged in such a way that a digitizer, which shows the image position, is individually provided and a decoration code (change of net decoration or inside drawing pattern, or change of the color) is additionally transferred to the closed loop of the outline coordinate data in region instructed by the digitizer. As a result, the receiving side is easily executing the change of the net decoration pattern or the inside drawing pattern or the change of the color in accordance with the decoration code.

As an alternative to the arrangement in which font is developed into a binary raster image as is done in the case of the report or the header before transmission, it can be directly transmitted/received as font data using an outline, or the development of the conventional outline is commonly used by the binary image reproducing and the inside drawing circuits, so that the output of the outline font can easily be performed.

The operations employed in the conventional resolution conversion can, of course, be realized in this embodiment, and therefore, the arbitrary expansion/compression process, in which a ratio of expansion/compression instruction key is used, and a process for causing an elongated original document to be included by a regular-size cut paper by detecting the cassette size can be realized in the structure according to this embodiment.

As described above, according to this embodiment, even if the original document is undesirably diagonally read, the degree of the diagonal state is corrected by the reverse rotation, resulting in an excellent image, which is normally placed, can be obtained.

Since the outline vector is extracted and the process is performed on the basis of the extracted outline vector as well as treating the bit image of the original image, the generation of rough edges can be prevented.

Furthermore, the arrangement in which data obtained on the basis of the extracted outline vector is transmitted to the other end of the data line, and the receiving side reproduces and outputs an image on the basis of the received data will enable the time required to perform the communication to be shortened and enable transmission of precise image to be performed.

In addition, since the outline vector extracted from the original image is smoothed and therefore the vector is enlarged to reproduce the image, a high grade image can be obtained regardless of the ratio of expansion/compression.

Since the process of expansion/compression of the extracted outline vector is performed only when the resolution conversion is required, the load acting on the system can be minimized. Therefore, the reduction in the processing speed at an ordinary process can be prevented.

When the outline vector is extracted from the read binary image, a discrimination is made as to whether or not the storage size of the outline vector is larger than the memory capacity. If a discrimination is made that the memory over takes place, the process of extracting the outline vector is immediately interrupted and switching to the process by using the binary image is performed. As a result, printing or transmission can be correctly performed even if the problem of memory over takes place.

In the case where the expansion/compression process is performed on the basis of outline vector data, whether or not the smoothing process is performed in switched by using an external switch. As a result, whether the smoothing process is performed or a high processing speed is realized can be selected by the operator. Furthermore, the smoothing process is performed when the expansion/compression process of the read or received image is performed, an image revealing high quality and freed from distortion can be obtained. Furthermore, if an arrangement is employed in which the ratio of expansion/compression is instructed by a switch (omitted from illustration), an image having a desired size can be obtained. In addition, the expansion/compression process is performed on the basis of the outline vector size at only the time of performing the enlargement process. Therefore, the load acting on the apparatus can be lightened, and, hence, the undesirable reduction of the processing speed can be prevented at the time of the equal-magnification process or the size contraction process.

The expansion/compression process by using the outline vector is effective to only the character/line image, but the obtainable result is unsatisfactory if the half tone image is subjected to the aforesaid process. However, the aforesaid embodiment is arranged in such a way that only the character/line image is subjected to the expansion/compression process which uses the outline vector data, and expansion/compression of the half tone image is varied by an interpolation of the pixel forming the image or by thinning the same. Hence, an excellent image can be obtained.

In the communication performed between the apparatuses according to the embodiment, data to be transmitted may be outline coordinate data, and the transmission side or the receiving side is able to individually expand/compress data in the x- and y-directions. Therefore, an excellent and desired image can be obtained even if the expansion/compression is performed.

As described above, according to the second embodiment, the resolution conversion is performed only when the resolution conversion must be performed, and the deterioration of the image taken place due to the resolution conversion can be substantially prevented. Therefore, the load acting on the apparatus can be lightened and a high quality image can be transmitted.

Furthermore, the outline vector is extracted only when the resolution must be converted before it is smoothed to generate an image, resulting in an effect to be obtained in that a high quality image can be transferred.

Third Embodiment

The aforesaid second embodiment is arranged in such a way that the outline vector is extracted from the supplied image, and it is transmitted to the apparatus positioned at the other end of the data line.

Even if the size of the original document read by the transmission side is the same as the size of the recording paper sheet of the printer of the facsimile apparatus positioned at the other end of the data line, it is expected that the size of the image at the transmission side is not realized by the receiving side facsimile apparatus positioned at the other end of the data line. The reason for this lies in the difference between the reading resolution of the transmission side apparatus and that of the printer of the facsimile apparatus positioned at the other end of the data line.

In a system so arranged that images or the like are edited on a CRT apparatus and the contents of the edition is directly transmitted through a data line, the image formed by the system can be printed while equally corresponding to the displayed image. The reason for this lies in that the CRT apparatus and the printer are adapted to each other in terms of the relationship of the resolution, the interval between the longitudinal dots and the horizontal dots, the ratio of the intervals between the longitudinal and horizontal dots, and the number of the longitudinal and horizontal dots.

However, the aforesaid problems arise even if the image processed by such a system is transferred to the facsimile apparatus positioned at the other end of the data line.

According to the third embodiment, the aforesaid problem can be overcome. The interval between the longitudinal dots and the horizontal dots, the ratio of the intervals between the longitudinal and horizontal dots, and the number of the longitudinal and horizontal dots are called a "pixel structure" and data about it is called a "pixel structure information".

In the third embodiment, a data communication apparatus, to which a computer is connected, is used as the transmission side data communication apparatus, and a facsimile apparatus is used as the receiving side data communication apparatus.

Figure 26:
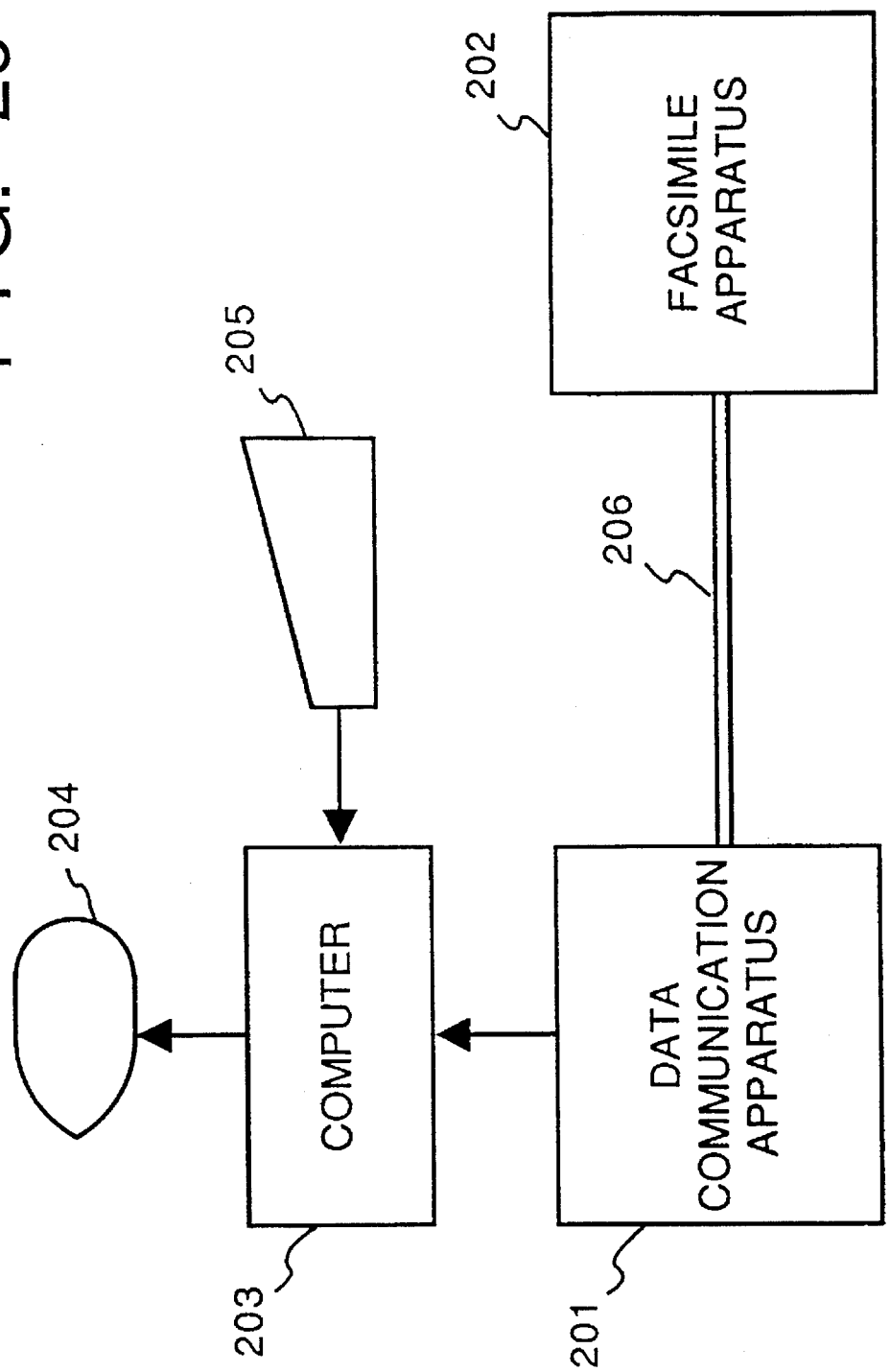
FIG. 26 illustrates an example of the structure of a data communication system according to a third embodiment of the present invention.

FIG. 26 is a block diagram which illustrates the structure of a data communication system according to the third embodiment.

Referring to FIG. 26, a data communication apparatus 201 performs an outline extraction process to be applied to raster scanning type binary image data transferred from a computer 203, and transmits extracted outline data and pixel structure information of transferred raster type binary image data to a facsimile apparatus 202 positioned at the other end of a data line 206. The facsimile apparatus 202 reproduces binary image data so as to be adaptable to the pixel structure of the facsimile apparatus 202 in accordance with received outline data and pixel structure information so as to output it to a recording paper sheet or the like.

The computer 203 is connected to the data communication apparatus 201 so as to process/edit image data such as computer graphics. A display 204 is a CRT apparatus which displays graphic data (image data) processed by the computer 203. In this embodiment, image data is raster scanning type binary image data. A keyboard 205 is used to instruct the computer 203 to process graphic data and to transfer data. Reference numeral 206 denotes a data line.

Figure 27:
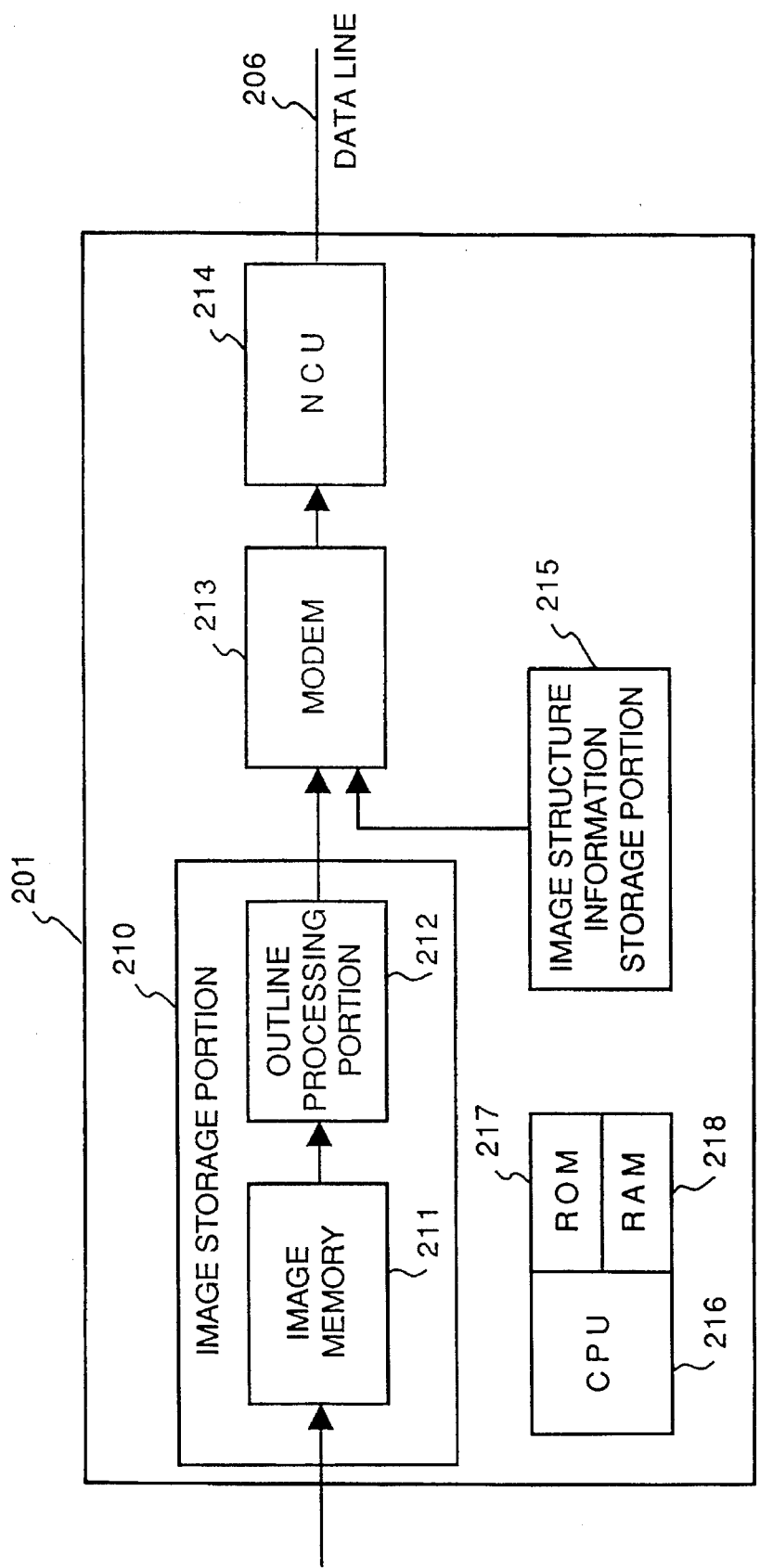
FIG. 27 is an internal block diagram of the data communication apparatus shown in FIG. 26.

FIG. 27 is a block diagram which illustrates the functional structure of the data communication apparatus 201. FIG. 27 illustrates the structure for the data communication apparatus to transmit image data. Raster scanning type binary image data to be transmitted from the computer 203 is supplied to an image processing portion 210. The image processing portion 210 will now be described further in detail. An image memory 211 stores image data transferred from the computer 203. An outline processing portion 212 executes outline extraction from image data stored in the image memory 211, so that image data is converted into vector coordinate data strings which express the boundary between white and black portions of image data by vector data. The outline processing portion 212 according to this embodiment is constituted by the outline extraction circuit 107 according to the first embodiment.

A modem 213 subjects the vector coordinate strings obtained in the outline processing portion 212 to a modulation process so as to output it to the data line 206. At this time, pixel structure information of image data stored in the image memory 211 is added. In the third embodiment, pixel structure information for the CRT 4 connected to the computer 3 is stored in a pixel structure information storage portion 215. Data modulated by the modem 213 is outputted to the data line 206 via an NCU 214. Each section of this data communication apparatus 201 is controlled by a CPU 216 of, for example, a microprocessor. The CPU 216 is provided with a ROM 217 which memorizes a control program and various data items, and a RAM 218 serving as a working area for the CPU 216 which temporarily stores various data items.

Pixel structure information to be added as data to be transmitted is not limited to the way of storage in the pixel structure information storage portion 215. For example, it may be previously stored in the RAM 218 or the like, or it may be transferred together with image data from the computer 203.

Figure 28:
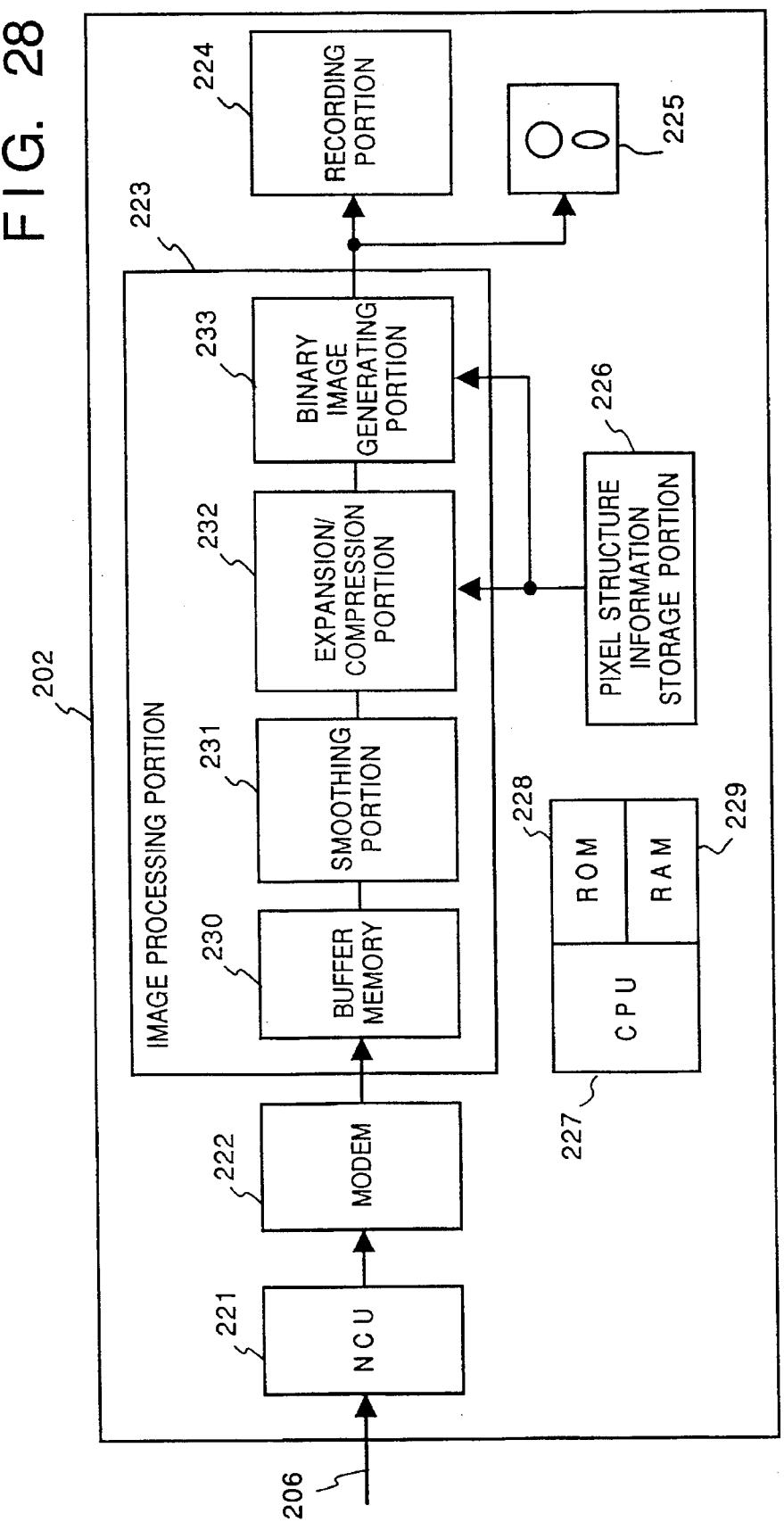
FIG. 28 is an internal block diagram of a facsimile apparatus shown in FIG. 26.

FIG. 28 is a block diagram which illustrates the functional structure of the facsimile apparatus 202. FIG. 28 illustrates the structure in a region from receipt of image data (outline data) to output performed by a recording portion. The structure of the reading portion and that for transmitting image data are arranged ordinarily, and their descriptions are omitted here.

Outline data with pixel structure information transmitted from the data communication apparatus 201 via the data line 206 is received by the apparatus according to this embodiment via the NCU 221 before it is modulated by the modem 222. The image processing portion 223 receives outline data with demodulated pixel structure information so as to convert it into binary image data having a pixel structure adaptable to the recording portion 224. The recording portion 224 outputs binary image data outputted from the image processing portion 223 to a recording paper sheet by, for example, a thermal recording method. Image data generated by the image processing portion 223 can be stored by a floppy disk portion 225. Image data stored in a floppy disk is displayed or recorded by another apparatus. The pixel structure information storage portion 226 stores pixel structure information to correspond to the other end of the data line to which image data is transmitted. A CPU 227 controls each of the aforesaid sections. In a ROM 228, a control program for the CPU 227 and a variety of data items. A RAM 229 serves as a working area for the CPU 227 to temporarily store various data items.

Then, the image processing portion 223 will now be described further in detail. Pixel structure information and outline data demodulated by the modem 222 is stored in a buffer memory 230. A smoothing portion 231 subject outline data stored in the buffer memory 230 to a smoothing process. An expansion/compression processing portion 232 subjects outline data to a expansion/compression process at an expansion/compression ratio determined on the basis of pixel structure information stored in the buffer memory 230 and pixel structure information of image data read from the pixel structure information storage portion 226 and to be generated. A binary image generating portion 233 reproduces outline data into a binary image. The smoothing portion 231 and the expansion/compression portion 232 can be realized by the smoothing/coordinate-conversion circuit 109 according to the first embodiment.

Then, the operation of the data communication system according to this embodiment will now be described with reference to a flow chart shown in FIGS. 29 to 31.

Figure 29:
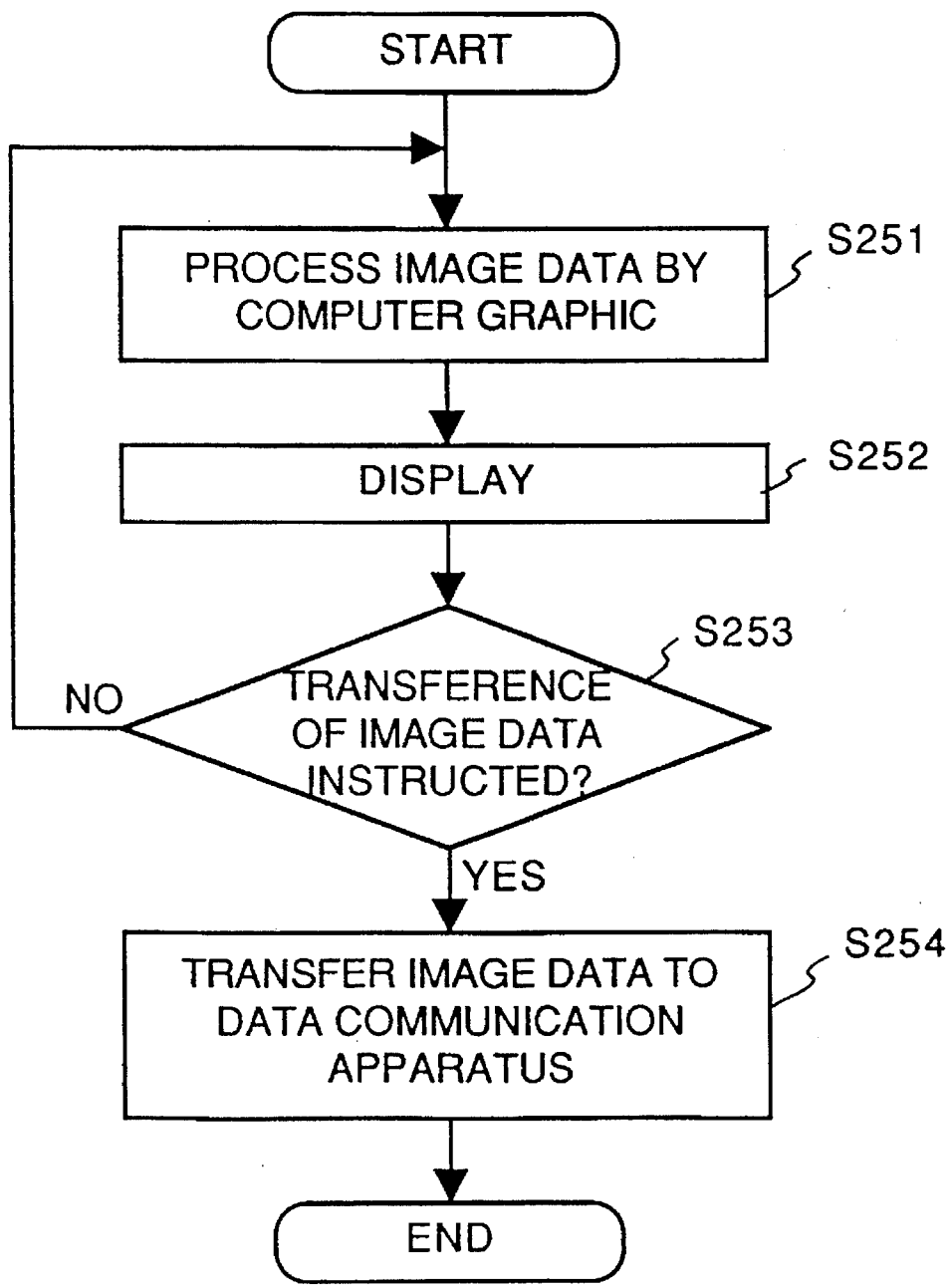
FIG. 29 is a flow chart which illustrates the contents of processes to be performed by a computer according to the third embodiment of the present invention.

FIG. 29 is a flow chart which illustrates operation to be performed from a moment graphic data is processed by the computer 203 to a moment data is transferred to the data communication apparatus 1.

In step S251, the keyboard 205 or the like is used to cause the computer 203 to process computer graphic data. In step S252, graphic data, which is being processed, is displayed on the graphic display 204. Graphic data according to this embodiment is raster scanning type binary image data. In next step S253, a discrimination is made as to whether or not instruction to transfer image data has been made by using the keyboard 205. If the instruction has not been made, the flow returns to step S251 in which the aforesaid process is repeated. If the transference has been instructed, the flow proceeds to step S254 in which processed graphic data is transferred to the data communication apparatus 201.

Figure 30:
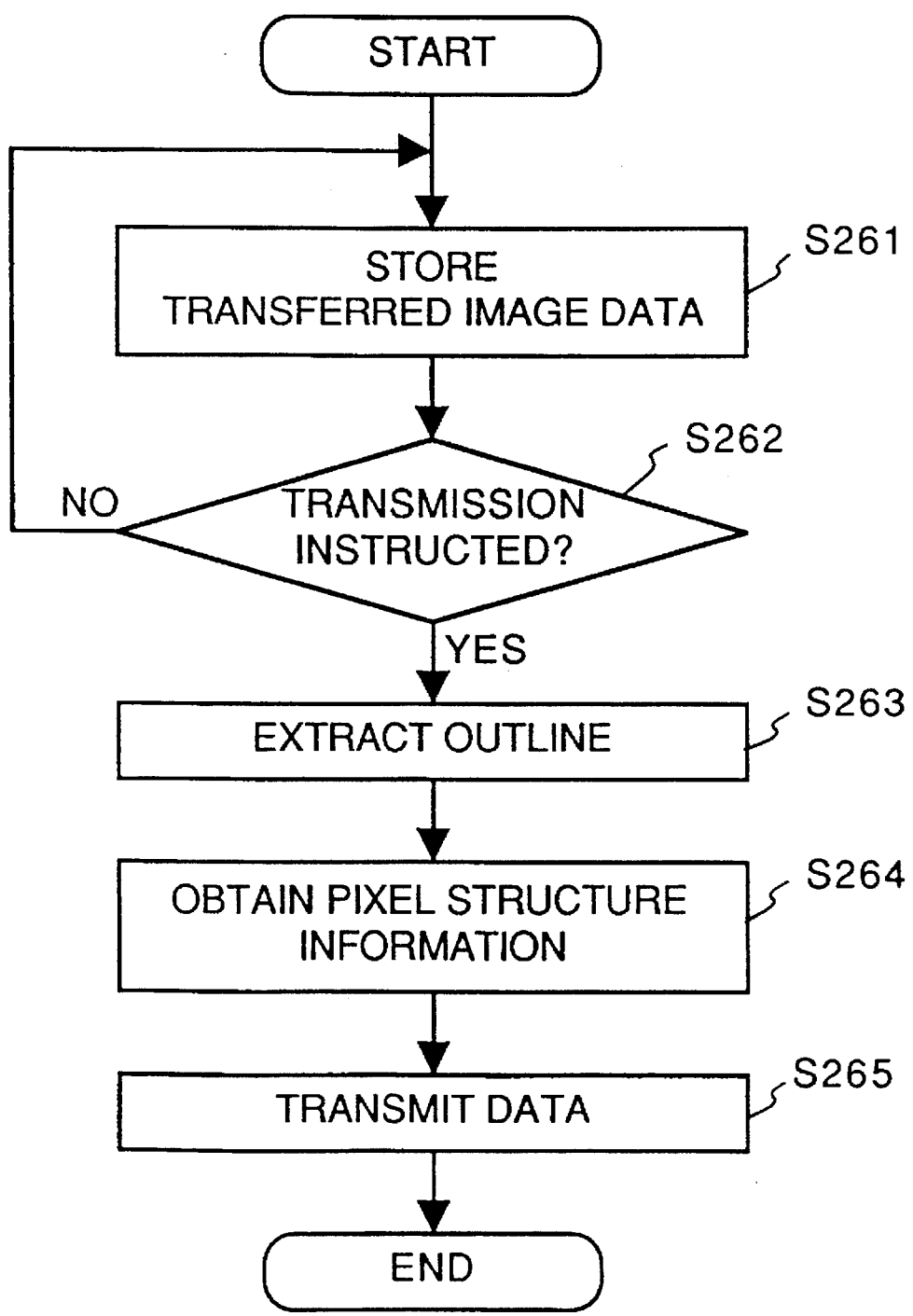
FIG. 30 is a flow chart which illustrates the contents of processes to be performed by the data communication apparatus according to the third embodiment.

FIG. 30 is a flow chart which illustrates a process for transmitting image data to be performed by the data communication apparatus 201.

In step S261, image data to be transferred from the computer 3 is stored in the image memory 211. In step S262, a discrimination is made as to whether or not instruction to transmit data has been made. If the instruction has not been made, the flow returns to step S261. If the data transference has been made, the flow proceeds to step S263. The instruction to transfer data may be made by an input of the instruction from the computer 203 or an input of the instruction made by using the operation panel attached to the data communication apparatus. In step S263, the outline processing portion 212 subjects image data stored in the image memory 211 to an outline extraction process so as to convert it into outline vector coordinate data. In next step S264, pixel structure information of processed image data is obtained from the pixel structure information storage portion 215 so as to add it as transmission data. The pixel structure information storage portion 215 stores pixel structure information which corresponds to the other end of the data line to which image data is transmitted. Therefore, pixel structure information can be obtained from the pixel structure information storage portion 215, the pixel structure information corresponding to the other end of the data line. In step S265, data generated or obtained in steps S263 and S264 is transmitted. That is, data is modulated by the modem 213 before data is transmitted to the data line 206 via the NCU 214.

As described above, the transmission side apparatus converts image data into outline data, and adds pixel structure information to outline data to transmit them. Then, the facsimile apparatus 202 which receives outline data with pixel structure information will now be described.

Figure 31:
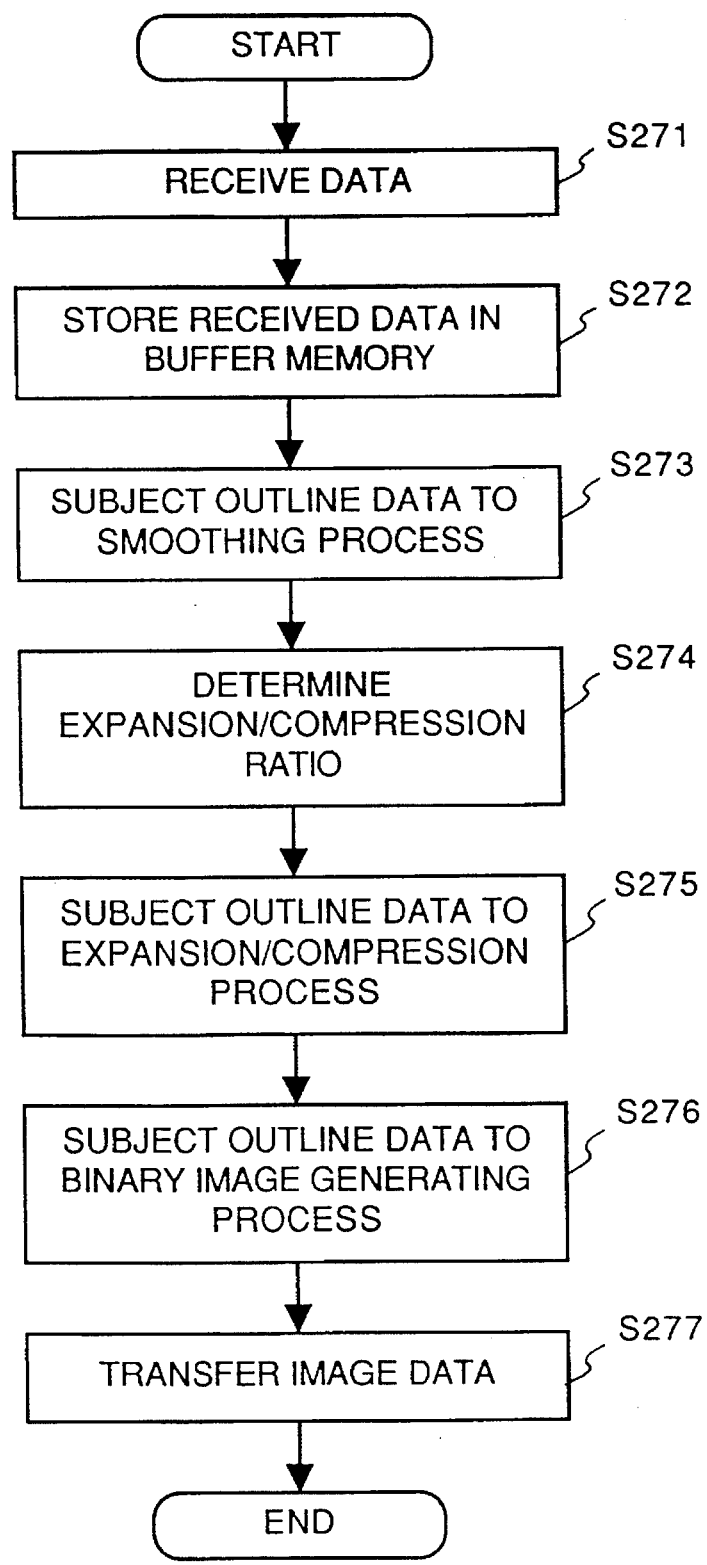
FIG. 31 is a flow chart which illustrates the contents of processes to be performed by the facsimile apparatus according to the third embodiment.

FIG. 31 is a flow chart of the receiving operation to be performed by the facsimile apparatus 202. The arrangement is so set that image data will be outputted to the recording portion 224 prior to performing the receiving operation.

In step S271, transmitted outline data and pixel structure information are received via the NCU 221 before they are demodulated by the modem 222. In step S272, demodulated pixel structure information and outline data are stored in the buffer memory 230. In step S273, the smoothing portion 231 subjects outline data stored in the buffer memory 230 to the smoothing process. In next step S274, the expansion/compression ratio to be employed in the expansion/compression process to be performed in the next step is determined. The expansion/compression ratio is determined in accordance with pixel structure information contained in data and pixel structure information of the receiving apparatus. In this embodiment, pixel structure information stored by the receiving side is same as the pixel structure of the recording portion of the receiving side facsimile apparatus 202. A method of determining the the ratio of expansion/compression is exemplified as follows, while assuming that the dot interval of pixel structure information is expressed by the number of dots (the dot density) per inch:

An expansion/compression ratio

=(dot density in the recording portion 224)/(dot density of outline data)

In next step S275, outline data is subjected to the expansion/compression process in the expansion/compression portion 232 by using the ratio of expansion/compression in step S274. In next step S276, the binary image generating portion 233 reproduces outline data, which has been subjected to the expansion/compression process, into raster scanning type binary image data. In the binary image reproducing process to be performed in step S276, the effective range of the image and the like are, of curse, determined in accordance with pixel structure information read from the pixel structure information storage portion 226 in step S274. In step S277, reproduced image data is transferred to the recording portion 224 so as to be recorded and outputted onto a recording paper sheet or the like.

As described above, in the data communication system according to the third embodiment and comprising the data communication apparatus and the facsimile apparatus, image data is divided into outline data and pixel structure information so as to be transmitted from the data communication apparatus serving as the transmission side apparatus. Since outline data is the relative value of an image, the expansion/compression of outline data can easily be performed. In the facsimile apparatus serving as the receiving side apparatus, received outline data is subjected to the expansion/compression process in accordance with received pixel structure information so as to be converted into raster scanning type binary image data having a predetermined pixel structure. By performing the image data communication in accordance with the aforesaid procedure, outline data transmitted from the transmission side apparatus can be subjected to the smoothing and expansion/compression processes while featuring the characteristic points and outline regardless of the pixel structure (for example, the vertical and horizontal directional interval of displayed dots or the number of the dots) of outline data transmitted from the transmission side apparatus. Therefore, deterioration of the image quality can be prevented, and the resolution can be converted. Hence, communication of image data between apparatus having different pixel structures can be executed while preventing deterioration of the image quality.

Fourth Embodiment

A data communication system according to a fourth embodiment is arranged in such a way that the facsimile apparatus is made to be the transmission side apparatus and the data communication apparatus to which the computer is connected is made to be the receiving side apparatus.

Figure 32:
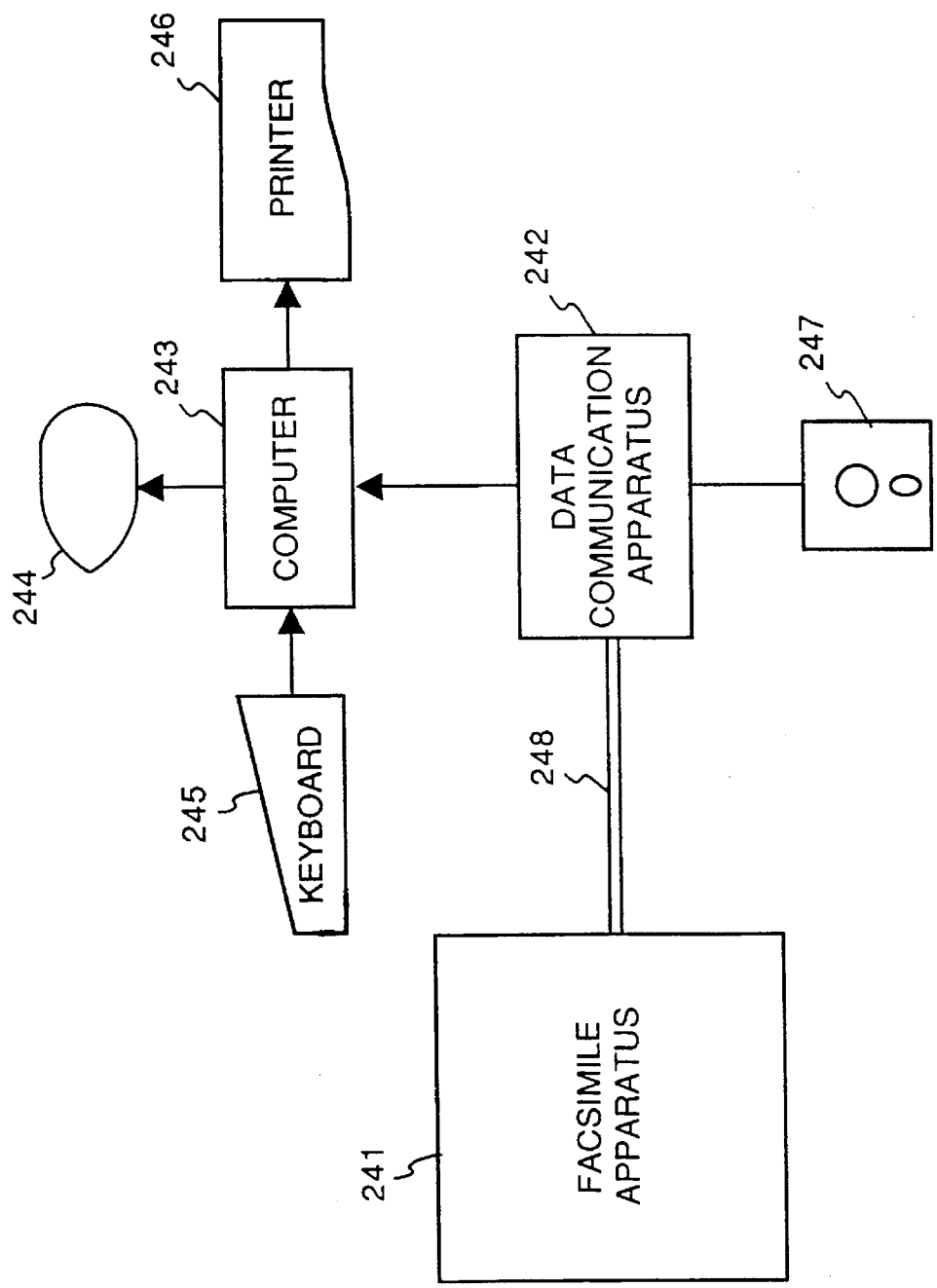
FIG. 32 is structural view which illustrates a data communication system according to a fourth embodiment of the present invention.

FIG. 32 is a block diagram which illustrates the state of connection between units of the data communication system according to the fourth embodiment.

Referring to FIG. 32, a facsimile apparatus 241 has an outline function, and transmits read original document while forming it into outline data. A data communication apparatus 242 has an outline function, and receives outline data transmitted from the facsimile apparatus 241 so as to again convert it into binary image data so as to output binary image data to a computer 243 or the like. The computer 243 is connected to the data communication apparatus 242 and it is arranged to perform a variety of operations such as the image processing operations. A graphic display 244 displays graphic data generated by by the computer 243 or image data received by the data communication apparatus 242. A keyboard 245 is used to input a variety of commands into the computer 243. Reference numeral 246 denotes a printer capable of printing image data. Reference numeral 247 denotes a floppy disk portion capable of storing image data. Image data recorded to the floppy disk in the storage portion 247 can be read out onto another apparatus.

Figure 33:
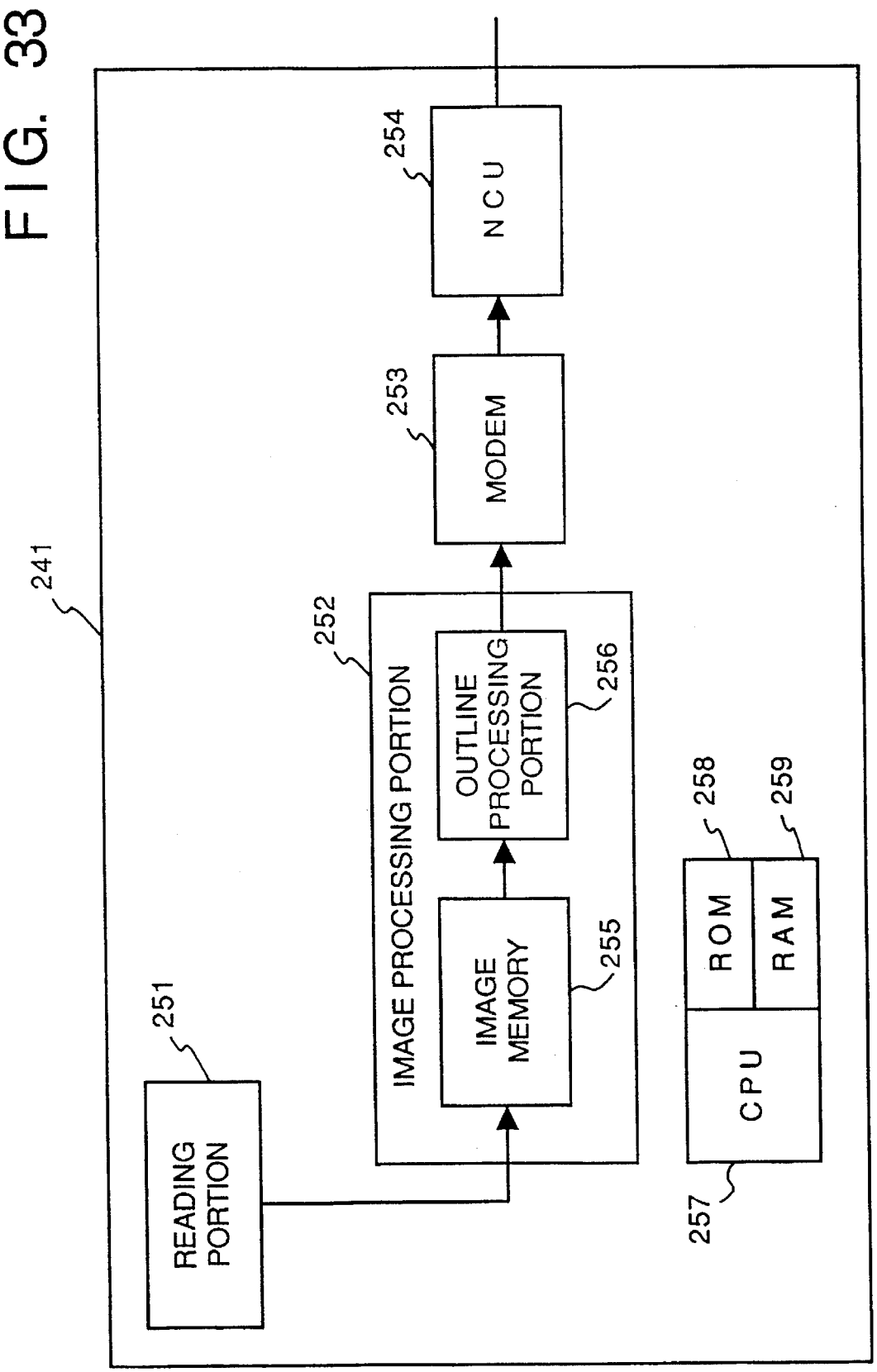
FIG. 33 is an internal block diagram of a facsimile apparatus according to the fourth embodiment of the present invention.

FIG. 33 is a block diagram which illustrates the functional structure of the facsimile apparatus 241.

Referring to FIG. 33, a reading portion 251 read the image of the original document, generates raster scanning type binary image data, and transfer it to an image processing portion 252, the reading portion 251 having a CCD and a step motor. The image processing portion 252 receives raster scanning type binary image data from the reading portion 251 so as to convert it into outline data. Then, the image processing portion 252 outputs outline data, while adding information about the pixel structure of the reading portion 251 to outline data, to the modem 253. The modem 253 subjects supplied data to the modulation process. Modulated data is outputted to a telephone line 248 via an NCU 254. Pixel structure information of the reading portion 251 is stored in a ROM 258.

The image processing portion 252 will now be described further in detail.

Raster scanning type binary image data received by the reading portion 251 is stored in an image memory 255. An outline processing portion 256 extracts the outline vector from image data stored in the image memory 25 so as to convert image data into outline vector coordinate data. Outline vector coordinate data thus obtained is outputted to the modem 253. It should be noted that means for extracting the outline vector from the binary image is the means according to the second embodiment.

Each unit of the facsimile apparatus 241 according to this embodiment is controlled by a CPU 257. The CPU 257 includes a ROM 258 which stores a control program to be executed by the CPU 257 and a variety of data items and a RAM 259 serving as a working area for the CPU 257.

Figure 34:
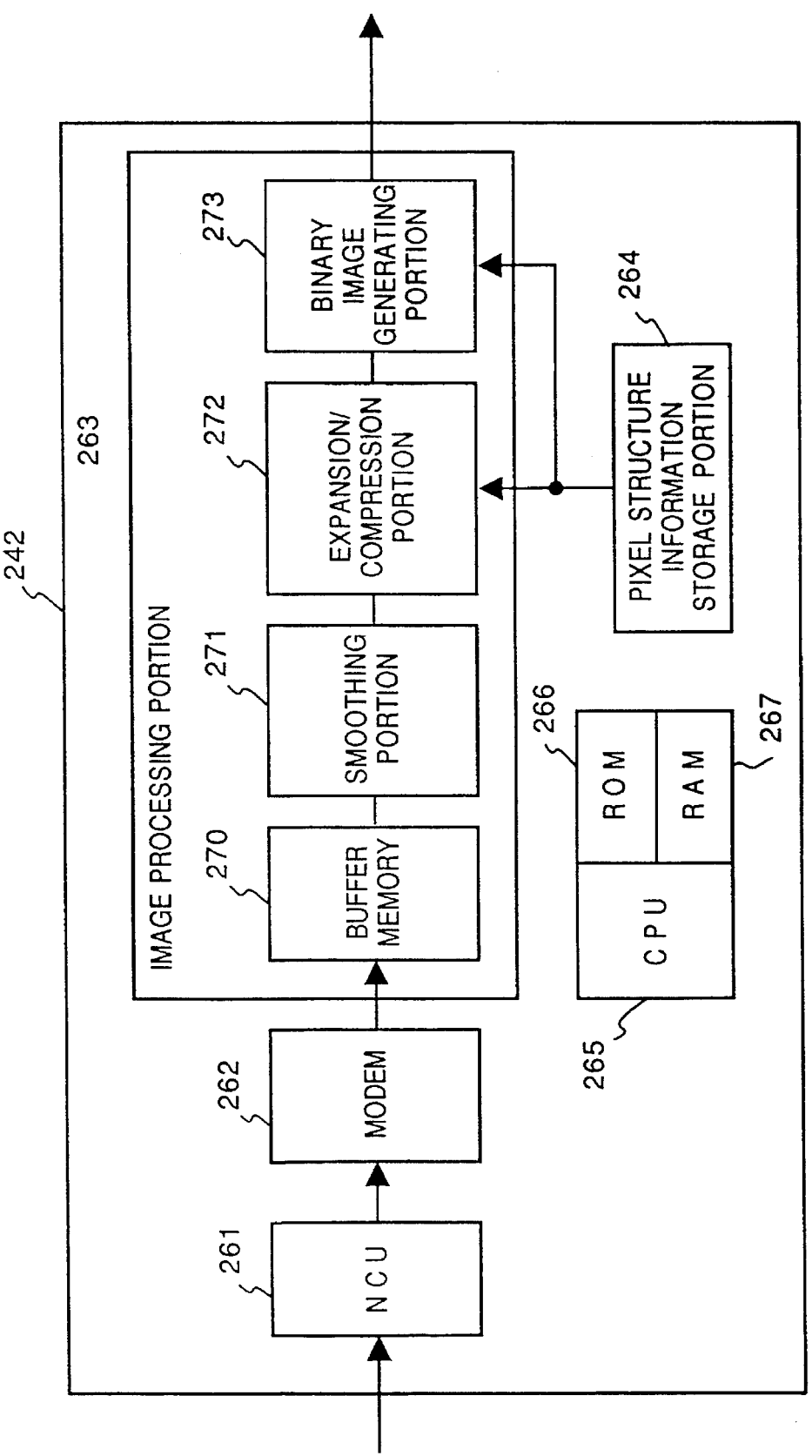
FIG. 34 is an internal block diagram of the data communication apparatus according to the fourth embodiment of the present invention.

FIG. 34 is a block diagram which illustrates the internal structure of the data communication apparatus 242 according to the fourth embodiment.

Referring to FIG. 34, reference numeral 261 denotes an NCU (network control unit) through which pixel structure information and outline data transferred from the facsimile apparatus 241 on the telephone line 248 is received. A modem 262 demodulates outline data received while being formed into the demodulated state. An image processing portion 263 converts received outline data into raster scanning type binary image data adaptable to the pixel structure of the apparatus to which image data is transferred. A pixel structure information storage portion 264 stores pixel structure information corresponding to the apparatus to which data is transferred. A CPU 265 controls each unit of the data communication apparatus 242. A ROM 266 stores a program with which the CPU 265 is operated and a variety of data items. A RAM 267 is a working area for the CPU 265.

Then, the image processing portion 263 will now be described further in detail.

Reference numeral 270 denotes a buffer memory which stores pixel structure information and outline data demodulated by the modem 262. A smoothing portion 271 subjects outline data stored in the buffer memory 270 to the smoothing process. An expansion/compression portion 272 subjects outline data to the expansion/compression process. The ratio of expansion/compression is determined on the basis of pixel structure information supplied together with outline data and the pixel structure of the apparatus to which image data is transferred. A binary image generating portion 273 reproduces outline data, which has been subjected to the expansion/compression process, into raster scanning type binary image data. Binary image data thus reproduced is outputted to the computer 243 or the storage device 247.

Then, an operation of communicating image data between the facsimile apparatus 241 and the data communication apparatus 242 each of which structured as described above will now be described with reference to flow charts shown in FIGS. 35 and 36.

Figure 35:
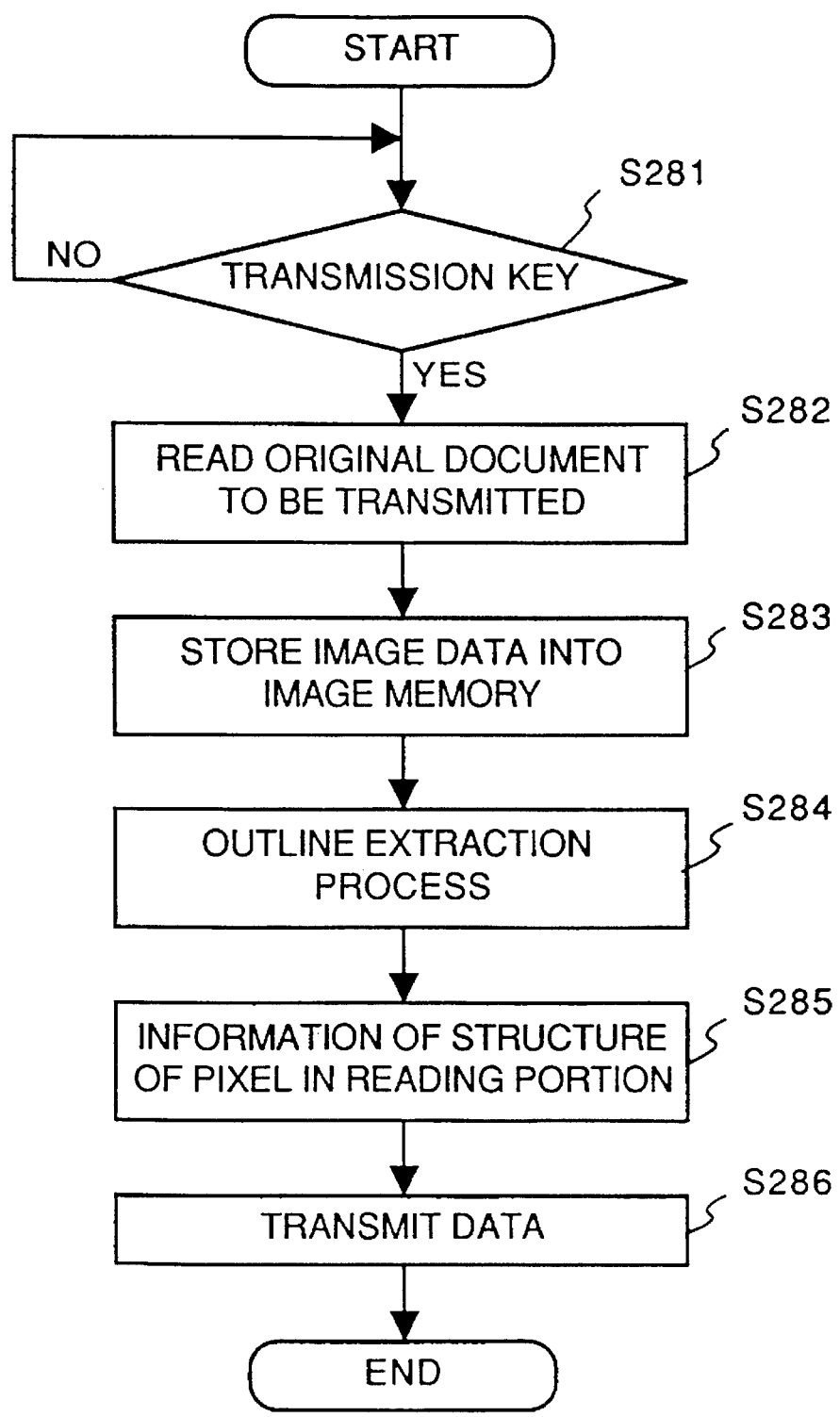
FIG. 35 is a flow chart which illustrates the contents of the transmission process to be performed by the facsimile apparatus according to the fourth embodiment of the present invention.

FIG. 35 is a flow chart which illustrates the procedure of the image data transmission operation to be performed by the facsimile apparatus 241.

In step S281, when one-touch key for instructing the transmission is depressed, the flow proceeds to step S282. In step S282, the reading portion 251 reads the image of the original document, and transmits it, as raster scanning type binary image data, to the image processing portion 252. In step S283, binary image data transferred from the reading portion 251 is stored in the image memory 255. In step S284, the outline processing portion 256 extracts the outline from image data stored in the image memory 255 so as to obtain outline vector coordinate data. In step S285, information about pixel structure of the reading portion 251 is added, and it is, together with outline vector coordinate data, used to constitute transmission data. In step S286, transmission data generated in steps S284 and S285 is transmitted. That is, transmission data is outputted via the NCU 254 after it has been modulated by the modem 253.

Figure 36:
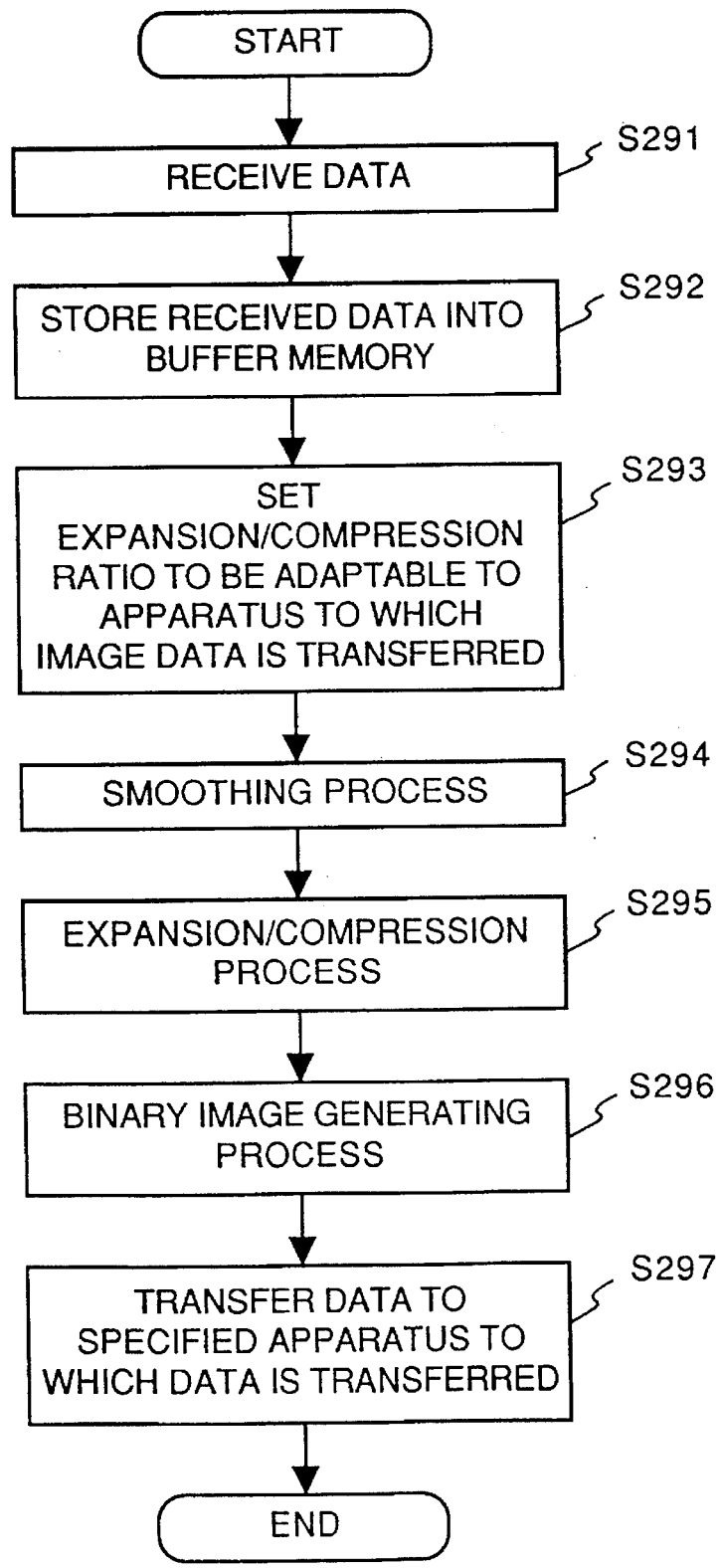
FIG. 36 is flow chart which illustrates the contents of the receiving process to be performed by the data communication apparatus according to the fourth embodiment of the present invention.

FIG. 36 is a flow chart which illustrates the procedure of the image data receiving operation to be performed by the data communication apparatus 242. It should be noted that image data is arranged to be transmitted to the computer 243, that is, the graphic display 244 prior to performing the receiving process.

In step S291, pixel structure information and outline data are received, and in next step S292, received pixel structure information and outline data are stored in the buffer memory 270. In next step S293, a ratio of expansion/compression is determined to be adaptable to the apparatus to which data is transferred. Since data is transferred to the graphic display 244 in this embodiment, pixel structure information of the graphic display 244 is read from the pixel structure information storage portion 264 for example. The ratio of expansion/compression is determined on the basis of pixel structure information of the graphic display 244 and received pixel structure information thus obtained. Incidentally, pixel structure information adaptable to each apparatus to which data is transferred is stored in the pixel structure information storage portion 264.

In step S294, the smoothing portion 271 subject outline data stored in the buffer memory 270 to the smoothing process. In next step S295, the ratio of expansion/compression determined in step S293 is used to subject outline data to the expansion/compression process. In step S296, the binary image reproducing portion 273 converts outline data into raster scanning type binary image data. In step S297, binary image data is transferred to the predetermined apparatus to which data is transferred. In this embodiment, image data is transferred to the graphic display 244 via the computer 243.

As described above, in the data communication system according to the fourth embodiment and comprising the facsimile apparatus and the data communication apparatus, image data is divided into outline data and pixel structure information so as to be transmitted from the facsimile apparatus serving as the transmission side apparatus. Since outline data is the relative value of an image, the expansion/compression of outline data can easily be performed. In the data communication apparatus serving as the receiving side apparatus, received outline data is subjected to the expansion/compression process in accordance with received pixel structure information so as to be converted into raster scanning type binary image data having a predetermined pixel structure. By performing the image data communication in accordance with the aforesaid procedure, outline data transmitted from the transmission side apparatus can be subjected to the smoothing and expansion/compression processes while featuring the characteristic points and outline regardless of the pixel structure (for example, the vertical and horizontal directional interval of displayed dots or the number of the dots) of outline data transmitted from the transmission side apparatus. Therefore, deterioration of the image quality can be prevented, and the resolution can be converted. Hence, communication of image data between apparatus having different pixel structures can be executed while preventing deterioration of the image quality.

Although the receiving side apparatus smooths outline data in the arrangements according to the third or the four embodiment, outline data may be transmitted after it has been smoothed by the transmission side apparatus. In this case, the smoothing portion is included by the transmission side apparatus.

As described above, according to the third and the fourth embodiments, communication of image data between apparatus having different pixel structures can be executed, and the deterioration of the image quality taken place due to performing the process of converting the pixel structure can be prevented by using the outline extraction method.

Fifth Embodiment

In the third or the fourth embodiment, pixel structure information about outline data is added when outline data is transmitted. The receiving side apparatus performs the expansion/compression of received outline data on the basis of the pixel structure information about the transmission side apparatus contained in received data and pixel structure information of the receiving side apparatus. Therefore, the receiving side apparatus must subject received outline data to the expansion/compression process without exception.

Accordingly, a fifth embodiment is arranged to previously store pixel structure information of a plurality of receiving side apparatuses. In the case where an image is actually transmitted, the expansion/compression process is performed on the basis of information about the pixel structure of the receiving side apparatus and information about the pixel structure of the transmission side apparatus before the image is transmitted. Therefore, the receiving side apparatus must simply perform the printing process in accordance with received data.

Then, the fifth embodiment will now be described in detail.

Figure 37:
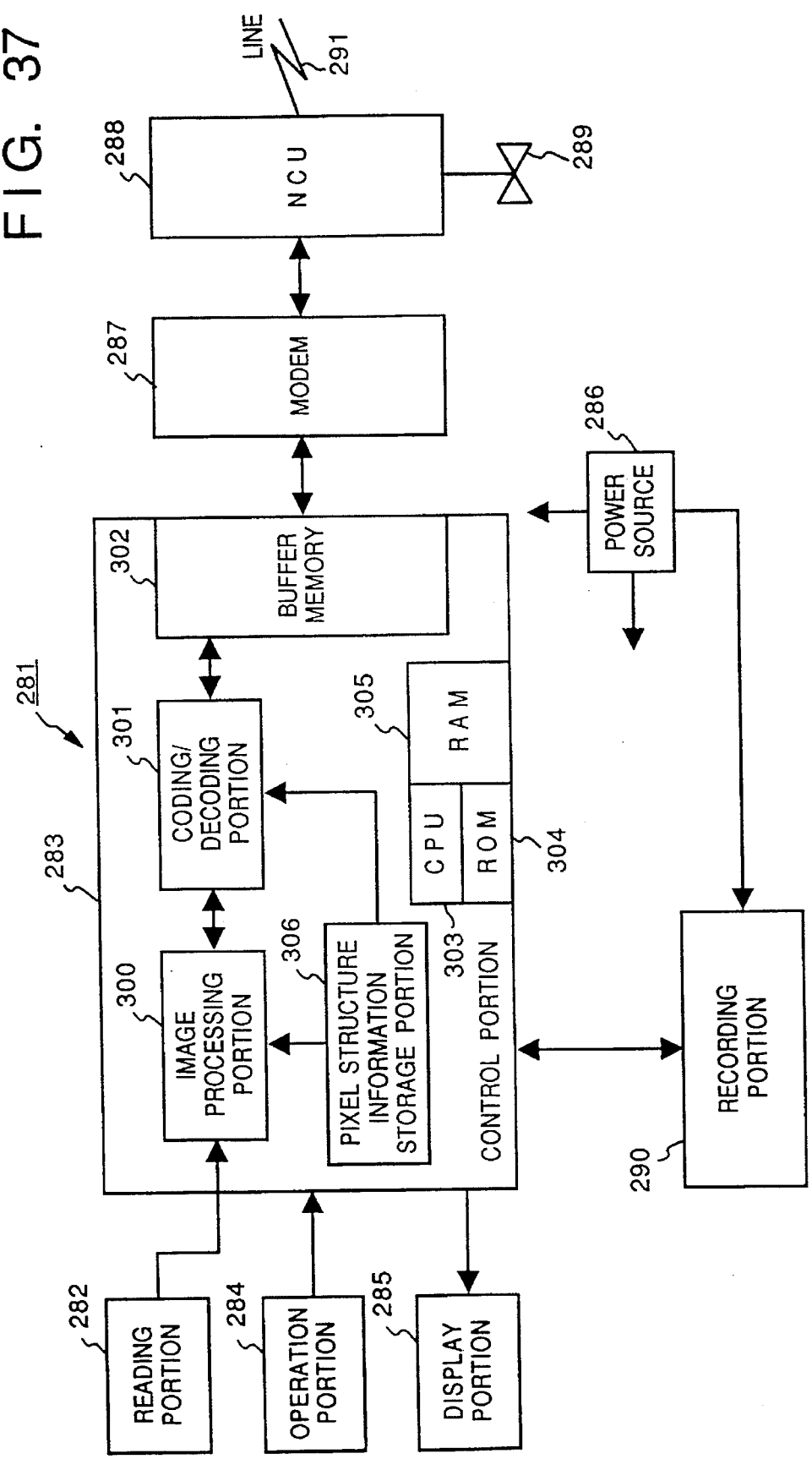
FIG. 37 is a block diagram which illustrates a facsimile apparatus according to a fifth embodiment of the present invention.

FIG. 37 is a block diagram which illustrates the schematic structure of a facsimile apparatus according to the fifth embodiment. Referring to FIG. 37, a reading portion 282 reads the transmitted original document and generates a raster scanning type binary image signal so as to output it to a control portion 283, the reading portion 282 having an original-document conveying motor and a CCD image sensor.

Then, the structure of the control portion 283 will now be describe. An image processing portion 300 executes pixel structure conversion for the purpose of making the pixel structure of image data received by the reading portion 282 coincide with the pixel structure of the receiving side apparatus. Image data, the pixel structure of which has been converted, is outputted to a coding/decoding portion 301 from the image processing portion 300. At the time of receiving image data, the image processing portion 300 stores received image data decoded by the coding/decoding portion 301, and outputs it to a recording portion 290, so that an image is formed.

The coding/decoding portion 301 encodes image information to be transmitted by MH coding method, and decodes received coded image data into image data. When the encoding process is performed by the coding/decoding portion 301, a signal for line synchronization and the like are added in accordance with pixel structure information of the receiving side apparatus received by a pixel structure information storage portion 306. A buffer memory 302 stores coded image data to be transmitted or coded image data which has been received. Each unit of the control portion 283 is controlled by a CPU 303 of, for example, a microprocessor. The control portion 283 has a ROM 304 has a ROM 304 which stores a program for controlling the CPU 303 or a variety of data items, and a RAM 305 serving as a working area for the CPU 303 and temporarily storing a variety of data items as well as the CPU 303. A pixel structure information storage portion 306 previously stores pixel structure information about a plurality of receiving side apparatuses.

An operation portion 284 has a variety of function instruction keys for instructing to start transmission for example, a telephone No. inputting key, a one-touch key and key for realizing a telephone No. contraction dial. A display portion 285 is usually disposed adjacent to the operation portion 284 so as to display a variety of the functions and states. A power source portion 286 supplies electric power to the overall structure of the apparatus. Reference numeral 287 denotes a modem (modulating/demodulating device), 288 denotes a network control portion (NCU), and 289 denotes a telephone set. The recording portion 290 records an image onto a recording paper sheet by, for example, a thermal transfer recording method and outputs the record of the receiving operations, copies, reports about the result of the communication. The recording portion 290 is connected to other data communication apparatuses or a facsimile apparatus via a line 291.

Figure 38:
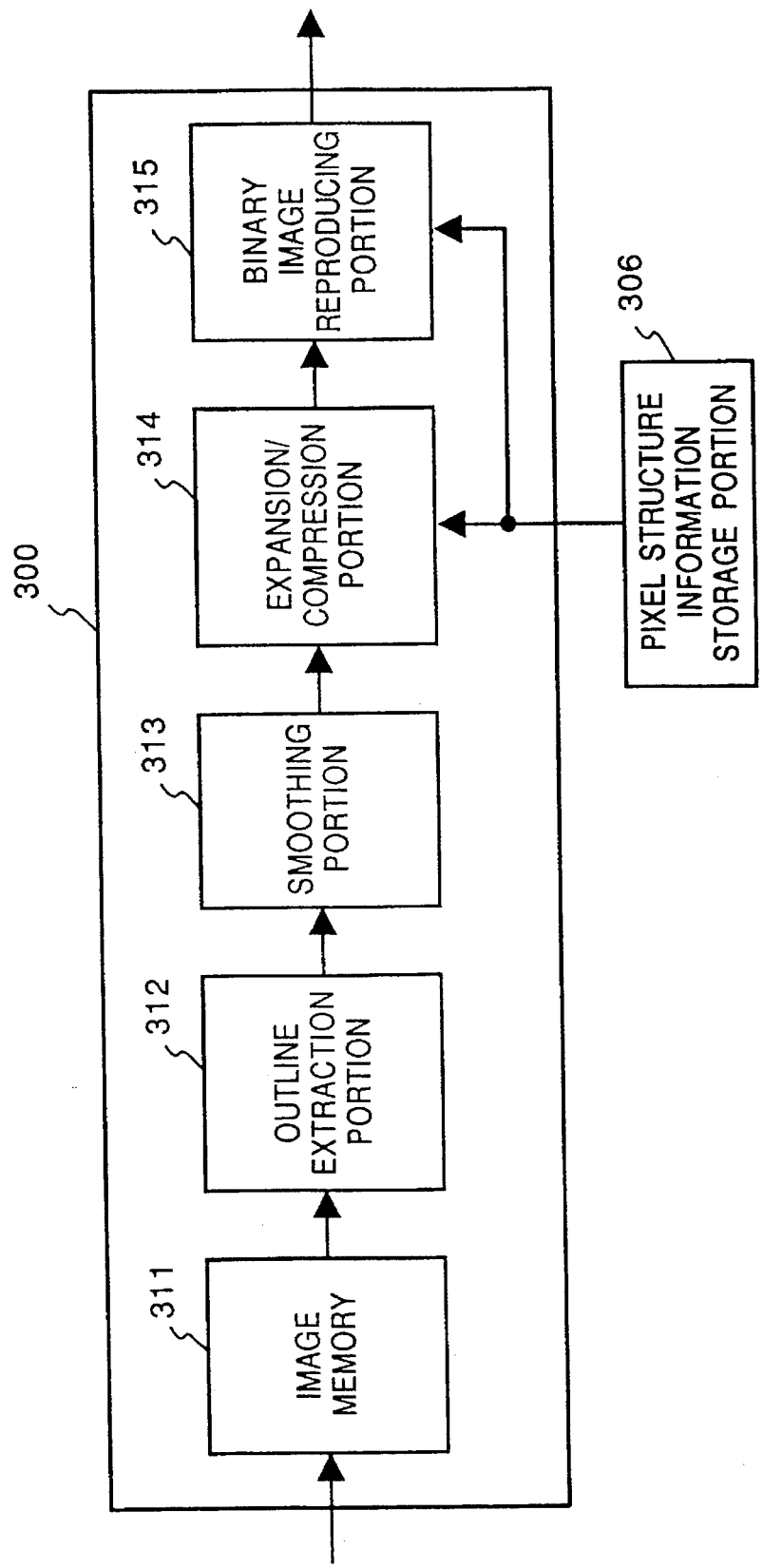
FIG. 38 is an internal block diagram which illustrates an image processing portion of the facsimile apparatus according to the fifth embodiment of the present invention.

FIG. 38 is a block diagram which illustrates the functional structure of the image processing portion employed in the structure of the facsimile apparatus. An image memory 311 stores binary image data supplied from the reading portion 282. An outline extraction portion 312 subject image data stored in the image memory 311 to an outline extraction process. In this embodiment, binary image data first becomes vector coordinate data which shows the boundary between a black portion and a white portion. Then, a smoothing portion 313 subjects outline data to the smoothing process so as to forming vector data about a fine and rough portion into a diagonal line and/or to remove isolated points and notches.

By using data about the coordinates of the outline vector obtained from the outline extraction portion 312 and the smoothing portion 313, the expansion/compression process is performed in the expansion/compression portion 314. The ratio of expansion/compression is determined on the basis of information about the pixel structure of the receiving side apparatus obtainable from the pixel structure information storage portion 306. The ratio of expansion/compression is obtained by, for example, (resolution of the transmission side apparatus)/(resolution of receiving side apparatus). Outline vector, which has been subjected to the expansion/compression process in the expansion/compression portion 314, is again converted into the binary image by a binary image reproducing portion 315 before it is outputted to the coding/decoding portion 301. It should be noted that the binary image reproducing portion 315 develops outline vector data into the binary image in accordance with the number of vertical and horizontal pixels among information about the pixel structure.

Figure 39:
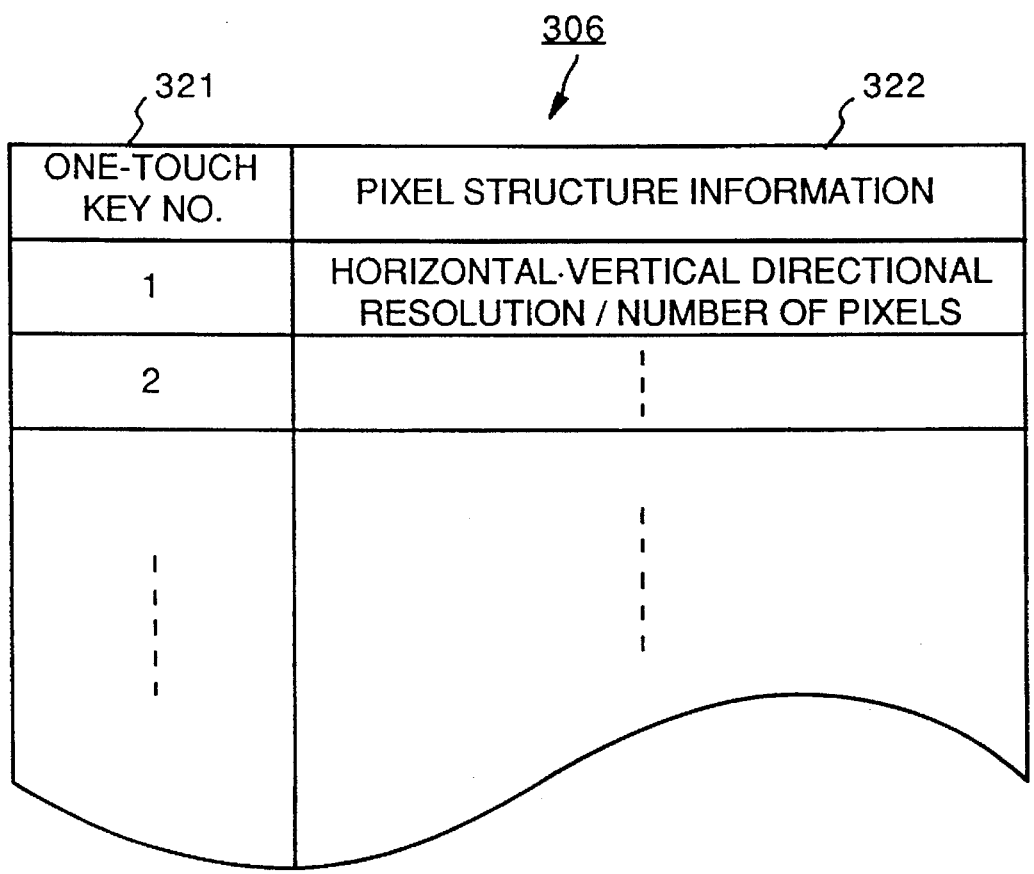
FIG. 39 illustrates an example of a state where data is stored in a pixel structure information storage portion shown in FIG. 38.

FIG. 39 illustrates a state where pixel structure information about each receiving side apparatus is stored in the pixel structure information storage portion 306. Pixel structure information 322 about the receiving side apparatus is stored to correspond to the one-touch key 321. The pixel structure information comprises, for example, the horizontal directional resolution (dpi), the vertical directional resolution (dpi), the number of the horizontal directional pixels (dot), and the number of the vertical directional pixels (dot). Although the fourth embodiment is arranged in such a way that the receiving side pixel structure information 322 is stored to correspond to the one-touch key, the present invention is not limited to this. For example, the receiving side pixel structure information 322 may be allowed to correspond to the telephone No. of the receiving side facsimile apparatus or the data communication apparatus.

Figure 40:
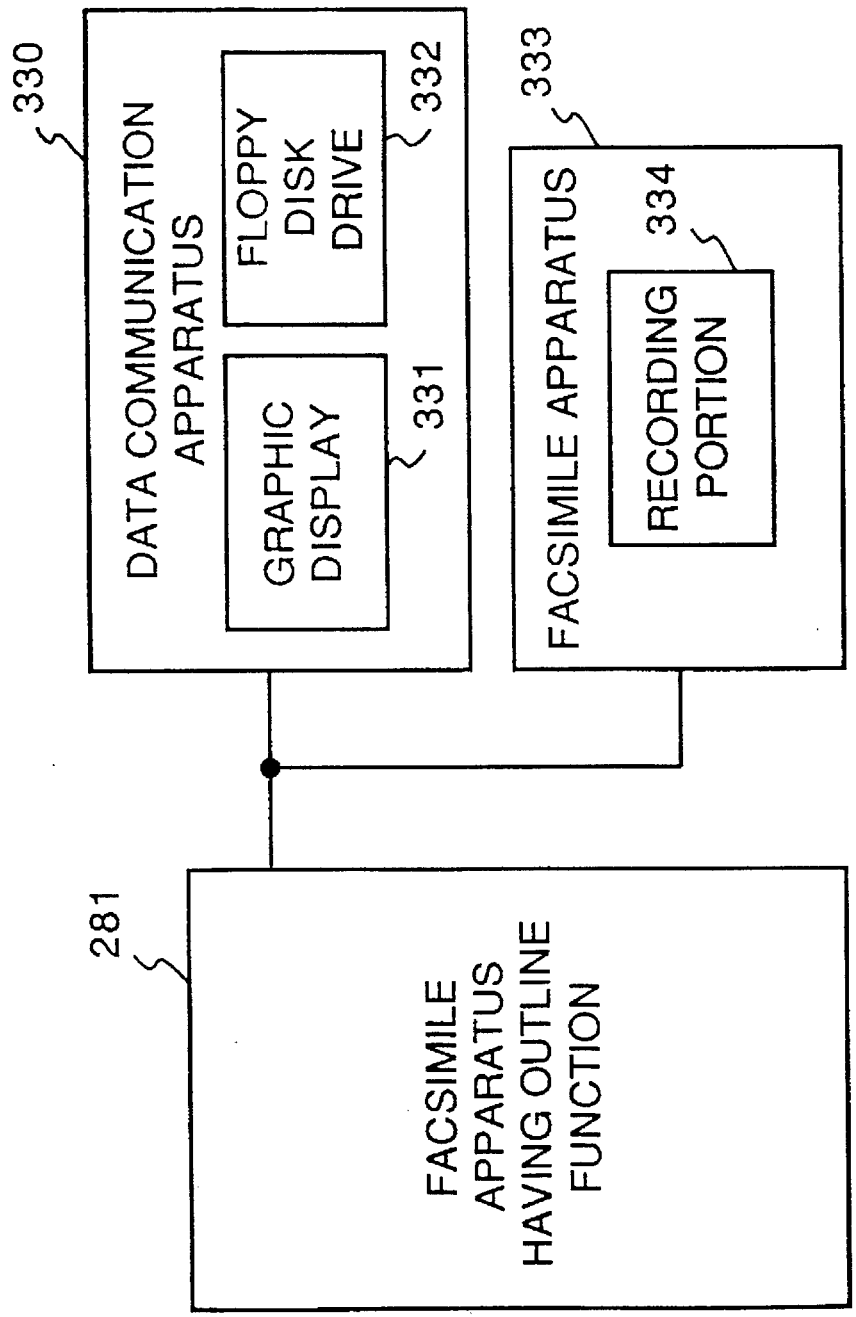
FIG. 40 illustrates the structure of a system according to the fifth embodiment of the present invention.

FIG. 40 illustrates the state of connection established in the fifth embodiment among the facsimile apparatus 281, the data communication apparatus 330 serving as the receiving side apparatus, and another facsimile apparatus 333. The data communication apparatus 330 has a graphic display 331 for displaying received image, and a floppy disk drive 332 capable of storing image signals. The other facsimile apparatus 333 has a recording portion 334 for recording the received image.

Figure 41:
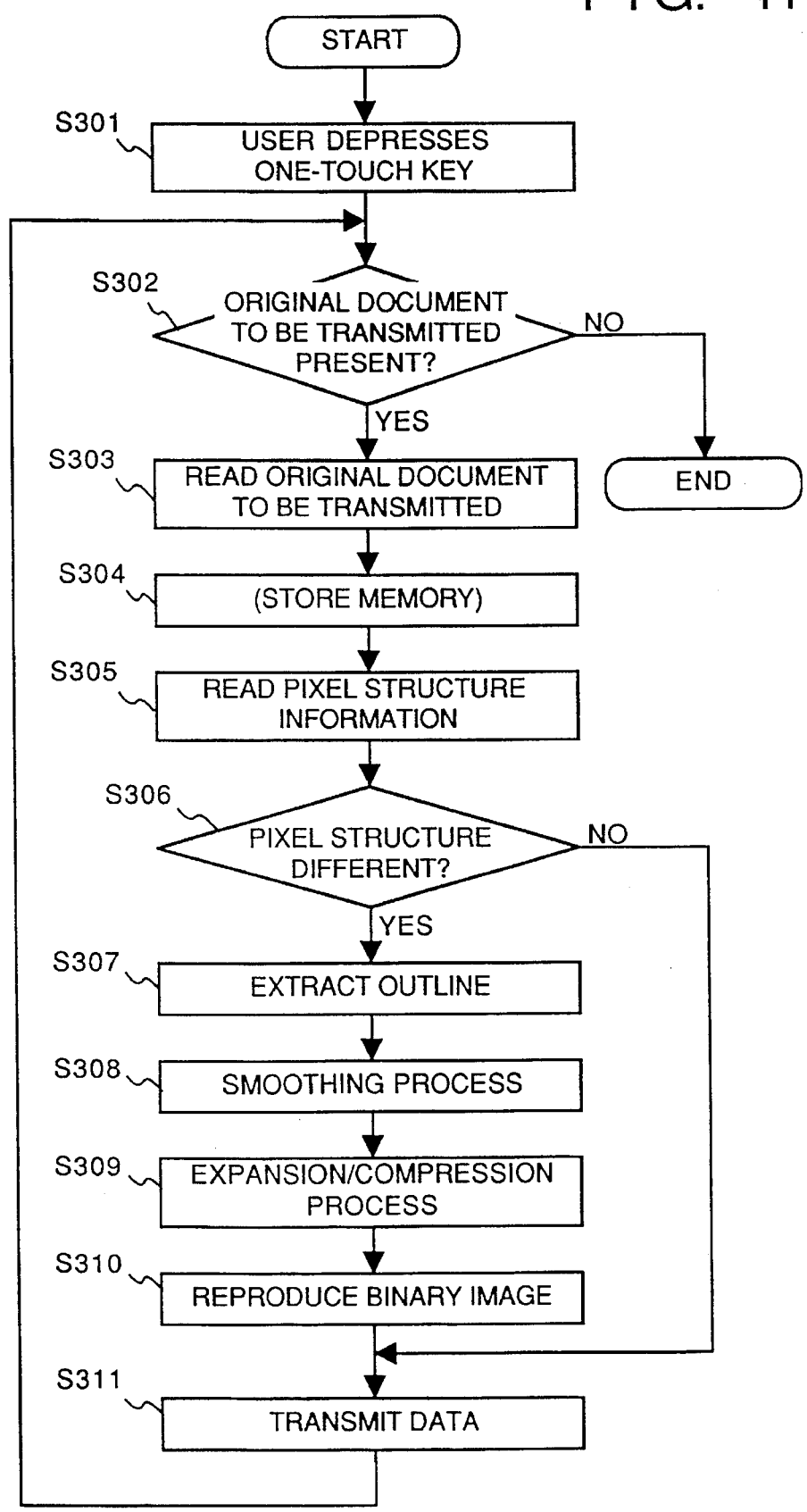
FIG. 41 is a flow chart which illustrates the contents of the data transmission process according to the fifth embodiment of the present invention.

FIG. 41 is a flow chart which illustrates the data transmission process to be performed by the facsimile apparatus 281 according to the fifth embodiment.

In step S301, a user sets an original document, and then depresses the one-touch key disposed in the operation portion 284 and corresponding to the apparatus to which image is transmitted. In step S302, a discrimination is made as to whether or not the original document to be transmitted is present. If no original document to be transmitted is set, this process is completed here. If the original document to be transmitted is present, the flow proceeds to step S303 in which the original document to be transmitted is read by the reading portion 282. In step S304, read data is stored in the image memory 311 of the control portion 283. In next step S305, information about the pixel structure of a display apparatus (the graphic display 331) of the receiving side apparatus or information about pixel structure of the recording portion 334 registered to correspond to the one-touch key is read from the pixel structure information storage portion 306.

In step S306, read information about the pixel structure of the receiving side apparatus and information about the pixel structure of the facsimile apparatus 281 are subjected to a comparison. If they coincide with each other, the flow proceeds to step S311 in which data transmission is executed as it is. If they do not coincide with each other, the flow proceeds to step S307 in which a process of converting the pixel structure is commenced by the outline process. In step S307, the boundary between a black portion and a white portion in the image data is extracted from the outline extraction portion 312, so that vector coordinate data is generated (outline extraction). In next step S308, generated vector coordinate data is smoothed by the smoothing portion 313.

In next step S309, the expansion/compression ratio determined on the basis of information about the pixel structure of the receiving side apparatus read in step S305 is used by the expansion/compression portion 314 to perform expansion/compression of data outputted from the smoothing portion 313. In step S310, the binary image reproducing portion 315 generates binary image data adaptable to the pixel structure of the receiving side apparatus on the basis of the outline data which has been perfomred expansion/compression process. In next Step S311, the data is transmitted to the data communication apparatus 330 or the facsimile apparatus 333. That is, data is encoded by the coding/decoding portion 301 so as to be transmitted to the like 291 via the modem 287 and the NCU 288. Then, the flow returns to step S302 in which the aforesaid process is repeated.

As described above, the facsimile apparatus according to the present invention enables the following effects to be obtained:

1. In the case where receiving side apparatus and the transmission side apparatus have the different pixel structures, an image, which reveals high quality because freed from deterioration of the image quality and, the resolution of which has been converted, can be transmitted even if the receiving side apparatus is a conventional facsimile apparatus or a data communication apparatus having no outline function.

2. The facsimile apparatus automatically executes the conversion process so as to be adaptable to the pixel structure of the receiving apparatus while eliminating a necessity for a user to be particularly conscious of dot information.

3. By using conventional technology of the one-touch key and the contracted telephone No. functions, the cost can be reduced and an cost-reduced apparatus can be provided for a user.

4. Since the outline extraction is not performed at the time of performing the data communication between the appanatuses the pixel structures of which coincide with each other, the communication speed realized in the conventional communication apparatus can be maintained.

5. In the case where the same image is simultaneously transmitted to data communication apparatuses or the facsimile apparatuses having the same pixel structure, the resolution conversion process, in which the outline process is performed, can be reduced to one time, resulting in the simultaneous and same information communication can be executed at high speed.

Therefore, image data transmitted from, for example, the facsimile apparatus according to the fourth embodiment, can be displayed on the graphic display of the receiving side data communication apparatus.

Although the fifth embodiment is arranged in such a way that data stored in the pixel structure information storage portion is utilized as information about the pixel structure of the receiving side apparatus is utilized, the present invention is not limited to this. Information about the pixel structure may be directly obtained from the apparatus to which data is transmitted. It can be arranged in such a manner that the pixel structure of the apparatus, to which data is transmitted, is detected by a method similar to a mode switching instruction (standard, fine or superfine) by using a DIS signal adapted to the facsimile communication, and the pixel structure of the transmission side apparatus is converted.

Sixth Embodiment

Figure 42:
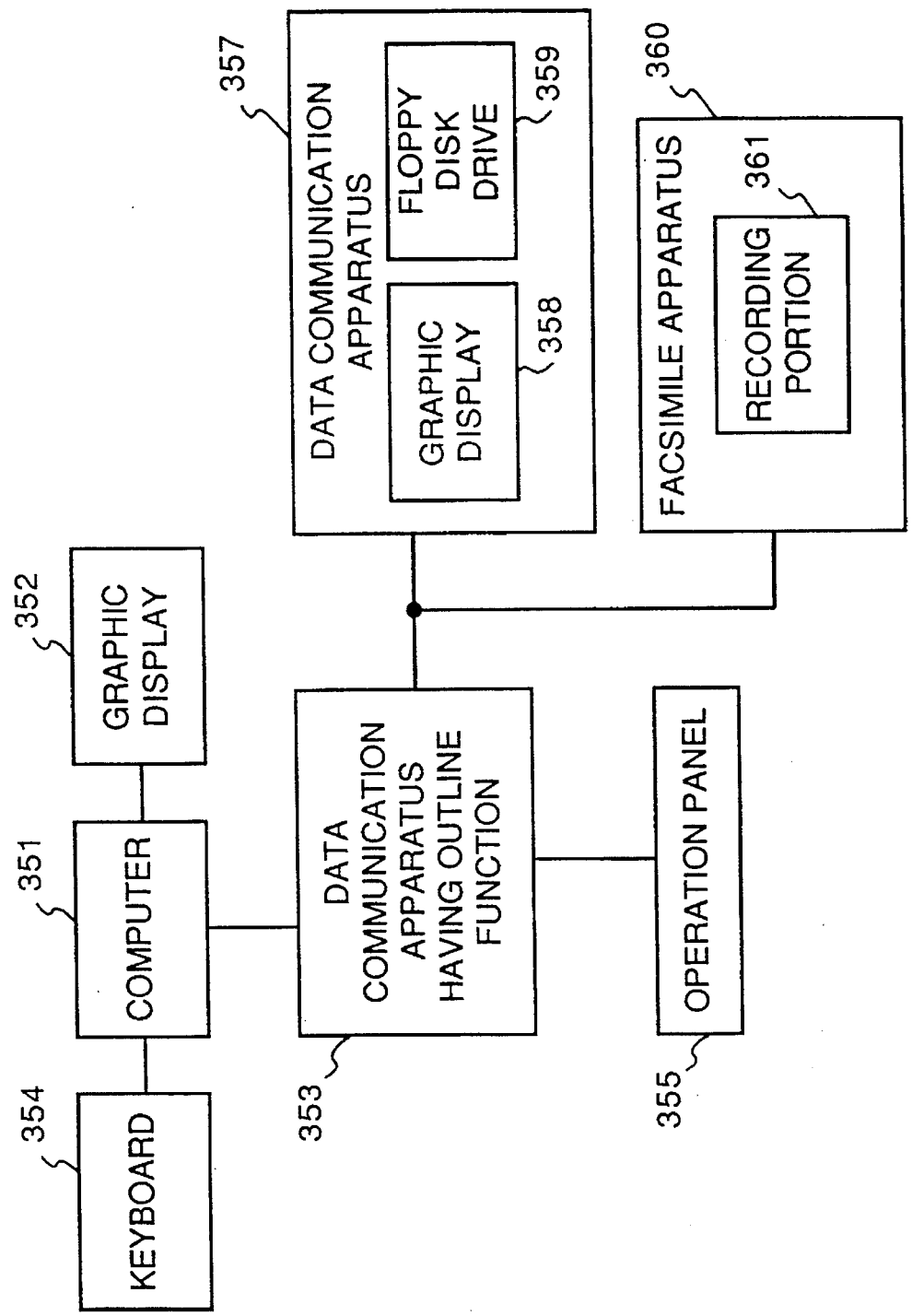
FIG. 42 is a block diagram which illustrates a facsimile apparatus according to a sixth embodiment of the present invention.

FIG. 42 illustrates the connection according to a sixth embodiment and established among a data communication apparatus another data communication apparatus, and a facsimile apparatus. A computer 351 performs a computer graphic process and the like. A graphic display 352 has a CRT on which graphic data processed by the computer 351 is displayed. A data communication apparatus 353 transmits graphic data processed by the computer 351 and displayed on the graphic display 352 to another data communication apparatus 357 or a facsimile apparatus 360 connected via a line 356. At this time, the data communication apparatus 353 subjects generated graphic data to the outline process and the expansion/compression process so as to convert the pixel structure of image data so as to be adaptable to the pixel structure of the receiving side apparatus. A keyboard 354 is connected to the computer 351 so as to instruct the computer 351 to perform a variety of processes. An operation panel 355 is connected to the data communication apparatus 353 and having a one-touch key and a key for realizing the contracted telephone dial function so as to instruct the data communication apparatus 353 to perform a variety of processes.

Figure 43:
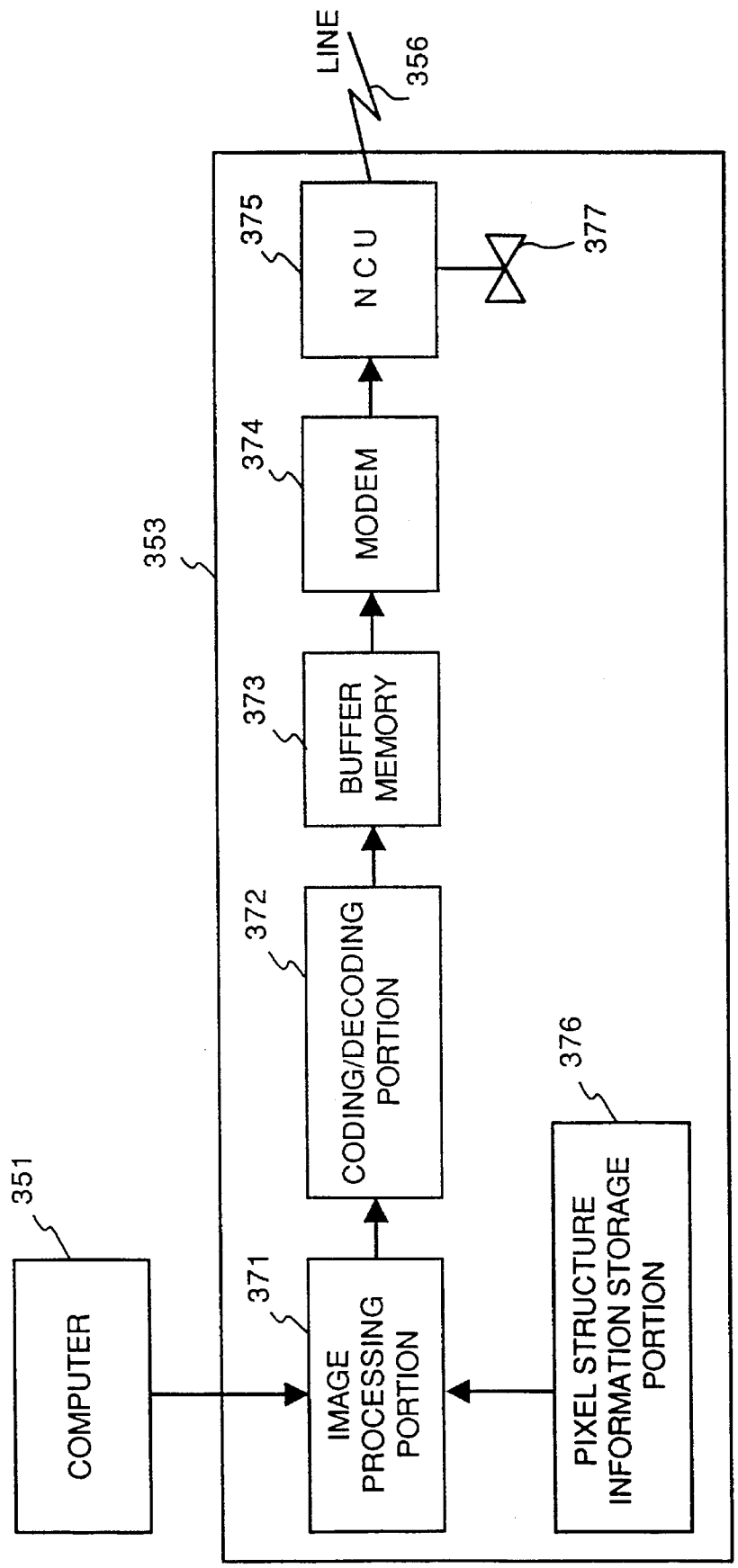
FIG. 43 is a block diagram which illustrates the data communication apparatus shown in FIG. 42.

FIG. 43 is a block diagram which illustrate the detailed structure of the data communication apparatus 353.

An image processing portion 371 executes the pixel structure conversion process at the time of transmitting image data in order to make the pixel structure of image data outputted from the computer 351 coincide with the pixel structure of the receiving side apparatus. Image data, the pixel structure of which has been converted, is, by the image processing portion 371, to a coding/decoding portion 372. The coding/decoding portion 372 encodes image data to be transmitted by an MH coding method or the like. When image data is encoded by the coding/decoding portion 372, line synchronizing signal or the like is added in accordance with information about the pixel structure of the receiving side apparatus obtained from a pixel structure information storage portion 376. A buffer memory 373 stores encoded image data to be transmitted or received encoded image data. Reference numeral 347 denotes a modem (modulating/demodulating device), 375 denotes a network control portion (NCU), and 377 denotes a telephone set.

Figure 44:
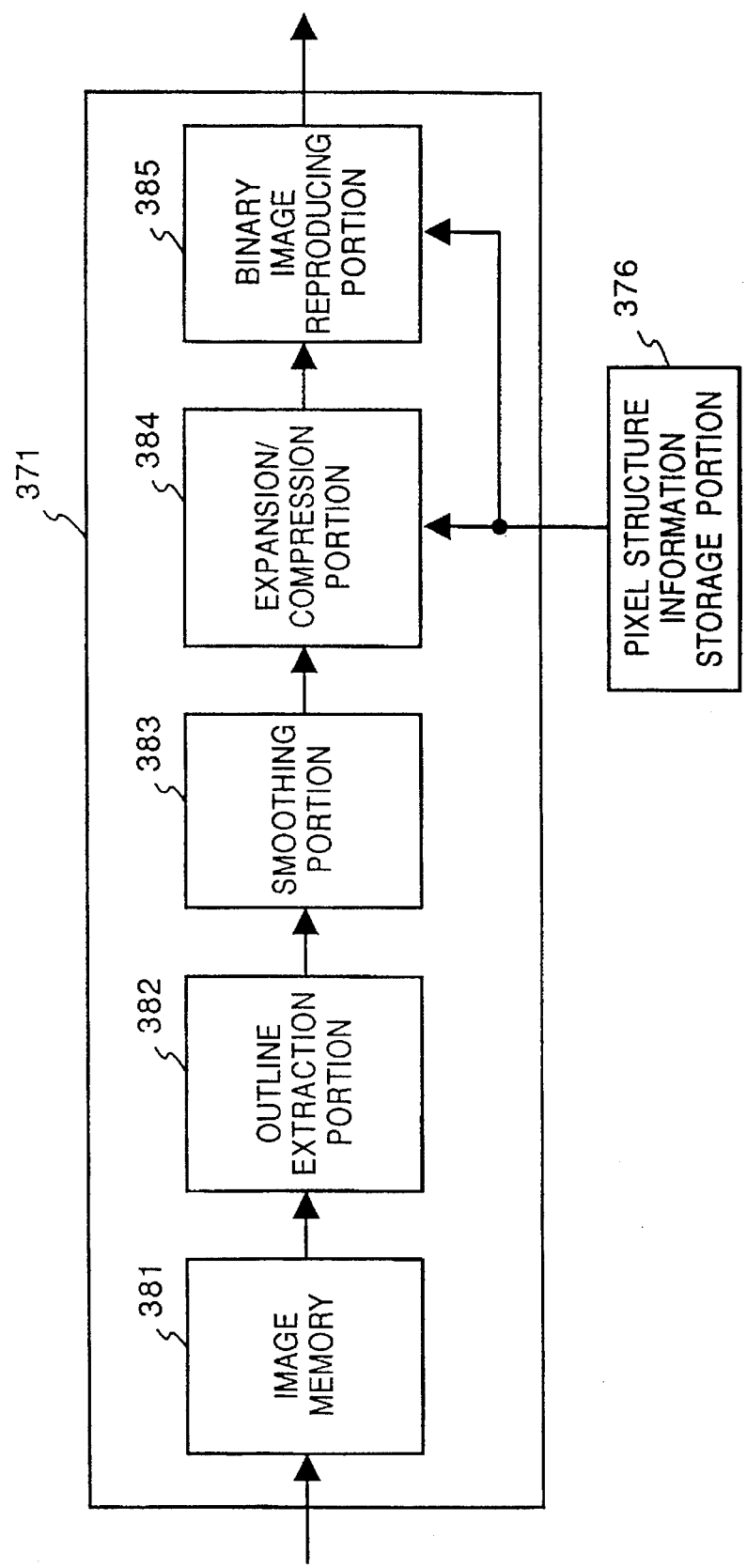
FIG. 44 is a block diagram which illustrates the image processing portion shown in FIG. 43.

The structure of the image processing portion 371 employed in the aforesaid structure is shown in FIG. 44 in which each function is the same as that according to the fifth embodiment shown in FIG. 38 and therefore its description is omitted here. Also the resolution information storage portion 376 is similarly arranged as that according to the fifth embodiment shown in FIG. 39 and its description is omitted here.

Then, the operation of the data communication apparatus structured as described above and according to the sixth embodiment will now be described in detail with reference to FIGS. 45 and 46.

Figure 45:
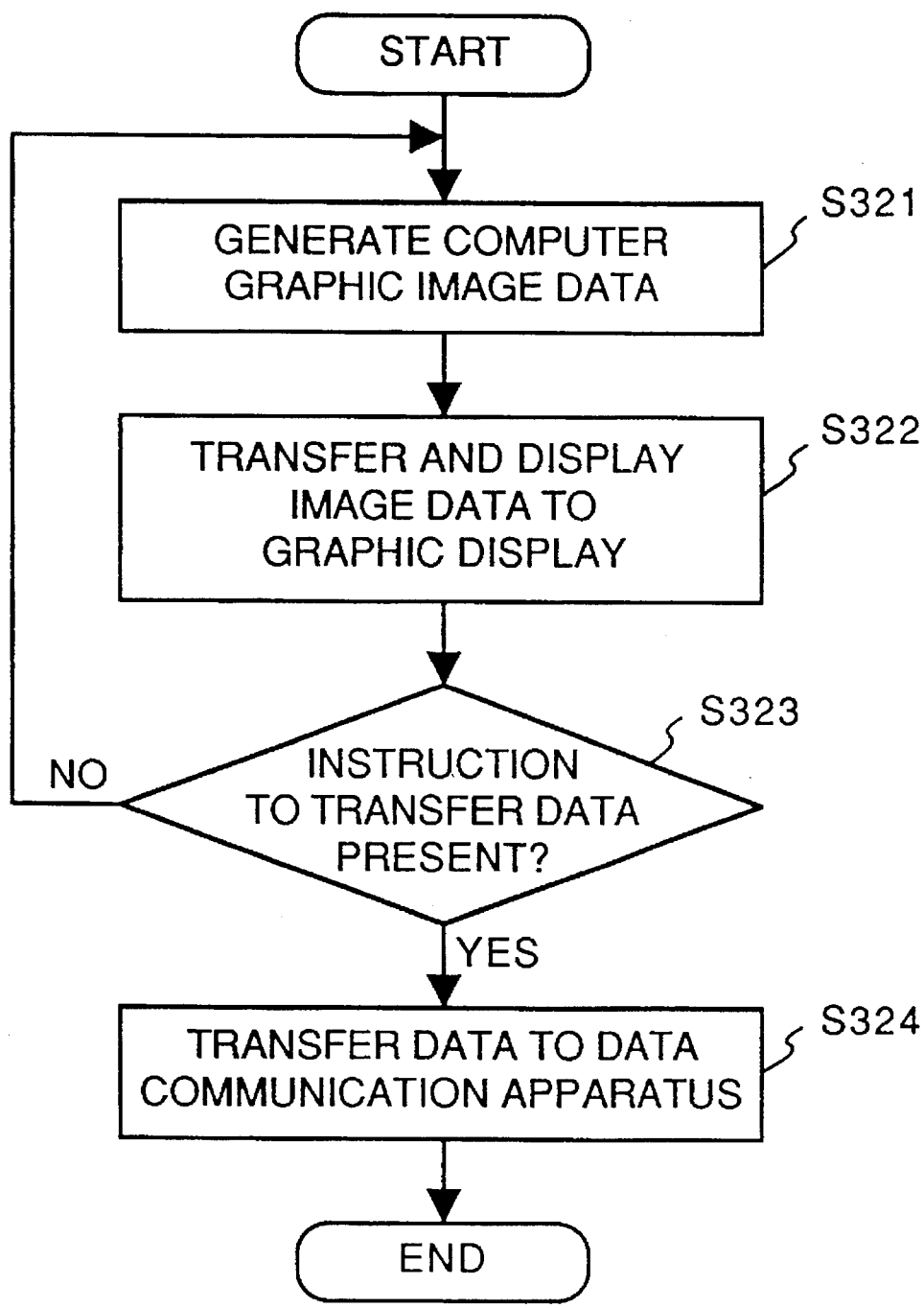
FIG. 45 is a flow chart which illustrates an example of the operation of the computer shown in FIG. 42.

FIG. 45 illustrates a procedure of processing graphic data by the computer 351. In step S321, graphic data is processed by using the computer 351. In step S322, graphic data, which is being processed, is transferred to the graphic display 352 so as to be displayed on it. In step S323, a confirmation is made as to whether or not instruction to transfer image data to the data communication apparatus 353 has been issued from the keyboard 354. If the instruction has been issued, the flow proceeds to step S324 in which image data (processed graphic data) is transferred to the data communication apparatus 353. Transferred image data is stored in an image memory 381 disposed in the image processing portion 317 of the data communication apparatus 353. If a discrimination is made in step S323 that no instruction to transfer data is issued, the flow returns to step S321 in which the image data processing operation is repeated.

Figure 46:
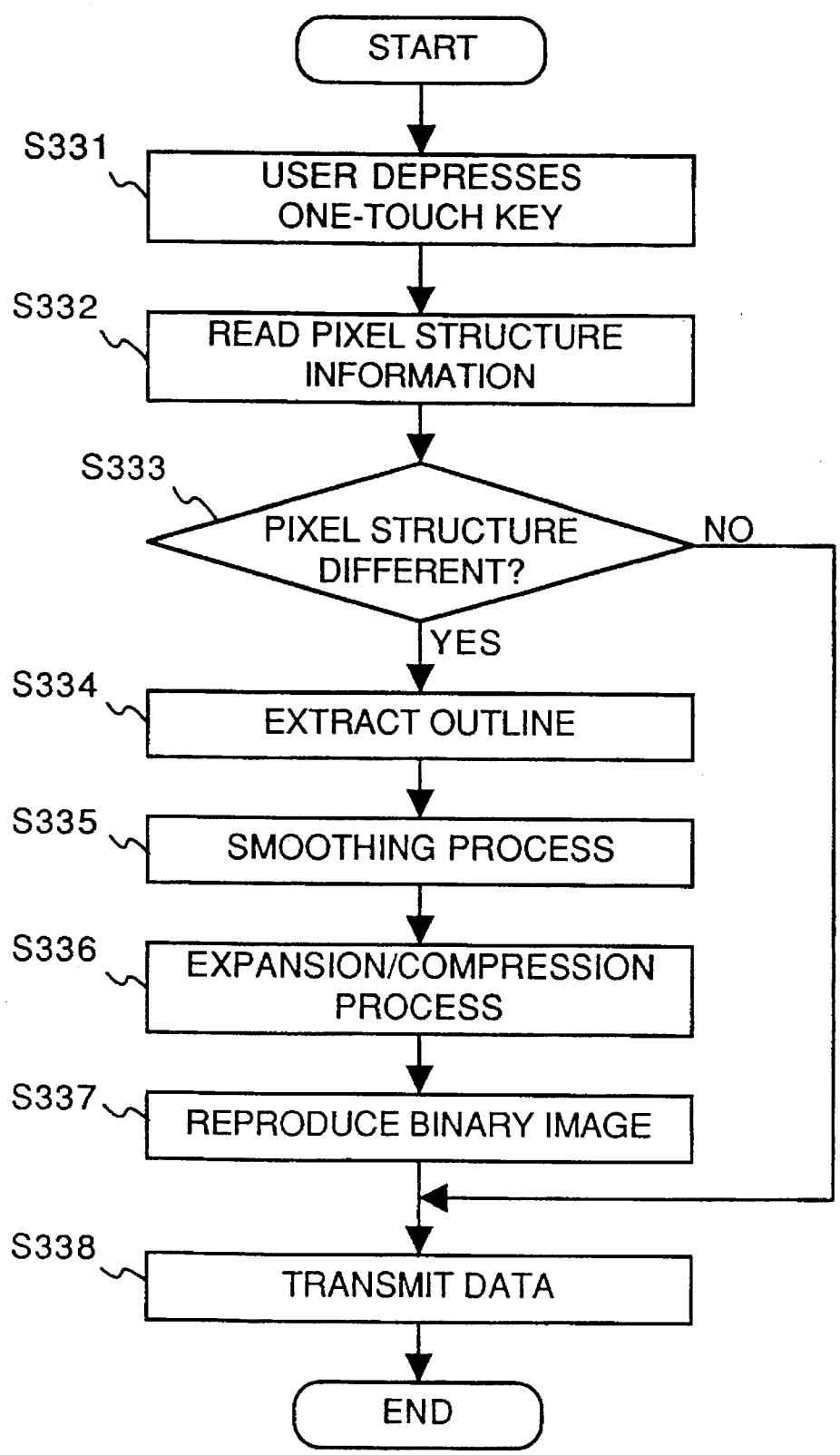
FIG. 46 is a flow chart which illustrates the operation of the data communication apparatus shown in FIG. 42.

FIG. 46 is a flow chart which illustrates the procedure of the data communication process to be performed by the data communication apparatus 353. If the one-touch key for instructing to start transferring data and the apparatus to which data is transmitted is depressed in step S331, information about the pixel structure of the receiving side apparatus which corresponds to the one-touch key is read from the pixel structure information storage portion 376 in step S332. In step S333, a discrimination is made as to whether or not pixel structure of image data stored in the image memory 381 and transferred from the computer 351 coincides with the pixel structure of the apparatus to which data is transmitted (for example, the pixel structure of the graphic display 358 of the data communication apparatus 357 or the pixel structure of the recording portion 361 of the facsimile apparatus 360). If they coincide with each other, the flow proceeds to step S338 in which data transmission is executed as it is, and the process is completed here. If the resolutions do not coincide with each other, the flow proceeds to step S334 in which the resolution conversion process by the outline process is commenced.

In step S334, the outline extraction portion 382 in the image processing portion 317 extracts the boundary between a black portion and a white portion of image data transferred from the computer 351 so that vector coordinate data is generated (outline extraction). In step S335, generated vector coordinate data is subjected to a smoothing process in a smoothing portion 383.

In next step S336, an expansion/compression portion 384 uses the ratio of expansion/compression determined in accordance with information about the pixel structure of the apparatus, to which data is transmitted, read from the pixel structure information storage portion 376 to subject data outputted from the smoothing portion 383 to an expansion/compression process. In step S337, the binary image reproducing portion 385 again converts outline image data, which has been subjected to the expansion/compression process, into the binary image. In next step S338, data is transmitted to the data communication apparatus 357 or the facsimile apparatus 360. That is, data is subjected to the coding process in the coding/decoding portion 372 before it is transmitted to the line 356 via the modem 374 and the NCU 375.

As described above, the data communication apparatus according to the sixth embodiment enables graphic data displayed on, for example, a graphic display, to be transmitted to a facsimile apparatus having a different pixel structure while converting the pixel structure.

As described above, according to the fifth and the sixth embodiments, image data can be communicated between apparatus having different pixel structures because the pixel structure of image data to be transmitted is converted so as to be adaptable to the pixel structure of the receiving side apparatus. Furthermore, the deterioration of the image quality taken place due to performing the pixel structure conversion process can be prevented by utilizing the outline extraction method.

Seventh Embodiment

The fifth and the sixth embodiment are arranged in such a way that outline data is subjected to the expansion/compression process and data about it is transferred to the receiving side apparatus.

However, the expansion/compression process causes the number of digits of the effective figure of the coordinate position, which constitutes each outline data, increases, resulting in the quantity of information to be enlarged. In particular in the case where information to be transmitted is a rough outline vector, which has not been smoothed yet, the overall quantity of information further increases because the number of vectors is considerably large.

Accordingly, a seventh embodiment of the present invention is arranged to overcome the aforesaid problem.

Figure 47:
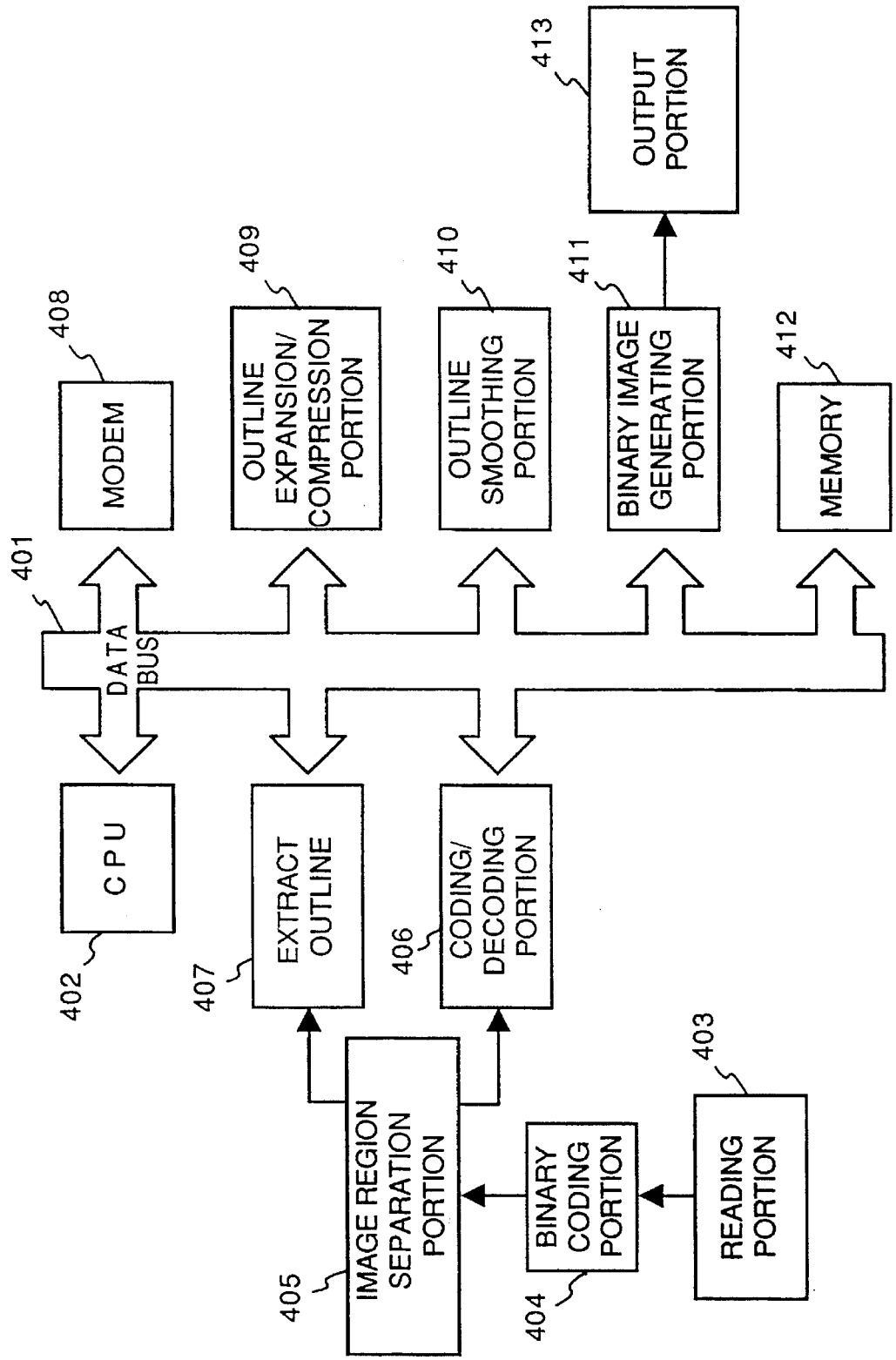
FIG. 47 is a block diagram which illustrates a facsimile apparatus according to a seventh embodiment of the present invention.

FIG. 47 is a block diagram which illustrates the structure of a facsimile apparatus according to a seventh embodiment and adapted to an outline process. Each of blocks sectioned in accordance with functions are connected to a data bus 401. A CPU 402 collectively control the blocks. Reference numeral 403 denotes a reading portion which read image data from an original document. Reference numeral 402 denotes a binary coding portion which binary-cods an analog signal denoting data about the image of the original document read by the reading portion 403 so as to output it as a digital signal. Reference numeral 405 denotes an image region separation portion which distinguishes and separates data input to the binary portion 404 and outputted from the same into character data and half tone image data. Reference numeral 406 denotes a coding/decoding portion which codes half tone image data into an MH, MR, or MMR coded data. Reference numeral 407 denotes an outline extraction portion which subjects character data to a vector extraction process so as to output it as a rough outline vector coordinate data. Reference numeral 408 denotes a modem which transmits/receives data.

Reference numeral 409 denotes an outline expansion/compression portion which subjects rough outline vector coordinate data and expansion/compression data to an outline expansion/compression process which employs the outline expansion/compression method. Reference numeral 410 denotes an outline smoothing portion for smoothing the outline vector by an outline smoothing method. Reference numeral 411 denotes a binary image generating portion for developing dots by a binary image generating method, so that raster scanning type binary image is obtained. Reference numeral 412 denotes a memory which stores image data to be transmitted and received image data. Reference numeral 413 denotes an output portion which prints binary image data obtained by the binary image generating portion 411.

Figure 48:
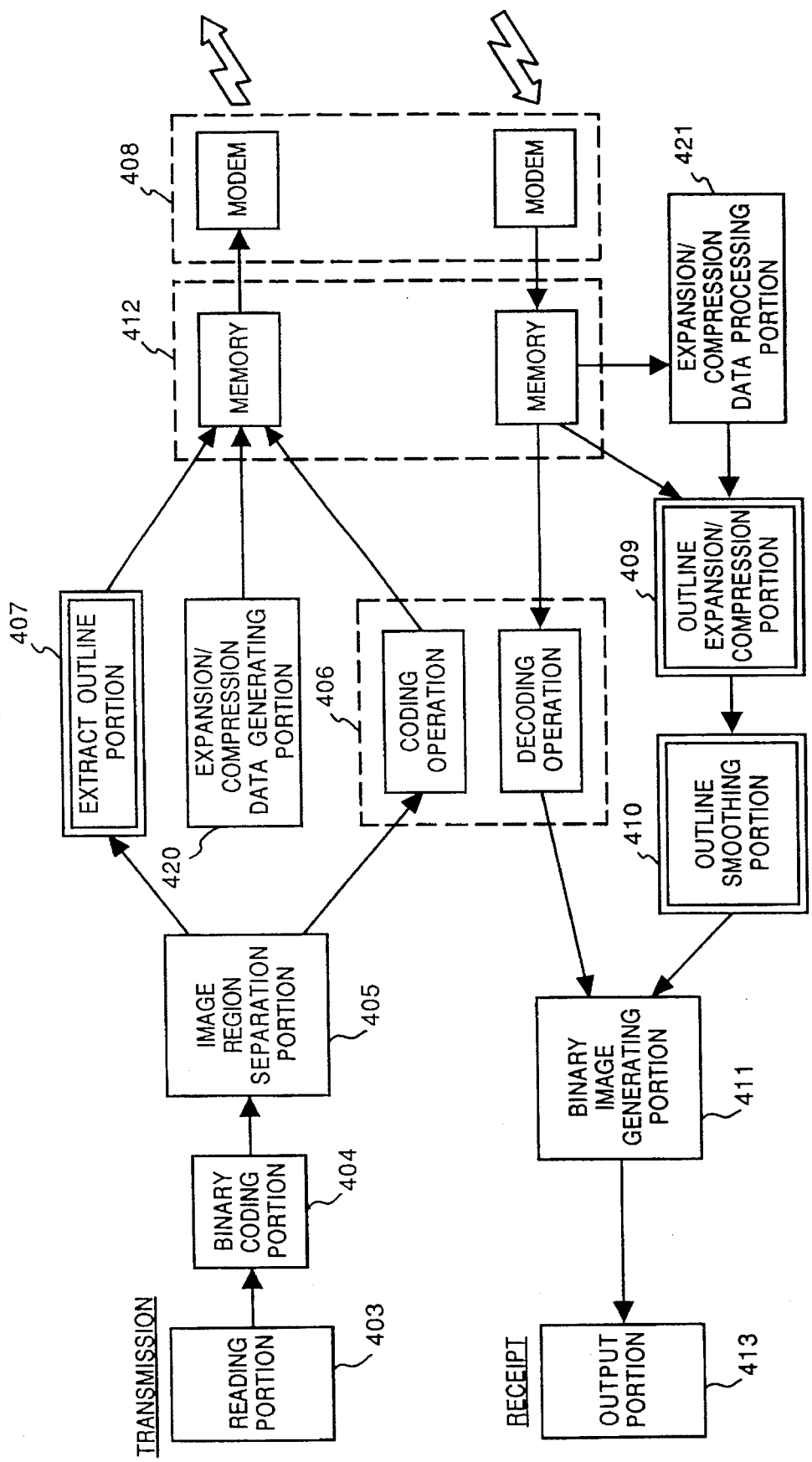
FIG. 48 illustrates the flow of data in the facsimile apparatus according to the seventh embodiment of the present invention.

FIG. 48 is a chart which illustrates the flow of image data taken place in the facsimile apparatus according to this embodiment. Referring to FIG. 48, data about the image of an original document read by the reading portion 403 such as a scanner is converted into digital image data by the binary-coding portion 404. Then, digital image data is supplied to the image region separation portion 405 so as to be divided into half tone image data and character data. Half tone image data is supplied to the coding/decoding portion 406 so as to be subjected to the coding process. Character data is subjected to the outline extraction process in the outline extraction portion 407, so that rough outline vector coordinate data is obtained. As described above, image data to be transmitted and obtained by the coding/decoding portion 406 and the outline extraction portion 407 is stored by the memory 412. Then, image data to be transmitted is transmitted to an external facsimile apparatus by the modem 408.

Then, expansion/compression data about the expansion/compression and the like is generated by the expansion/compression data generating portion 420 so as to be transmitted to the external facsimile apparatus together with image data to be transmitted. Incidentally, the expansion/compression data generating portion 420 may be a portion of the function of the CPU 402.

Then, an operation to be performed when image data thus generated is received by the external facsimile apparatus via a line will now be described. Image data received via the modem 408 is stored in the memory 412. Half tone image data contained by received image data is supplied to the coding/decoding portion 406 so as to be decoded in accordance with the way of coding. As a result, half tone image data is obtained. On the other and, rough outline vector coordinate data is supplied to the outline expansion/compression portion 409 so as to be subjected to the outline expansion/compression process in accordance with expansion/compression data contained by received data. Reference numeral 421 denotes an expansion/compression data processing portion which may be a portion of the CPU 402. Data is then supplied to the outline smoothing portion 410 so as to be subjected to the smoothing process so that the outline vector is processed. Vector coordinate data thus obtained and half tone image data are supplied to the binary image generating portion 411, so that raster scanning type binary image data is obtained. Thus generated binary image data is used to perform printing by the output portion 413.

FIG. 49 schematically illustrates the process of expansion/compression of the rough outline vector coordinate data strings. In the illustrated case, an image 431 is multiplied by α, so that an image 432 is obtained. Each coordinate data of the image 432 is a times each coordinate data of the image 431 in such a way, for example, that $(x1, y1) \rightarrow (\alpha x1, \alpha y1)$. When the horizontal component and the vertical component of a prime vector which constitutes the rough outline vector coordinate data are subjected to the expansion/compression process in accordance with expansion/compression data, the number of its effective figures increases. As a result, the quantity of data of the rough outline vector coordinate data strings subjected to the expansion/compression process is enlarged. The facsimile apparatus according to this embodiment transmits the image 431 and the receiving side performs expansion/compression the received data into the image 432.

As described above, according to the seventh embodiment of the present invention, the quantity of information required to transmit an original document can be made smaller than the quantity of information, which is the quantity after the outline expansion/compression process has been performed, because an image is transmitted by using rough outline vector coordinate data subjected to the outline extraction and the expansion/compression data. Therefore, the time taken to transmit image data can be shortened and therefore transmission can be performed economically. Furthermore, since the outline expansion/compression process is performed by the receiving side apparatus, the expansion/ compression of the received image can easily be performed by the receiving side apparatus. Furthermore, since the outline smoothing process is performed after data has been received, the time taken in the original document transmission operation from the moment the image is read to the moment it is transmitted can be shortened. Although the process of setting the ratio of expansion/compression is not described in the seventh embodiment, it may be freely set by an operator, or it may be automatically determined in accordance with the resolution of the receiving side apparatus and the resolution of the transmission side apparatus as described in the aforesaid embodiment.

Since the facsimile communication method having the outline extraction function or the facsimile apparatus according to the aforesaid embodiment is able to reduce the quantity of information required at the time of transmitting an original document, the time taken to transmit information can be shortened and therefore the transmission can be performed economically.

Furthermore, the expansion/compression of the received image can easily be performed because the outline expansion/compression process is performed by the receiving side apparatus.

Eighth Embodiment

If outline data is transferred to the receiving side apparatus by the procedure employed to transfer binary image data (which is, of course, coded data), it is performed as follows.

First, the transmission side apparatus sets an original document to be transmitted, and calls the receiving side apparatus. When the receiving side apparatus confirms the call made by the transmission side apparatus, it transmits a CED signal. Then, information about a fact that outline data can be received, about the recordable resolution and other information items are set and an NSF or DIS code is transmitted. If the recordable resolution of the receiving side apparatus is 16 pel/mm in the main scanning direction and 15.4 lines/mm in the sub-scanning direction, this resolution is notified to the transmission side apparatus.

When the transmission side apparatus confirms that the receiving side apparatus is able to receive and record outline data in accordance with information denoted in the NSF or the DIS code, the highest resolution is selected from among the resolutions set in the transmission side apparatus, and the NSS or the DCS code is, together with other mode setting information, transmitted to the receiving side apparatus. If the resolution set in accordance with an instruction made by an operator of the transmission side apparatus is 8 pel/mm in the main scanning direction and 15.4 lines/mm in the sub-scanning direction, the aforesaid resolution is notified to the receiving side apparatus. The receiving side apparatus performs a variety of setting operations so as to receive the outline vector with the resolution (for example, 8 pel/mm in the main scanning direction and 15.4 lines/mm in the sub-scanning direction) set by the transmission side apparatus in accordance with the NSS or the DCS code.

Then, the transmission side apparatus transmits a training signal, while the receiving side apparatus transmit a CFR signal if the training signal can be received, so that the result of the receipt is notified to the transmission side apparatus. In accordance with this, the transmission side apparatus starts reading the original document, and starts transmitting outline data. If the operation is performed as described above, image data is transmitted with the resolution of 8 pel/mm in the main scanning direction and 15.4 lines/mm in the sub-scanning direction. In response to this, the receiving side apparatus reproduces and records binary image data from the received outline vector with the resolution of 8 pel/mm in the main scanning direction and 15.4 lines/mm in the sub-scanning direction. Thus, the receipt of one page is completed.

In this case, even if the receiving side apparatus has a function of performing the outline vector process with excellent resolution, the precise image processing technology obtainable from the outline vector process and possessed by the receiving side apparatus cannot be effected in the case where the resolution set by the transmission side apparatus is inferior to that of the receiving side apparatus because image data is transmitted and the image is reproduced and outputted from the receiving side apparatus in accordance with the value of the resolution determined by the operator of the transmission side apparatus. What is worse, the fact that image data is transmitted by using the resolution set by the transmission side apparatus will cause a problem to take place that the quantity of data to be transmitted cannot be reduced, and therefore the time taken for the receiving side apparatus to exclusively perform the receiving operation cannot be shortened.

An eighth embodiment of the present invention is arranged in order to overcome the aforesaid problems.

Incidentally, an ordinary facsimile apparatus optically reads the image of an original document, encodes the image, and transmits it. If the facsimile apparatus reads an original document at a resolution of 8 pel/mm in the main scanning direction and 15.4 lines/mm in the sub-scanning direction for example, the image can be read while therotetically having an sufficient grade. However, a fine portion, for example, a character cannot be read due to noise or the like. According to the first to the seventh embodiments in which the outline extraction process and the smoothing process are performed, the aforesaid problem can be overcome.

In other words, the quality of an image reproduced by the outline process according to the first to the seventh embodiments from an original document read at a resolution of 8 pel/mm in the main scanning direction and 7.7 lines/mm in the sub-scanning direction compares with the quality obtained in the case where the conventional facsimile apparatus, in which the outline process is not performed, reads the original document at a resolution of 8 pel/mm in the main scanning direction and 15.4 lines/mm in the sub-scanning direction.

Accordingly, the eighth embodiment is arranged in such a manner that, if the fact that the apparatus positioned at the other end of the data line is able to receive outline data has been discriminated at the time of the transmission operation, the image of the original document is read with a resolution lower than the resolution instructed by an operator and it is subjected to the outline extraction process before the image is transmitted. As a result, the quantity of data to be transmitted can be reduced, and the transference speed can be improved. The receiving side apparatus must simply performe the expansion/compression of received outline data at the time of reproducing outline data.

It should be noted that, if the operator has instructed that the original document is read at a resolution of 16 pel/mm in the main scanning direction and 15.4 lines/mm in the sub-scanning direction, it can be understood that the operator intends to transmit the original document at the quality higher than that in the aforesaid case. Therefore, the image of the original document is read at a resolution of 16 pel/mm in the main scanning direction and 7.7 lines/mm in the sub-scanning direction if the apparatus positioned at the other end of the data line is able to receive outline data, and the outline process is performed.

Then, the description will now be described about operations to be performed in the case where a fact whether or not the apparatus positioned at the other end of the data line is able to receive outline data is discriminated in response to a signal to be supplied after the data line has been connected. In this case, a structure may be employed which has a memory which stores information about the functions of a plurality of apparatuses positioned at the other ends of the data line and the discrimination is made by making a reference to the memory before the data line is connected.

Figure 50:
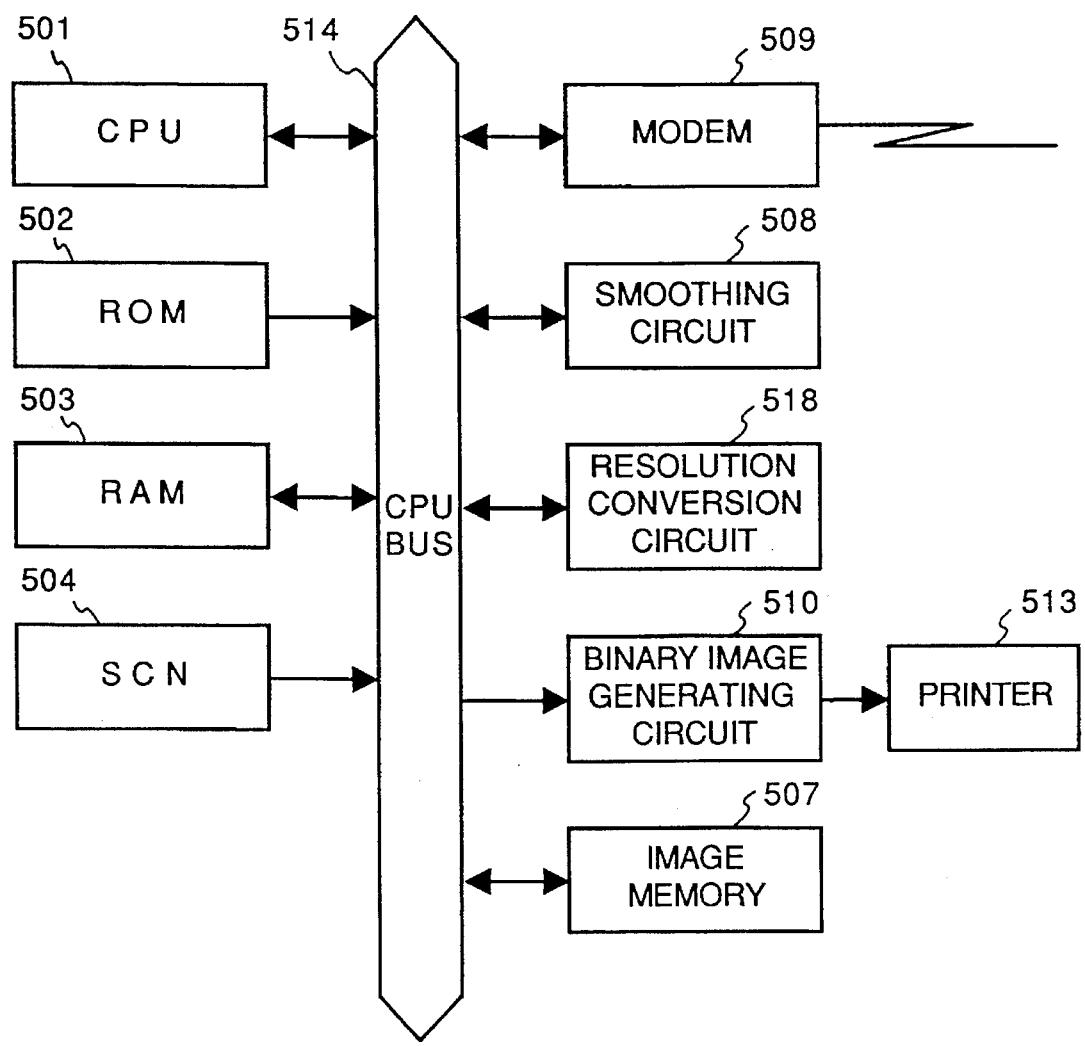
FIG. 50 is a block diagram which illustrates a facsimile apparatus according to an eighth embodiment of the present invention.

FIG. 50 is a block diagram which illustrates the structure of a facsimile apparatus according to the eighth embodiment of the present invention. Referring to FIG. 50, reference numeral 501 denotes a CPU for controlling the overall structure of the apparatus, 502 denotes a ROM in which a program for controlling the apparatus and a program for controlling the transmission operation to be performed by the facsimile apparatus. Reference numeral 503 denotes a RAM for use as a working region at the time of executing the control program or the like. Reference numeral 504 denotes a scanner portion (SCN) for reading the image of an original document to be transmitted. Reference numeral 507 denotes an image memory for use to store outline data and smoothing data. Reference numeral 508 denotes a smoothing circuit which calculates outline data stored in the image memory 507 so as to smooth the image for the purpose of generating smoothing data before it is outputted to the image memory 507. Reference numeral 509 denotes a modem for transmitting/receiving image data in accordance with the transmission control procedure. Reference numeral 510 denotes a binary image generating circuit for generating binary image data from outline data. Reference numeral 513 denotes a printer for outputting generated binary image. Reference numeral 518 denotes a resolution conversion circuit for converting the resolution of outline vector so as to generate outline vector, the resolution of which is converted, so that it is outputting to the image memory 507. Reference numeral 514 denotes a CPU bus which connects the aforesaid elements of the apparatus.

Figure 51:
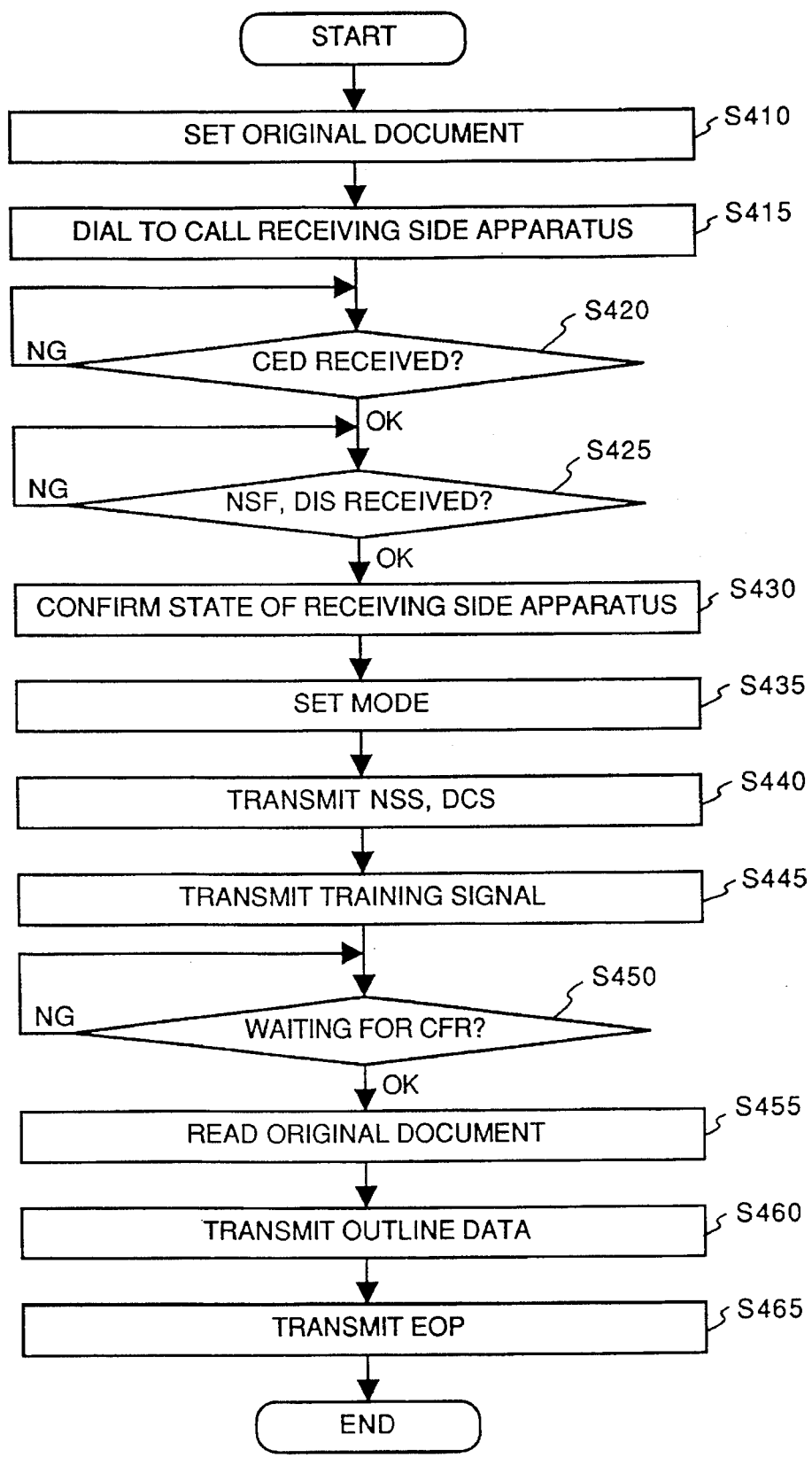
FIG. 51 is a flow chart which illustrates the contents of the transmission process according to an eighth embodiment of the present invention.
Figure 52:
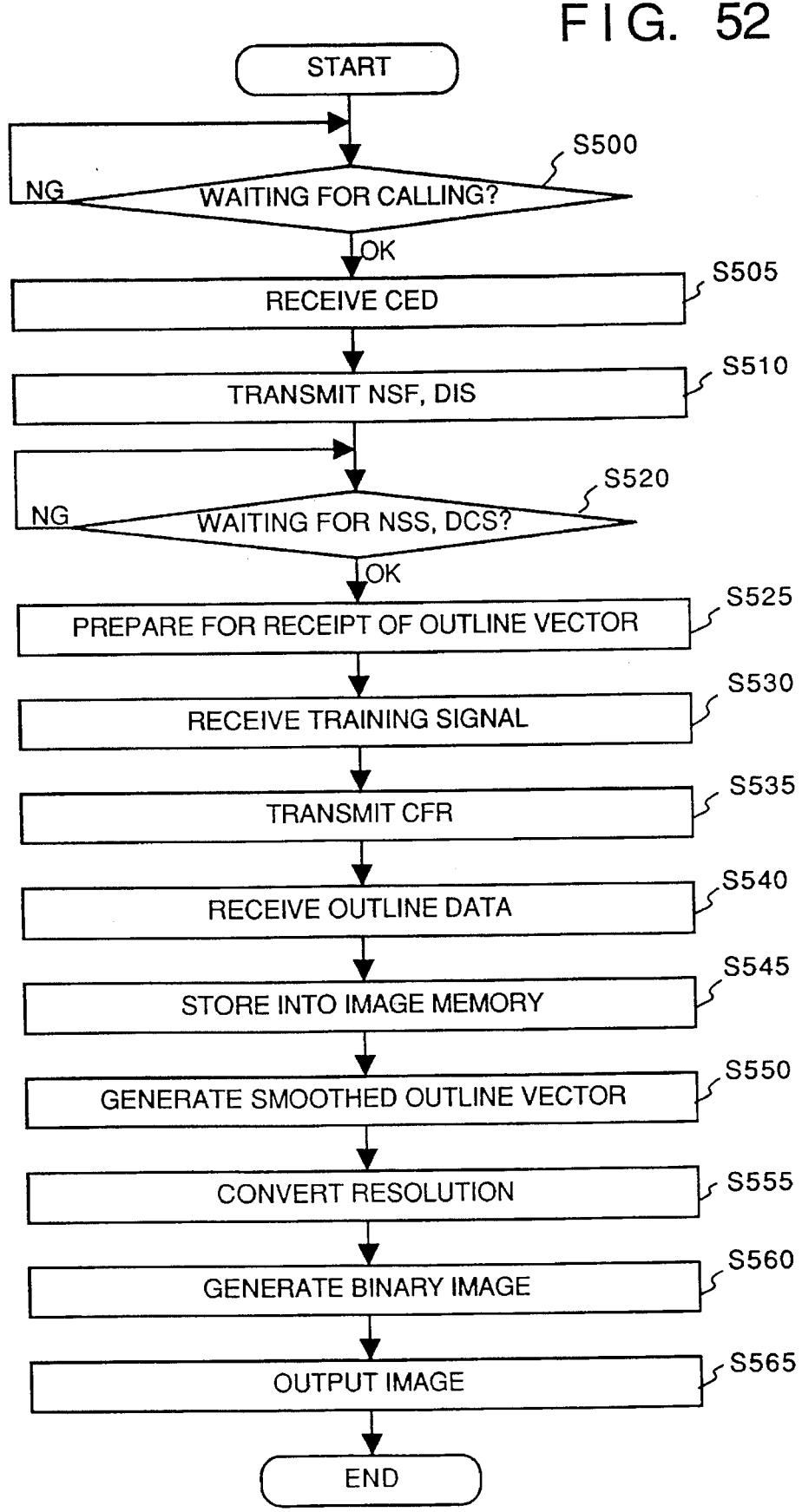
FIG. 52 is a flow chart which illustrates the contents of the receiving process according to an eighth embodiment of the present invention.

Then, with reference to a flow chart shown in FIGS. 51 and 52, the description will be made about operations to be performed by the facsimile apparatus structured as described above when it transmit the image of the original document to a facsimile apparatus structured similarly to it and capable of transmitting/receiving outline data. The elements of the receiving side apparatus which are the as those of the transmission side apparatus are given the same reference numerals. FIG. 51 is a flow chart which illustrates the processing procedure of the transmission side apparatus. FIG. 52 is a flow chart which illustrates the processing procedure of the receiving side apparatus. In this case, the resolution of the image of an original document instructed by an operator to the transmission side apparatus is 8 pel/mm in the main scanning direction and 15.4 lines/mm in the sub-scanning direction, while the resolution recordable by the receiving side apparatus is 16 pel/mm in the main scanning direction and 15.4 lines/mm in the sub-scanning direction. Furthermore, image data to be transmitted by the facsimile communication between the transmission side apparatus and the receiving side apparatus is treated at a resolution of 8 pel/mm in the main scanning direction and 7.7 lines/mm in the sub-scanning direction.

In step S410, the image of an original document to be transmitted is set to the scanner portion (SCN) 504 of the transmission side apparatus. In step S415, dialing is performed so that the receiving side apparatus is called. On the other hand, the receiving side apparatus is waiting for a call in step S500, and the flow proceeds to step S505 when the call is made by the transmission side apparatus. In step S505, a CED signal corresponding to the call is transmitted. In next step S510, information about a fact that the receiving side apparatus is able to receive outline data, that image data is received at a resolution (in this embodiment 8 pel/mm in the main scanning direction and 7.7 lines/mm in the sub-scanning direction) which is lower than the resolution at which image is outputted, and other required information are set to the NSF or DIS code before information is transmitted.

When the transmission side apparatus receives the CED signal in step S420, the flow proceeds to step S425. If the NSF or the DIS code is received in step S425, the flow proceeds to step S430. In step S430, information denoted in the received NSF or DIS code is analyzed, and a fact that the receiving side apparatus is able to receive outline data is recognized. In next step S435, the resolution of received data shown by the receiving side apparatus and the resolution of the transmission side apparatus instructed by the operator are subjected to a comparison, and a fact that the resolution of the receiving side apparatus is lower than the resolution instructed by the operator is confirmed. If it is confirmed, a variety of mode setting is performed so that image data is transmitted at the resolution shown by the receiving side apparatus. In step S440, the aforesaid mode setting information is, as the NSS or the DCS code, transmitted to the receiving side apparatus. Therefore, the mode of the transmission side apparatus is set so as to read the original document at a resolution lower than that instructed by the operator and to convert it into outline data, the resolution of which is 8 pel/mm in the main scanning direction and 7.7 lines/mm in the sub-scanning direction.

When the receiving side apparatus receives the NSS or the DCS code in step S520, the flow proceeds to step S525 in which a preparation for receiving outline vector is made in accordance with information denoted by the NSS or the DCS code. At this time, the resolution of received image data is the value (8 pel/mm in the main scanning direction and 7.7 lines/mm in the sub-scanning direction) shown by the receiving side apparatus.

In step S445, the transmission side apparatus transmits a training signal to the receiving side apparatus. Then, the flow proceeds to step S450 in which a CFR signal is waited for. On the other hand, the receiving side apparatus receives the training signal in step S530. If training of the operation of the modem 509 succeeds, the CFR signal is transmitted to the transmission side apparatus in step S535.

When the transmission side apparatus receives the CFR signal, the flow proceeds to step S455 in which the transmission side starts reading the image of the original document from the scanner portion (SCN) 504 at the determined resolution. In step S460, outline data is extracted from the image at the determined resolution (8 pel/mm in the main scanning direction and 7.7 lines/mm in the sub-scanning direction), and the transmission of extracted outline data is commenced. When reading of the image of the original document for one page has been completed, the flow proceeds to step S465 in which an EOP signal is transmitted to the receiving side apparatus. Thus, the operation is completed here. When the receiving side apparatus receives outline data inn step S540, it causes receives outline data to be temporarily stored in the memory 507 in step S545 until it receives the EOP signal (that is, until receipt of image data for one page is completed). In next step S550, outline vector data stored in the image memory 507 is read so as to be received by the smoothing circuit 508, so that smoothed outline vector is generated. The storage of the generated outline vector in the image memory 507 will substitute received outline vector data. In next step S555, smoothed outline vector is supplied to the resolution conversion circuit 518, and it is doubled in both of the main scanning direction and the sub-scanning direction. Data thus formed is used to update the smoothed outline vector stored in the image memory. The enlargement ratio is obtained by calculating the proportion of the resolution of received data and the resolution of the apparatus. At this time, outline data in the image memory 507 becomes data the resolution of which is 16 pel/mm in the main scanning direction and 15.4 lines/mm in the sub-scanning direction In step S560, binary data is generated by the binary image generating circuit 510 in accordance with the outline vector, the resolution of which is enlarged so as to be outputted to the printer 513. As a result, the received image is outputted and recording of one page is completed.

According to this embodiment, the resolution of transmitted image data is doubled in the main scanning direction and doubled in the sub-scanning direction by the receiving side apparatus, so that the image is outputted at the resolution of 16 pel/mm in the main scanning direction and 15.4 lines/mm in the sub-scanning direction. Therefore, precise image data can be reproduced from image data, the quantity of which is reduced. Furthermore, image can be transmitted at high speed because the quantity of image to be transmitted can also be reduced.

Although this embodiment is arranged in such a way that the expansion/compression of the resolution conversion is made to be two times in both of the main scanning direction and the sub-scanning direction, the present invention is not limited to this. For example, the expansion/compression may be varied between the main scanning direction and the sub-scanning direction.

As described above, the eighth embodiment of the present invention is arranged in such a manner that facsimile data is transmitted at a low resolution and received facsimile data is reproduced into an image while converting the resolution to a high resolution. Therefore, effects can be obtained in that the quantity of data to be communicated can be reduced, the time taken to complete the data transmission can be shortened, and a precise image can be reproduced.

Although the eighth embodiment is so arranged that the image of the original document is read at a low resolution, the resolution may be substantially lowered by reading it at a resolution instructed by an operator and by thinning the image in the inside portion of the apparatus.

Although the receiving side apparatus instructs the resolution of data to be transmitted, it may be performed by the transmission side apparatus.

Although the eighth embodiment arranged in such a way that the receiving side apparatus discriminates the resolution of data to be transmitted in accordance with the result of a signal transmission performed between the receiving side apparatus and the transmission side apparatus, the transmission side apparatus may add information about the resolution to data to be transmitted as employed in the aforesaid embodiments.

The present invention may be applied to a system constituted by a plurality of apparatuses, or to a simple system having one apparatus. The present invention may, of course, be applied to the case where a program is supplied to a system or an apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for transmitting image data to destination apparatus, comprising:

outline vector extraction means for extracting outline vector data from image data to be transmitted; and transmission means for transmitting information about the resolution of image data to be transmitted and outline vector data extracted by said outline vector extraction means to said destination apparatus, wherein said resolution includes the main scanning directional resolution of the image to be transmitted and the sub-scanning directional resolution of the same.

2. An image processing apparatus according to claim 1, further comprising smoothing means for correcting vector data contained by a vector group composed of a predetermined number of vector data items contained by outline vector data extracted by said outline vector extraction means in accordance with a state of a predetermined number of said vector data items in order to make a locus expressed by said vector data to be smooth, wherein said transmission means transmits outline data smoothed by said smoothing means and said information about the resolution as data to be transmitted to said destination apparatus.

3. The apparatus according to claim 1, wherein the image data to be transmitted is read by a scanner.

4. An image processing apparatus according to claim 1, wherein said image processing apparatus comprises a facsimile apparatus.

5. An image processing method for transmitting image data to a destination apparatus, comprising:

an outline vector extraction process in which outline vector is extracted from image data to be transmitted; and a transmission process in which information about the resolution of image data to be transmitted and outline vector data extracted in said outline vector extraction process to said destination apparatus, wherein said resolution includes the main scanning directional resolution of the image to be transmitted and the sub-scanning directional resolution of the same.

6. An image processing method according to claim 5, further comprising a smoothing process in which vector data contained by a vector group composed of a predetermined number of vector data items contained by outline vector data extracted in said outline vector extraction process is corrected in accordance with a state of a predetermined number of said vector data items in order to make a locus expressed by said vector data to be smooth, wherein said transmission process transmits outline data smoothed by said smoothing means and said information about the resolution as data to be transmitted to said destination apparatus.

7. The method according to claim 5, wherein the image data to be transmitted is read by a scanner.

8. An image processing apparatus according to claim 5, wherein said image processing apparatus comprises a facsimile apparatus.

9. An image processing apparatus for receiving image data from an originator apparatus and outputting received image data to a visible image generating apparatus in a predetermined manner, comprising:

receiving means for receiving outline vector data and information about the resolution of a originator apparatus which has transmitted outline vector data;

expanding-compressing means for performing expansion or compression of outline vector data with a ratio determined in accordance with the resolution of said visible image generating apparatus and resolution information received by said receiving means; and reproducing means for reproducing image data to be transferred to said visible image generating apparatus in accordance with outline vector data performed by said expanding-compressing means.

10. An image processing apparatus according to claim 9, further comprising smoothing means for correcting vector data contained by a vector group composed of a predetermined number of vector data items contained by outline vector data received by said receiving means in accordance with a state of a predetermined number of said vector data items in order to make a locus expressed by said vector data to be smooth, wherein said reproducing means reproduces image data to be transferred to said visible image generating apparatus in accordance with outline data smoothed by said smoothing means.

11. An image processing apparatus according to claim 9, wherein said resolution includes the main scanning directional resolution of the image to be transmitted and the sub-scanning directional resolution of the same.

12. The apparatus according to claim 9, wherein the resolution of an originator apparatus is the resolution of a scanner of the originator apparatus.

13. The apparatus according to claim 9, wherein said visible image generating apparatus comprises a printer-engine.

14. An image processing apparatus according to claim 9, wherein said image processing apparatus comprises a facsimile apparatus.

15. An image processing method for receiving image data from an originator apparatus and outputting received image data to a visible image generating apparatus in a predetermined manner, comprising:

a receiving process in which outline vector data and information about the resolution of a originator apparatus which has transmitted outline vector data are received;

a expanding-compressing process in which expansion or compression of outline vector data is performed with a ratio determined in accordance with the resolution of said visible image generating apparatus and resolution information received by said receiving process; and a reproducing process in which image data to be transferred to said visible image generating apparatus is reproduced in accordance with outline vector data performed by said expanding-compressing process.

16. An image processing method according to claim 15, further comprising a smoothing process in which vector data contained by a vector group composed of a predetermined number of vector data items contained by outline vector data received in said receiving process is corrected in accordance with a state of a predetermined number of said vector data items in order to make a locus expressed by said vector data to be smooth, wherein said reproducing process reproduces image data to be transferred to said visible image generating apparatus in accordance with outline vector data smoothed in said smoothing process.

17. An image processing apparatus according to claim 15, wherein said resolution includes the main scanning directional resolution of the image to be transmitted and the sub-scanning directional resolution of the same.

18. The method according to claim 15, wherein the resolution of an originator apparatus is the resolution of a scanner of the originator apparatus.

19. The method according to claim 15, wherein said visible image generating apparatus comprises a printer-engine.

20. An image processing apparatus according to claim 15, wherein said image processing apparatus comprises a facsimile apparatus.

21. An image processing apparatus comprising first means for transmitting image data and second means for receiving image data, wherein said first means includes outline vector extraction means for extracting outline vector data from image data to be transmitted, and transmission means for transmitting information about the resolution of image data to be transmitted and outline vector data extracted by said outline vector extraction means to a destination apparatus, and said second means includes receiving means for receiving outline vector data and information about the resolution of an originator apparatus which has transmitted outline vector data;

expanding-compressing means for varying performing expansion or compression of outline vector data with a ratio determined in accordance with the resolution of a visible image generating apparatus and resolution information received by said receiving means; and reproducing means for reproducing image data to be transferred to said visible image generating apparatus in accordance with outline vector data performed by said expanding-compressing means.

22. An image processing apparatus according to claim 21, further comprising smoothing means for correcting vector data contained by a vector group composed of a predetermined number of vector data items contained by outline vector data extracted by said outline vector extraction means in accordance with a state of a predetermined number of said vector data items in order to make a locus expressed by said vector data to be smooth, wherein said transmission means transmits outline data smoothed by said smoothing means and said information about the resolution as data to be transmitted to said destination apparatus.

23. An image processing apparatus according to claim 21, further comprising smoothing means for correcting vector data contained by a vector group composed of a predetermined number of vector data items contained by outline vector data received by said receiving means in accordance with a state of a predetermined number of said vector data items in order to make a locus expressed by said vector data to be smooth, wherein said reproducing means reproduces image data to be transferred to said visible image generating apparatus in accordance with outline data smoothed by said smoothing means.

24. An image processing apparatus according to claim 21, wherein said resolution includes the main scanning directional resolution of the image to be transmitted and the sub-scanning directional resolution of the same.

25. The apparatus according to claim 21, wherein the image data to be transmitted is read by a scanner.

26. The apparatus according to claim 21, wherein said visible image generating apparatus comprises a printer-engine.

27. An image processing apparatus according to claim 21, wherein said image processing apparatus comprises a facsimile apparatus.

28. An image processing apparatus for transmitting image data to a destination apparatus, comprising:

outline vector extraction means for extracting outline vector data from image data to be transmitted;

transmission means for transmitting outline vector data extracted by said outline vector extraction means to said destination apparatus; and smoothing means for correcting vector data contained by a vector group composed of a predetermined number of vector data items contained by outline vector data extracted by said outline vector extraction means in accordance with a state of a predetermined number of said vector data items in order to make a locus expressed by said vector data to be smooth, wherein said transmission means transmits outline data smoothed by said smoothing means to said destination apparatus.

29. The apparatus according to claim 28, wherein the image data to be transmitted is read by a scanner.

30. An image processing apparatus according to claim 28, wherein said image processing apparatus comprises a facsimile apparatus.

31. An image processing apparatus for receiving image data from an originator apparatus and outputting received image data to a visible image generating apparatus in a predetermined manner, comprising:

receiving means for receiving outline vector data;

reproducing means for reproducing image data to be transferred to said visible image generating apparatus in accordance with outline vector data received by said receiving means; and smoothing means for correcting vector data contained by a vector group composed of a predetermined number of vector data items contained by outline vector data received by said receiving means in accordance with a state of a predetermined number of said vector data items in order to make a locus expressed by said vector data to be smooth, wherein said reproducing means reproduces image data to be transferred to said visible image generating apparatus in accordance with outline data smoothed by said smoothing means.

32. The apparatus according to claim 31, wherein said visible image generating apparatus comprises a printer-engine.

33. An image processing apparatus according to claim 31, wherein said image processing apparatus comprises a facsimile apparatus.

34. An image processing apparatus for transmitting image data to a destination apparatus, comprising:

detection means for detecting the resolution of an image output apparatus of said destination apparatus;

input means for inputting image data to be transmitted;

comparison means for comparing the resolution of image data inputted by said input means and the resolution of said image output apparatus of said destination apparatus;

outline vector extraction means for extracting outline vector data from image data inputted by said input means;

smoothing means for correcting vector data contained by a vector group composed of a predetermined number of vector data items contained by outline vector data extracted by said outline vector extraction means in accordance with a state of a predetermined number of said vector data items in order to make a locus expressed by said vector data to be smooth;

expanding-compressing means for performing expansion or compression of outline vector data smoothed by said smoothing means in accordance with a result of said comparison made by said comparison means; and transmission means for transmitting outline vector data performed by said expanding-compressing means to said apparatus positioned at the other end of said data line.

35. An image processing apparatus according to claim 34, wherein said outline vector extraction means assumes that one of pixels is in the form of a rectangular, and, in a predetermined direction, sequentially traces between white pixels and black pixels in the edge portion of inputted image data, so that vertical and horizontal vectors are extracted.

36. An image processing apparatus according to claim 35, wherein said smoothing means includes first smoothing means and second smoothing means, said first smoothing means including discrimination means for discriminating a point position, which is omitted from smoothing, in accordance with the connection relationship among a predetermined number of continued vectors contained by vector data extracted by said outline vector extraction means;

means arranged in such a manner that, if vector data extracted by said outline vector extraction means and forming a closed loop is smaller than a predetermined size, said means deletes vector data smaller than a predetermined size;

means arranged in such a manner that, if projections and pits smaller than a predetermined size are present in a predetermined length in extracted vector data, vector data which forms said projections and pits is deleted and vectors positioned in front and in the rear of said projections and pits are connected to each other; and means arranged in such a manner that, in accordance with the length and the direction of each of a predetermined number of continued vectors, a plurality of vertical or horizontal vectors contained by a predetermined number of said vectors are deleted, the coordinates of the starting point or the end point of the residual vector are corrected so as to allow a diagonal vector to be positioned; and said second smoothing means including means for correcting the starting point position or the end point position of one vector among continued vector data items smoothed by said first smoothing means except for said point omitted from smoothing by said discrimination means by calculating the weighted mean between the starting point coordinates or end point coordinates of a plurality of said vectors positioned in front and in the rear of said vector.

37. An image processing apparatus according to claim 34, further comprising storage means for storing and keeping information about the resolution of each of a plurality of destination apparatuses, wherein said detection means detects the resolution of said destination apparatus positioned by making a reference to said storage means.

38. The apparatus according to claim 34, wherein the image data to be transmitted is read by a scanner.

39. An image processing apparatus according to claim 34, wherein said image processing apparatus comprises a facsimile apparatus.

40. An image processing apparatus for transmitting image data to a destination apparatus, comprising:

detection means for detecting the resolution of an image output apparatus of said destination apparatus;

input means for inputting image data to be transmitted;

comparison means for comparing the resolution of image data inputted by said input means and the resolution of said image output apparatus of said destination apparatus;

outline vector extraction means for extracting outline vector data from image data inputted by said input means if a discrimination is made by said comparison means that said resolution of said image output apparatus of said destination apparatus and said resolution of inputted image data are different from each other;

smoothing means for correcting vector data contained by a vector group composed of a predetermined number of vector data items contained by outline vector data extracted by said outline vector extraction means in accordance with a state of a predetermined number of said vector data items in order to make a locus expressed by said vector data to be smooth;

expanding-compressing means for performing expansion or compression of outline vector data smoothed by said smoothing means in accordance with a result of said comparison made by said comparison means;

reproducing means for reproducing image data performed by said expanding-compressing means; and transmission means for transmitting reproduced image data to said destination apparatus.

41. An image processing apparatus according to claim 40, further comprising smoothing means for correcting vector data contained by a vector group composed of a predetermined number of vector data items contained by outline vector data extracted by said extraction means in accordance with a state of a predetermined number of said vector data items in order to make a locus expressed by said vector data to be smooth, wherein said transmission means transmits outline data smoothed by said smoothing means and said information about the resolution as data to be transmitted to said destination apparatus.

42. An image processing apparatus according to claim 41, wherein said smoothing means includes first smoothing means and second smoothing means, said first smoothing means including discrimination means for discriminating a point position, which is omitted from smoothing, in accordance with the connection relationship among a predetermined number of continued vectors contained by vector data extracted by said outline vector extraction means;

means arranged in such a manner that, if vector data extracted by said outline vector extraction means and forming a closed loop is smaller than a predetermined size, said means deletes vector data smaller than a predetermined size;

means arranged in such a manner that, if projections and pits smaller than a predetermined size are present in a predetermined length in extracted vector data, vector data which forms said projections and pits is deleted and vectors positioned in front and in the rear of said projections and pits are connected to each other; and means arranged in such a manner that, in accordance with the length and the direction of each of a predetermined number of continued vectors, a plurality of vertical or horizontal vectors contained by a predetermined number of said vectors are deleted, the coordinates of the starting point or the end point of the residual vector are corrected so as to allow a diagonal vector to be positioned; and said second smoothing means including means for correcting the starting point position or the end point position of one vector among continued vector data items smoothed by said first smoothing means except for said point omitted from smoothing by said discrimination means by calculating the weighted mean between the starting point coordinates or end point coordinates of a plurality of said vectors positioned in front and in the rear of said vector.

43. An image processing apparatus according to claim 40, further comprising storage means for storing and keeping information about the resolution of each of a plurality of destination apparatuses, wherein said detection means detects the resolution of said destination apparatus by making a reference to said storage means.

44. The apparatus according to claim 40, wherein the image data to be transmitted is read by a scanner.

45. An image processing apparatus according to claim 40, wherein said image processing apparatus comprises a facsimile apparatus.

46. An image processing apparatus for transmitting image data to a destination apparatus, comprising:

first input means for inputting image data from a predetermined image editing apparatus;

second input means for inputting resolution information, which corresponds to image data inputted by said first input means;

storage means for storing resolutions of a plurality of destination apparatuses;

designation means for designating a destination apparatus;

calculating means for reading said resolution of said apparatus designated by said designation means from said storage means, and calculating a ratio of data to be transmitted to said destination apparatus in accordance with said read resolution of said destination apparatus and said resolution of said image edition apparatus inputted by said second input means;

outline vector extraction means for extracting outline vector data from image data inputted by said first input means;

smoothing means for correcting vector data contained by a vector group composed of a predetermined number of vector data items contained by outline vector data extracted by said outline vector extraction means in accordance with a state of a predetermined number of said vector data items in order to make a locus expressed by said vector data to be smooth;

expanding-compressing means for performing expansion or compression of outline vector data smoothed by said smoothing means with said ratio obtained by said calculating means;

reproducing means for reproducing image data in accordance with outline vector data performed by said expanding-compressing means; and transmission means for transmitting reproduced image to said destination apparatus designated by said designation means.

47. An image processing apparatus according to claim 46, wherein vertical and horizontal directional resolution information of a plurality of said destination apparatus are stored in said storage means; and said second input means inputs said vertical and horizontal directional resolution information of said image edition apparatus.

48. An image processing apparatus according to claim 46, wherein said smoothing means includes first smoothing means and second smoothing means, said first smoothing means including discrimination means for discriminating a point position, which is omitted from smoothing, in accordance with the connection relationship among a predetermined number of continued vectors contained by vector data extracted by said outline vector extraction means;

means arranged in such a manner that, if vector data extracted by said outline vector extraction means and forming a closed loop is smaller than a predetermined size, said means deletes vector data smaller than a predetermined size;

means arranged in such a manner that, if projections and pits smaller than a predetermined size are present in a predetermined length in extracted vector data, vector data which forms said projections and pits is deleted and vectors positioned in front and in the rear of said projections and pits are connected to each other; and means arranged in such a manner that, in accordance with the length and the direction of each of a predetermined number of continued vectors, a plurality of vertical or horizontal vectors contained by a predetermined number of said vectors are deleted, the coordinates of the starting point or the end point of the residual vector are corrected so as to allow a diagonal vector to be positioned; and said second smoothing means including means for correcting the starting point position or the end point position of one vector among continued vector data items smoothed by said first smoothing means except for said point omitted from smoothing by said discrimination means by calculating the weighted mean between the starting point coordinates or end point coordinates of a plurality of said vectors positioned in front and in the rear of said vector.

49. An image processing apparatus according to claim 46, wherein said image processing apparatus comprises a facsimile apparatus.

50. An image processing apparatus for transmitting image data to a destination apparatus, comprising:

outline vector extraction means for extracting outline vector data from image data to be transmitted;

smoothing means for correcting vector data contained by a vector group composed of a predetermined number of vector data items contained by outline vector data extracted by said outline vector extraction means in accordance with a state of a predetermined number of said vector data items in order to make a locus expressed by said vector data to be smooth;

setting means for setting a ratio of expansion/compression; and transmission means for transmitting outline vector data extracted by said outline vector extraction means and said ratio of expansion/compression set by setting means to said destination apparatus.

51. An image processing apparatus according to claim 50, wherein said setting means sets said ratio of expansion/ compression in accordance with the resolution of said destination apparatus and the resolution of an image to be transmitted.

52. An image processing apparatus according to claim 50, wherein said outline vector extraction means assumes that one of pixels is in the form of a rectangular, and, in a predetermined direction, sequentially traces between white pixels and black pixels in the edge portion of inputted image data, so that vertical and horizontal vectors are extracted.

53. An image processing apparatus according to claim 52, wherein said smoothing means includes first smoothing means and second smoothing means, said first smoothing means including discrimination means for discriminating a point position, which is omitted from smoothing, in accordance with the connection relationship among a predetermined number of continued vectors contained by vector data extracted by said outline vector extraction means;

means arranged in such a manner that, if vector data extracted by said outline vector extraction means and forming a closed loop is smaller than a predetermined size, said means deletes vector data smaller than a predetermined size;

means arranged in such a manner that, if projections and pits smaller than a predetermined size are present in a predetermined length in extracted vector data, vector data which forms said projections and pits is deleted and vectors positioned in front and in the rear of said projections and pits are connected to each other; and means arranged in such a manner that, in accordance with the length and the direction of each of a predetermined number of continued vectors, a plurality of vertical or horizontal vectors contained by a predetermined number of said vectors are deleted, the coordinates of the starting point or the end point of the residual vector are corrected so as to allow a diagonal vector to be positioned; and said second smoothing means including means for correcting the starting point position or the end point position of one vector among continued vector data items smoothed by said first smoothing means except for said point omitted from smoothing by said discrimination means by calculating the weighted mean between the starting point coordinates or end point coordinates of a plurality of said vectors positioned in front and in the rear of said vector.

54. The apparatus according to claim 50, wherein the image data to be transmitted is read by a scanner.

55. An image processing apparatus according to claim 50, wherein said image processing apparatus comprises a facsimile apparatus.

56. An image processing apparatus for reading the image of an original document and transmitting read image to a destination, comprising:

instruction means for providing the resolution of said read original document;

discrimination means for discriminating whether or not said destination apparatus is able to receive outline vector data;

reading means for reading the original document at a resolution lower than the resolution provided by said instruction means if a discrimination is made that said destination apparatus is able to receive outline vector data;

outline vector extraction means for extracting outline vector data from image data read by said reading means; and transmission means for transmitting outline vector data extracted by said outline vector extraction means to said destination apparatus.

57. The apparatus according to claim 56, wherein the image of an original document is read by a scanner.

58. An image processing apparatus according to claim 56, wherein said image processing apparatus comprises a facsimile apparatus.

59. An image processing apparatus for transmitting an image of a predetermined original document read by reading means to a destination apparatus and for outputting, in the form of a visible image, an image received from an originator apparatus to a predetermined visible image output means, said image processing apparatus comprising:

instruction means for providing the resolution of said read original document;

first discrimination means for discriminating whether or not said destination apparatus is able to receive outline vector data;

reading means for reading the original document at a resolution lower than the resolution provided by said instruction means if a discrimination is made that said destination apparatus is able to receive outline vector data;

outline vector extraction means for extracting outline vector data from image data read by said reading means;

transmission means for transmitting outline vector data extracted by said outline vector extraction means to said destination apparatus;

receiving means for receiving image data;

enlarging means for enlarging received outline vector data at an enlargement ratio determined in accordance with a first resolution and the resolution of said visible image output means in the case where received image data is outline vector data;

smoothing means for smoothing outline vector data processed by said enlarging means; and image reproducing means for reproducing image data to be supplied to said visible image generating means in accordance with outline vector smoothed by said smoothing means.

60. An image processing apparatus according to claim 59, wherein said outline vector extraction means assumes that one of pixels is in the form of a rectangle, and, in a predetermined direction, sequentially traces between white pixels and black pixels in the edge portion of inputted image data, so that vertical and horizontal vectors are extracted.

61. An image processing apparatus according to claim 60, wherein wherein said smoothing means includes first smoothing means and second smoothing means, said first smoothing means including discrimination means for discriminating a point position, which is omitted from smoothing, in accordance with the connection relationship among a predetermined number of continued vectors contained by vector data extracted by said outline vector extraction means;

means arranged in such a manner that, if vector data extracted by said outline vector extraction means and forming a closed loop is smaller than a predetermined size, said means deletes vector data smaller than a predetermined size;

means arranged in such a manner that, if projections and pits smaller than a predetermined size are present in a predetermined length in extracted vector data, vector data which forms said projections and pits is deleted and vectors positioned in front and in the rear of said projections and pits are connected to each other; and means arranged in such a manner that, in accordance with the length and the direction of each of a predetermined number of continued vectors, a plurality of vertical or horizontal vectors contained by a predetermined number of said vectors are deleted, the coordinates of the starting point or the end point of the residual vector are corrected so as to allow a diagonal vector to be positioned; and said second smoothing means including means for correcting the starting point position or the end point position of one vector among continued vector data items smoothed by said first smoothing means except for said point omitted from smoothing by said discrimination means by calculating the weighted mean between the starting point coordinates or end point coordinates of a plurality of said vectors positioned in front and in the rear of said vector.

62. An image processing apparatus according to claim 59, wherein said image processing apparatus comprises a facsimile apparatus.

* * * * *

UNITED STATES PATENT AND TRADEMARK OFFICE
CERTIFICATE OF CORRECTION

PATENT NO. : 5,566,003
DATED : October 15, 1996
INVENTOR(S) : TERUYA HARA ET AL.

Page 1 of 6

It is certified that error appears in the above-indentified patent and that said Letters Patent is hereby corrected as shown below:

TITLE PAGE

[56] References Cited, U.S. PATENT DOCUMENTS

"Veda et al." should read --Ueda et al.--.

COLUMN 2

Line 42, "is atable" should be deleted.

COLUMN 5

Line 8, "a" should read --an--;
   Line 22, "procedure" should read --procedure.--;
   Line 59, "outputs" should read --output--.

COLUMN 8

Line 34, "position" should read --positioned--.

COLUMN 9

Line 39, "reference" should read --reference to--.

COLUMN 10

Line 6, "showing" should read --shows--;

UNITED STATES PATENT AND TRADEMARK OFFICE
CERTIFICATE OF CORRECTION

PATENT NO. : 5,566,003
DATED : October 15, 1996
INVENTOR(S) : TERUYA HARA ET AL.

It is certified that error appears in the above-indentified patent and that said Letters Patent is hereby corrected as shown below:

<u>COLUMN 10</u> continued

Line 48,   "step" should read --step 20.--;
    Line 51,   "is per-" should be deleted;
    Line 52,   "formed" should be deleted;
    Line 66,   "is performed" should be deleted.

<u>COLUMN 12</u>

Line 51,   "is" should read --are--.

<u>COLUMN 13</u>

Line 52,   "is" should be deleted.

<u>COLUMN 15</u>

Line 18,   "blocks" should read --block--.

<u>COLUMN 16</u>

Line 4,   "receives" should read --receive--.

<u>COLUMN 17</u>

Line 4,   "for use" should read --used--.

UNITED STATES PATENT AND TRADEMARK OFFICE
CERTIFICATE OF CORRECTION

PATENT NO. : 5,566,003
DATED : October 15, 1996
INVENTOR(S) : TERUYA HARA ET AL.

It is certified that error appears in the above-indentified patent and that said Letters Patent is hereby corrected as shown below:

COLUMN 18

Line 30, "an" should be deleted;
Line 45, "an" should be deleted.

COLUMN 19

Line 67, "Described" should read --described--.

COLUMN 22

Line 60, "much" should read --many--.

COLUMN 23

Line 7, "rectangular" should read --rectangle--;
Line 10, "taken" should read --be taken-- and, "rectangular," should read --rectangle,--;
Line 11, "rectangular" should read --rectangle--;
Line 16, "rectangular" should read --rectangle--.

COLUMA 24

Line 12, "affin" should read --affine--;
Line 48, "(affin-transformed)" should read --(affine-transformed)--.

UNITED STATES PATENT AND TRADEMARK OFFICE
CERTIFICATE OF CORRECTION

PATENT NO. : 5,566,003
DATED : October 15, 1996
INVENTOR(S) : TERUYA HARA ET AL.

It is certified that error appears in the above-indentified patent and that said Letters Patent is hereby corrected as shown below:

COLUMN 26

Line 6, "in" should read --is--;

COLUMN 27

Line 2, "is" should read --are--.

COLUMN 30

Line 16, "curse," should read --course.--.

COLUMN 31

Line 12, "read" should read --reads--;
Line 14, "transfer" should read --transfers--.

COLUMN 34

Line 6, "describe." should read --described.--;
Line 20, "are" should read --is--;
Line 63, "forming" should read --form--.

UNITED STATES PATENT AND TRADEMARK OFFICE
CERTIFICATE OF CORRECTION

PATENT NO. : 5,566,003
DATED : October 15, 1996
INVENTOR(S) : TERUYA HARA ET AL.

It is certified that error appears in the above-indentified patent and that said Letters Patent is hereby corrected as shown below:

COLUMN 36

Line 18, "perfomred" should read --performed in the--;
  Line 23, "like 291" should read --line 291--;
  Line 45, "an" shoul read --a--;
  Line 57, "can be" should read --being--.

COLUMN 37

Line 40, "is" should read --is provided--;
  Line 49-50 "encoded image data." should be deleted.

COLUMN 39

Line 31, "bonary-cods" should read --binary-codes--.

COLUMN 40

Line 43, "times" should read --multiple of--.

COLUMN 42

Line 59, "performe" should read --perform-- and "direction" should read --direction.--.

UNITED STATES PATENT AND TRADEMARK OFFICE
CERTIFICATE OF CORRECTION

PATENT NO. : 5,566,003
DATED : October 15, 1996
INVENTOR(S) : TERIYA HARA ET AL.

It is certified that error appears in the above-indentified patent and that said Letters Patent is hereby corrected as shown below:

COLUMN 47

Line 2,  "a" should read --an--;
  Line 46, "a" should read --an--.

COLUMN 50

Line 17, "rectangular," should read --rectangle,--;
  Line 63, "said" should read --¶ said--.

COLUMN 54

Line 6,  "rectangular," should read --rectangle,--;
  Line 29, "means" should read --¶ means--.

Signed and Sealed this

Fifteenth Day of April, 1997

Attest:

BRUCE LEHMAN

*Attesting Officer*    *Commissioner of Patents and Trademarks*